United States Patent
Zhang et al.

(10) Patent No.: US 10,700,996 B2
(45) Date of Patent: Jun. 30, 2020

(54) LOGICAL ROUTER WITH MULTIPLE ROUTING COMPONENTS

(71) Applicant: Nicira, Inc., Palo Alto, CA (US)

(72) Inventors: Ronghua Zhang, San Jose, CA (US); Ganesan Chandrashekhar, Campbell, CA (US); Sreeram Ravinoothala, San Jose, CA (US); Kai-Wei Fan, San Jose, CA (US)

(73) Assignee: NICIRA, INC, Palo Alto, CA (US)

( * ) Notice: Subject to any disclaimer, the term of this patent is extended or adjusted under 35 U.S.C. 154(b) by 0 days.

(21) Appl. No.: 16/133,812

(22) Filed: Sep. 18, 2018

(65) Prior Publication Data
US 2019/0020600 A1  Jan. 17, 2019

Related U.S. Application Data

(63) Continuation of application No. 14/814,477, filed on Jul. 30, 2015, now Pat. No. 10,129,180.
(Continued)

(51) Int. Cl.
*H04L 12/947* (2013.01)
*H04L 29/08* (2006.01)
(Continued)

(52) U.S. Cl.
CPC .......... *H04L 49/25* (2013.01); *H04L 12/4633* (2013.01); *H04L 12/4654* (2013.01);
(Continued)

(58) Field of Classification Search
CPC ..... H04L 45/74; H04L 45/586; H04L 5/0055; G06F 15/173
See application file for complete search history.

(56) References Cited

U.S. PATENT DOCUMENTS

| | | |
|---|---|---|
| 5,504,921 A | 4/1996 | Dev et al. |
| 5,550,816 A | 8/1996 | Hardwick et al. |

(Continued)

FOREIGN PATENT DOCUMENTS

| | | |
|---|---|---|
| AU | 2016211222 A1 | 9/2017 |
| CA | 2974535 A1 | 8/2016 |

(Continued)

OTHER PUBLICATIONS

Agarwal, Sugam, et al., "Traffic Engineering in Software Defined Networks," 2013 Proceedings IEEE INFOCOM, Apr. 14, 2013, 10 pages, Bell Labs, Alcatel-Lucent, Holmdel, NJ, USA.
(Continued)

*Primary Examiner* — Iqbal Zaidi
(74) *Attorney, Agent, or Firm* — Adeli LLP

(57) ABSTRACT

Some embodiments provide a method for handling failure at one of several peer centralized components of a logical router. At a first one of the peer centralized components of the logical router, the method detects that a second one of the peer centralized components has failed. In response to the detection, the method automatically identifies a network layer address of the failed second peer. The method assumes responsibility for data traffic to the failed peer by broadcasting a message on a logical switch that connects all of the peer centralized components and a distributed component of the logical router. The message instructs recipients to associate the identified network layer address with a data link layer address of the first peer centralized component.

20 Claims, 22 Drawing Sheets

Related U.S. Application Data

(60) Provisional application No. 62/110,061, filed on Jan. 30, 2015.

(51) Int. Cl.
| | | |
|---|---|---|
| *H04L 12/24* | (2006.01) | |
| *H04L 12/747* | (2013.01) | |
| *H04L 12/721* | (2013.01) | |
| *H04L 12/935* | (2013.01) | |
| *H04L 12/861* | (2013.01) | |
| *H04L 12/741* | (2013.01) | |
| *H04L 12/713* | (2013.01) | |
| *H04L 12/751* | (2013.01) | |
| *H04L 12/66* | (2006.01) | |
| *H04L 12/715* | (2013.01) | |
| *H04L 12/46* | (2006.01) | |
| *H04L 12/717* | (2013.01) | |
| *H04L 12/733* | (2013.01) | |
| *H04L 29/12* | (2006.01) | |
| *H04L 12/801* | (2013.01) | |
| *H04L 12/725* | (2013.01) | |
| *H04L 12/26* | (2006.01) | |
| *H04L 12/931* | (2013.01) | |
| *H04L 12/707* | (2013.01) | |
| *H04L 12/703* | (2013.01) | |

(52) U.S. Cl.
CPC .......... *H04L 12/66* (2013.01); *H04L 41/0654* (2013.01); *H04L 41/145* (2013.01); *H04L 41/5041* (2013.01); *H04L 43/08* (2013.01); *H04L 43/106* (2013.01); *H04L 45/02* (2013.01); *H04L 45/122* (2013.01); *H04L 45/306* (2013.01); *H04L 45/42* (2013.01); *H04L 45/44* (2013.01); *H04L 45/586* (2013.01); *H04L 45/64* (2013.01); *H04L 45/72* (2013.01); *H04L 45/74* (2013.01); *H04L 45/742* (2013.01); *H04L 45/745* (2013.01); *H04L 47/19* (2013.01); *H04L 49/3009* (2013.01); *H04L 49/3063* (2013.01); *H04L 49/354* (2013.01); *H04L 49/9068* (2013.01); *H04L 61/2585* (2013.01); *H04L 67/1002* (2013.01); *H04L 67/1038* (2013.01); *H04L 67/2842* (2013.01); *H04L 67/327* (2013.01); *H04L 69/321* (2013.01); *H04L 69/326* (2013.01); *H04L 69/329* (2013.01); *H04L 41/5077* (2013.01); *H04L 45/22* (2013.01); *H04L 45/28* (2013.01); *H04L 45/38* (2013.01); *H04L 61/103* (2013.01); *H04L 61/2503* (2013.01); *H04L 61/6063* (2013.01); *H04L 67/1095* (2013.01); *H04L 2012/4629* (2013.01)

(56) References Cited

U.S. PATENT DOCUMENTS

| | | |
|---|---|---|
| 5,751,967 A | 5/1998 | Raab et al. |
| 6,006,275 A | 12/1999 | Picazo et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,914,907 B1 | 7/2005 | Bhardwaj et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,447,197 B2 | 11/2008 | Terrell et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,555,002 B2 | 6/2009 | Arndt et al. |
| 7,606,260 B2 | 10/2009 | Oguchi et al. |
| 7,630,358 B1 | 12/2009 | Lakhani et al. |
| 7,643,488 B2 | 1/2010 | Khanna et al. |
| 7,649,851 B2 | 1/2010 | Takashige et al. |
| 7,653,747 B2 | 1/2010 | Lucco et al. |
| 7,710,874 B2 | 5/2010 | Balakrishnan et al. |
| 7,742,459 B2 | 6/2010 | Kwan et al. |
| 7,764,599 B2 | 7/2010 | Doi et al. |
| 7,778,268 B2 | 8/2010 | Khan et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,260 B2 | 9/2011 | Venugopal et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,416,709 B1 | 4/2013 | Marshall et al. |
| 8,456,984 B2 | 6/2013 | Ranganathan et al. |
| 8,504,718 B2 | 8/2013 | Wang et al. |
| 8,559,324 B1 | 10/2013 | Brandwine et al. |
| 8,565,108 B1 | 10/2013 | Marshall et al. |
| 8,600,908 B2 | 12/2013 | Lin et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Merwe et al. |
| 8,958,298 B2 | 2/2015 | Zhang et al. |
| 9,021,066 B1 | 4/2015 | Singh et al. |

(56) References Cited

U.S. PATENT DOCUMENTS

| | | |
|---|---|---|
| 9,059,999 B2 | 6/2015 | Koponen et al. |
| 9,137,052 B2 | 9/2015 | Koponen et al. |
| 9,313,129 B2 | 4/2016 | Ganichev et al. |
| 9,419,855 B2 | 8/2016 | Ganichev et al. |
| 9,485,149 B1 | 11/2016 | Traina et al. |
| 9,503,321 B2 | 11/2016 | Neginhal et al. |
| 9,559,980 B2 | 1/2017 | Li et al. |
| 9,647,883 B2 | 5/2017 | Neginhal et al. |
| 9,749,214 B2 | 8/2017 | Han |
| 9,787,605 B2 | 10/2017 | Zhang et al. |
| 10,057,157 B2 | 8/2018 | Goliya et al. |
| 10,075,363 B2 | 9/2018 | Goliya et al. |
| 10,079,779 B2 | 9/2018 | Zhang et al. |
| 10,095,535 B2 | 10/2018 | Dubey et al. |
| 10,110,431 B2 | 10/2018 | Ganichev et al. |
| 10,129,142 B2 | 11/2018 | Goliya et al. |
| 10,129,180 B2 | 11/2018 | Zhang et al. |
| 10,153,973 B2 | 12/2018 | Dubey |
| 10,230,629 B2 | 3/2019 | Masurekar et al. |
| 10,341,236 B2 | 7/2019 | Boutros et al. |
| 10,411,955 B2 | 9/2019 | Neginhal et al. |
| 10,454,758 B2 | 10/2019 | Boutros et al. |
| 2001/0043614 A1 | 11/2001 | Viswanadham et al. |
| 2002/0067725 A1 | 6/2002 | Oguchi et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2004/0013120 A1 | 1/2004 | Shen |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0059253 A1 | 3/2006 | Goodman et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291387 A1* | 12/2006 | Kimura ............... H04L 63/0428 370/230 |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0165515 A1 | 7/2007 | Vasseur |
| 2007/0201357 A1 | 8/2007 | Smethurst et al. |
| 2007/0206591 A1 | 9/2007 | Doviak et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0253396 A1 | 10/2008 | Olderdissen |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0064305 A1 | 3/2009 | Stiekes et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0149964 A1 | 6/2011 | Judge et al. |
| 2011/0149965 A1 | 6/2011 | Judge et al. |
| 2011/0194567 A1 | 8/2011 | Shen |
| 2011/0205931 A1 | 8/2011 | Zhou et al. |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0131643 A1 | 5/2012 | Cheriton |
| 2012/0155467 A1 | 6/2012 | Appenzeller |
| 2012/0182992 A1 | 7/2012 | Cowart et al. |
| 2012/0236734 A1 | 9/2012 | Sampath et al. |
| 2013/0007740 A1 | 1/2013 | Kikuchi et al. |
| 2013/0044636 A1* | 2/2013 | Koponen ............... H04L 47/12 370/254 |
| 2013/0044641 A1 | 2/2013 | Koponen et al. |
| 2013/0051399 A1 | 2/2013 | Zhang et al. |
| 2013/0058225 A1 | 3/2013 | Casado et al. |
| 2013/0058229 A1 | 3/2013 | Casado et al. |
| 2013/0058335 A1 | 3/2013 | Koponen et al. |
| 2013/0058350 A1 | 3/2013 | Fulton |
| 2013/0058353 A1 | 3/2013 | Koponen et al. |
| 2013/0060940 A1 | 3/2013 | Koponen et al. |
| 2013/0094350 A1 | 4/2013 | Mandal et al. |
| 2013/0103817 A1 | 4/2013 | Koponen et al. |
| 2013/0103818 A1 | 4/2013 | Koponen et al. |
| 2013/0132536 A1 | 5/2013 | Zhang et al. |
| 2013/0142048 A1 | 6/2013 | Gross et al. |
| 2013/0148541 A1 | 6/2013 | Zhang et al. |
| 2013/0148542 A1 | 6/2013 | Zhang et al. |

(56) References Cited

U.S. PATENT DOCUMENTS

| | | |
|---|---|---|
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0212148 A1 | 8/2013 | Koponen et al. |
| 2013/0223444 A1 | 8/2013 | Liljenstolpe et al. |
| 2013/0230047 A1 | 9/2013 | Subrahmaniam et al. |
| 2013/0266007 A1 | 10/2013 | Kumbhare et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0329548 A1 | 12/2013 | Nakil et al. |
| 2013/0332602 A1 | 12/2013 | Nakil et al. |
| 2013/0332619 A1 | 12/2013 | Xie et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0059226 A1 | 2/2014 | Messerli et al. |
| 2014/0146817 A1 | 5/2014 | Zhang |
| 2014/0173093 A1 | 6/2014 | Rabeela et al. |
| 2014/0195666 A1 | 7/2014 | Dumitriu et al. |
| 2014/0229945 A1 | 8/2014 | Barkai et al. |
| 2014/0241247 A1 | 8/2014 | Kempf et al. |
| 2014/0269299 A1 | 9/2014 | Koornstra |
| 2014/0328350 A1 | 11/2014 | Hao et al. |
| 2014/0372582 A1 | 12/2014 | Ghanwani et al. |
| 2014/0376550 A1 | 12/2014 | Khan et al. |
| 2015/0016300 A1 | 1/2015 | Devireddy et al. |
| 2015/0063360 A1 | 3/2015 | Thakkar et al. |
| 2015/0089082 A1 | 3/2015 | Patwardhan et al. |
| 2015/0092594 A1 | 4/2015 | Zhang et al. |
| 2015/0103838 A1 | 4/2015 | Zhang et al. |
| 2015/0188770 A1 | 7/2015 | Naiksatam et al. |
| 2015/0222550 A1 | 8/2015 | Anand |
| 2015/0263897 A1 | 9/2015 | Ganichev et al. |
| 2015/0263946 A1 | 9/2015 | Tubaltsev et al. |
| 2015/0263952 A1 | 9/2015 | Ganichev et al. |
| 2015/0271011 A1 | 9/2015 | Neginhal et al. |
| 2015/0271303 A1 | 9/2015 | Neginhal et al. |
| 2016/0105471 A1 | 4/2016 | Nunes et al. |
| 2016/0119229 A1 | 4/2016 | Zhou |
| 2016/0182287 A1 | 6/2016 | Chiba et al. |
| 2016/0191374 A1* | 6/2016 | Singh ............... H04L 41/00 370/228 |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0261493 A1 | 9/2016 | Li |
| 2016/0294612 A1 | 10/2016 | Ravinoothala et al. |
| 2016/0344586 A1 | 11/2016 | Ganichev et al. |
| 2017/0005923 A1 | 1/2017 | Babakian |
| 2017/0048129 A1 | 2/2017 | Masurekar et al. |
| 2017/0048130 A1 | 2/2017 | Goliya et al. |
| 2017/0063632 A1 | 3/2017 | Goliya et al. |
| 2017/0063633 A1 | 3/2017 | Goliya et al. |
| 2017/0064717 A1 | 3/2017 | Filsfils et al. |
| 2017/0126497 A1 | 5/2017 | Dubey et al. |
| 2017/0230241 A1 | 8/2017 | Neginhal et al. |
| 2017/0317919 A1 | 11/2017 | Fernando et al. |
| 2018/0006943 A1 | 1/2018 | Dubey |
| 2018/0062914 A1 | 3/2018 | Boutros et al. |
| 2018/0097734 A1 | 4/2018 | Boutros et al. |
| 2018/0367442 A1 | 12/2018 | Goliya et al. |
| 2019/0018701 A1 | 1/2019 | Dubey et al. |
| 2019/0124004 A1 | 4/2019 | Dubey |
| 2019/0199625 A1 | 6/2019 | Masurekar et al. |
| 2019/0312812 A1 | 10/2019 | Boutros et al. |
| 2019/0334767 A1 | 10/2019 | Neginhal et al. |

FOREIGN PATENT DOCUMENTS

| | | |
|---|---|---|
| CN | 1714548 A | 12/2005 |
| CN | 103890751 A | 6/2014 |
| EP | 1653688 A1 | 5/2006 |
| EP | 3013006 A1 | 4/2016 |
| EP | 3251306 A1 | 12/2017 |
| JP | 2000244567 A | 9/2000 |
| JP | 2003069609 A | 3/2003 |
| JP | 2003124976 A | 4/2003 |
| JP | 2003318949 A | 11/2003 |
| JP | 2011228864 A | 11/2011 |
| JP | 2014534789 A | 12/2014 |
| WO | 2005112390 A1 | 11/2005 |
| WO | 2008095010 A1 | 8/2008 |
| WO | 2013026049 A1 | 2/2013 |
| WO | 2013055697 A1 | 4/2013 |
| WO | 2013081962 A1 | 6/2013 |
| WO | 2013184846 A1 | 12/2013 |
| WO | 2015015787 A1 | 2/2015 |
| WO | 2015142404 A1 | 9/2015 |
| WO | 2016123550 A1 | 8/2016 |
| WO | 2017027073 A1 | 2/2017 |
| WO | 2018044746 A1 | 3/2018 |

OTHER PUBLICATIONS

Aggarwal, R., et al., "Data Center Mobility based on E-VPN, BGP/MPLS IP VPN, IP Routing and NHRP," draft-raggarwa-data-center-mobility-05.txt, Jun. 10, 2013, 24 pages, Internet Engineering Task Force, IETF, Geneva, Switzerland.

Author Unknown, "VMware® NSX Network Virtualization Design Guide," Month Unknown 2013, 32 pages, Item No. VMW-NSX-NTWK-VIRT-DESN-GUIDE-V2-101, VMware, Inc., Palo Alto, CA, USA.

Ballani, Hitesh, et al., "Making Routers Last Longer with ViAggre," NSDI '09: 6th USENIX Symposium on Networked Systems Design and Implementation, Apr. 2009, 14 pages, USENIX Association.

Caesar, Matthew, et al., "Design and Implementation of a Routing Control Platform," NSDI '05: 2nd Symposium on Networked Systems Design & Implementation , Apr. 2005, 14 pages, Usenix Association.

Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, 17 pages, ACM, New York, NY.

Dumitriu, Dan Mihai, et al., (U.S. Appl. No. 61/514,990), filed Aug. 4, 2011.

Fernando, Rex, et al., "Service Chaining using Virtual Networks with BGP," Internet Engineering Task Force, IETF, Jul. 7, 2015, 32 pages, Internet Society (ISOC), Geneva, Switzerland, available at https://tools.ietf.org/html/draft-fm-bess-service-chaining-01.

Handley, Mark, et al., "Designing Extensible IP Router Software," Proc. of NSDI, May 2005, 14 pages.

International Search Report and Written Opinion of PCT/US2016/015778, dated Jun. 24, 2016, Nicira, Inc.

Kim, Changhoon, et al., "Revisiting Route Caching: The World Should be Flat," in Proc. of International Conference on Passive and Active Network Measurement, Apr. 2009, 10 pages, Springer, Berlin, Heidelberg.

Koponen, Teemu, et al., "Network Virtualization in Multi-tenant Datacenters," Technical Report TR-2013-001E, Aug. 2013, 22 pages, VMware, Inc., Palo Alto, CA, USA.

Lakshminarayanan, Karthik, et al., "Routing as a Service," Report No. UCB/CSD-04-1327, Month Unknown 2004, 16 pages, Computer Science Division (EECS), University of California—Berkeley, Berkeley, California.

Lowe, Scott, "Learning NSX, Part 14: Using Logical Routing," Scott's Weblog: The weblog of an IT pro specializing in cloud computing, virtualization, and networking, all with an open source view, Jun. 20, 2014, 8 pages, available at https://blog.scottlowe.org/2014/06/20/learning-nsx-part-14-using-logical-routing/.

Maltz, David A., et al., "Routing Design in Operational Networks: A Look from the Inside," SIGCOMM '04, Aug. 30-Sep. 3, 2004, 14 pages, ACM, Portland, Oregon, USA.

Pelissier, Joe, "Network Interface Virtualization Review," Jan. 2009, 38 pages.

(56) References Cited

OTHER PUBLICATIONS

Rosen, E., "Applicability Statement for BGP/MPLS IP Virtual Private Networks (VPNs)," RFC 4365, Feb. 2006, 32 pages, The Internet Society.
Sajassi, Ali, et al., "Integrated Routing and Bridging in EVPN draft-sajassi-l2vpn-evpn-inter-subnet-forwarding-04", Jul. 4, 2014, 24 pages.
Shenker, Scott, et al., "The Future of Networking, and the Past of Protocols," Dec. 2, 2011, 30 pages, USA.
Wang, Anjing, et al., "Network Virtualization: Technologies, Perspectives, and Frontiers," Journal of Lightwave Technology, Feb. 15, 2013, 15 pages, IEEE.
Wang, Yi, et al., "Virtual Routers on the Move: Live Router Migration as a Network-Management Primitive," SIGCOMM '08, Aug. 17-22, 2008, 12 pages, ACM, Seattle, Washington, USA.
Non-Published commonly Owned U.S. Appl. No. 16/506,782, filed Jul. 9, 2019, 91 pages, Nicira, Inc.
Author Unknown, "Defining Security Policies for Policy-based and Route-based VPNs," Month Unknown 2018, 5 pages, Fortinet, Inc., retrieved at http://help.fortinet.com/fos50hlp/54/Content/FortiOS/fortigate-ipsecvpn-54/Defining_VPN_Policies/Defining_Policies_for_Policy_and_Route.htm.
Berger, L., et al, "The OSPF Opaque LSA Option," Jul. 2008, 17 pages, RFC 5250, IETF.
Keller, Ralph, "Dissemination of Application-Specific Information using the OSPF Routing Protocol," TIK Report Nr. 181, Nov. 2003, 12 pages, ETH Zurich, Switzerland.
Wang, Yushun, et al., "Connect Azure VPN gateways to multiple on-premises policy-based VPN devices using PowerShell," VPN Gateway Documentation, Apr. 18, 2018, 5 pages, retrieved at https://docs.microsoft.com/en-us/azure/vpn-gateway/vpn-gateway-connect-multiple-policybased-rm-ps.
Author Unknown, "Cisco Border Gateway Protocol Control Plane for Virtual Extensible LAN," White Paper, Jan. 23, 2015, 6 pages, Cisco Systems, Inc.
Author Unknown, "Cisco Data Center Spine-and-Leaf Architecture: Design Overview," White Paper, Apr. 15, 2016, 27 pages, Cisco Systems, Inc.
Moreno, Victor, "VXLAN Deployment Models—A Practical Perspective," Cisco Live 2015 Melbourne, Mar. 6, 2015, 72 pages, BRKDCT-2404, Cisco Systems, Inc.
Non-published commonly owned U.S. Appl. No. 16/581,118, filed Sep. 24, 2019, 36 pages, Nicira, Inc.

\* cited by examiner

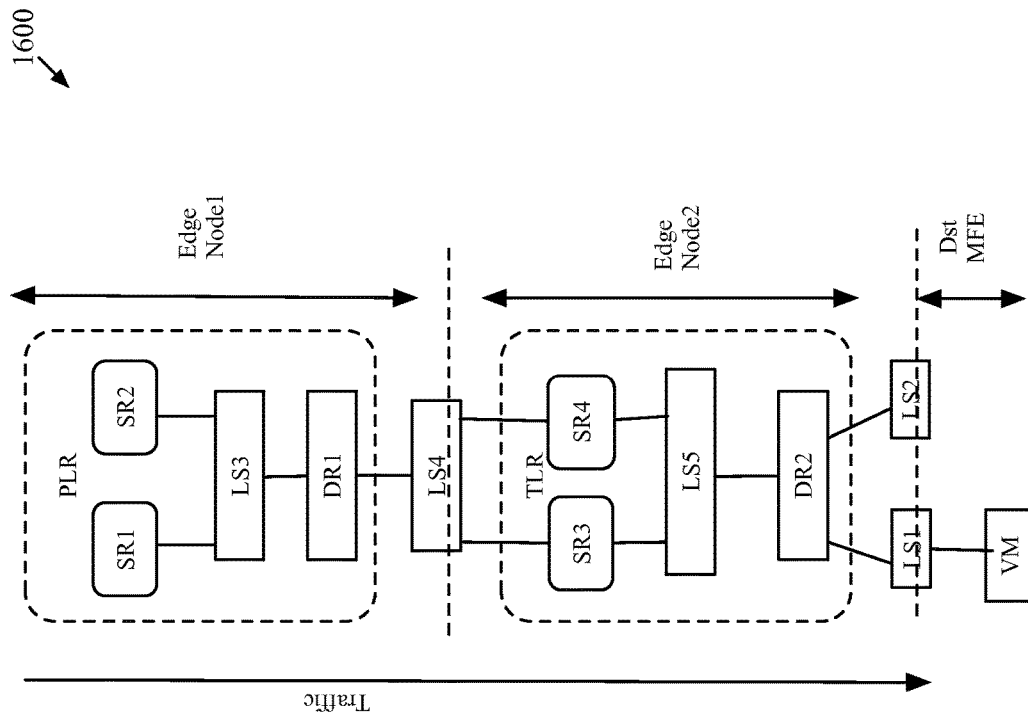
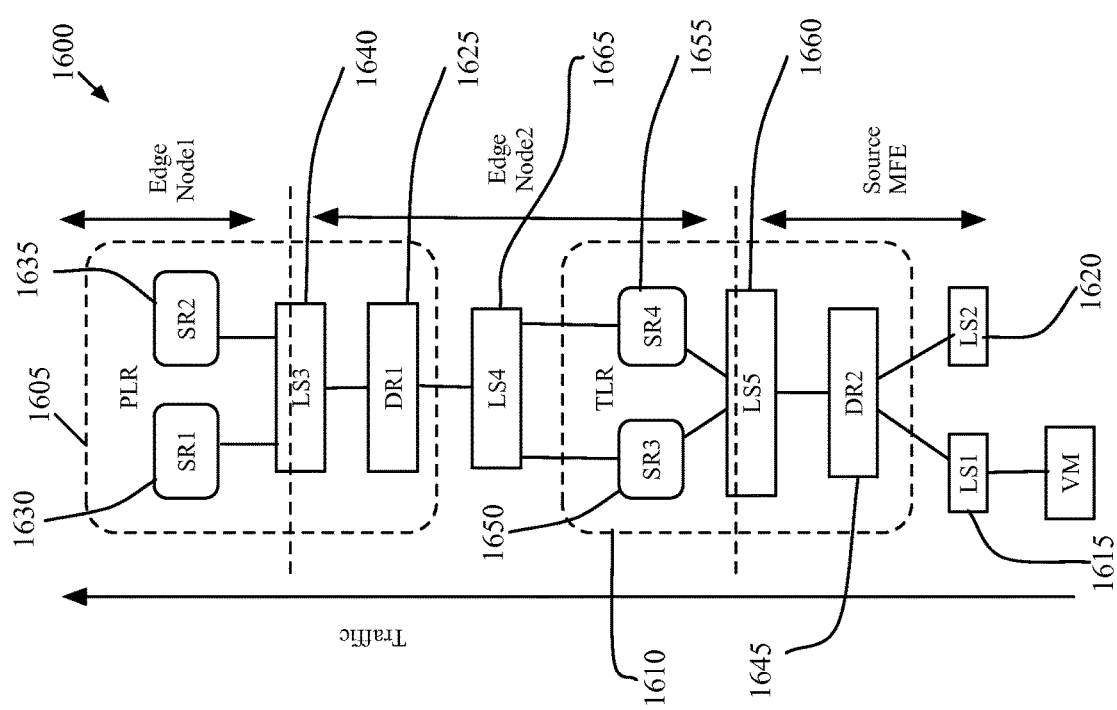
Figure 16A
Figure 16B

LOGICAL ROUTER WITH MULTIPLE ROUTING COMPONENTS

CLAIM OF BENEFIT TO PRIOR APPLICATIONS

This application is a continuation application of U.S. patent application Ser. No. 14/814,477, filed Jul. 30, 2015, and now published as U.S. Patent Publication 2016/0226700. U.S. patent application Ser. No. 14/814,477 claims the benefit of U.S. Provisional Patent Application 62/110,061, filed Jan. 30, 2015. U.S. patent application Ser. No. 14/814,477, now published as U.S. Patent Publication 2016/0226700 is incorporated herein by reference.

BACKGROUND

Typical physical networks contain several physical routers to perform L3 forwarding (i.e., routing). When a first machine wants to send a packet to a second machine located on a different IP subnet, the packet is sent to a router that uses a destination IP address of the packet to determine through which of its physical interfaces the packet should be sent. Larger networks will contain multiple routers, such that if one of the routers fails, the packets can be routed along a different path between the first machine and the second machine.

In logical networks, user-defined data compute nodes (e.g., virtual machines) on different subnets may need to communicate with each other as well. In this case, tenants may define a network for virtualization that includes both logical switches and logical routers. Methods for implementing the logical routers to adequately serve such virtualized logical networks in datacenters are needed.

BRIEF SUMMARY

Some embodiments provide a method for implementing a logical router in a network (e.g., in a datacenter). In some embodiments, the method is performed by a management plane that centrally manages the network (e.g., implemented in a network controller). The method, in some embodiments, receives a definition of a logical router (e.g., through an application programming interface (API) and defines several routing components for the logical router. Each of these routing components is separately assigned a set of routes and a set of logical interfaces.

In some embodiments, the several routing components defined for a logical router includes one distributed routing component and several centralized routing components. In addition, the management plane of some embodiments defines a logical switch for handling communications between the components internal to the logical router (referred to as a transit logical switch). The distributed routing component and the transit logical switch are implemented in a distributed manner by numerous machines within the datacenter, while the centralized routing components are each implemented on a single machine. Some embodiments implement the distributed components in the datapath of managed forwarding elements on the various machines, while the centralized routing components are implemented in VMs (or other data compute nodes) on their single machines. Other embodiments also implement the centralized components in the datapath of their assigned machine.

The centralized components, in some embodiments, may be configured in active-active or active-standby modes. In active-active mode, all of the centralized components are fully functional at the same time, and traffic can ingress or egress from the logical network through the centralized components using equal-cost multi-path (ECMP) forwarding principles (balancing the traffic across the various centralized components). In this mode, each of the separate centralized components has its own network layer (e.g., IP) address and data link layer (e.g., MAC) address for communicating with an external network. In addition, each of the separate centralized components has its own network layer and data link layer address for connecting to the transit logical switch in order to send packets to and receive packets from the distributed routing component.

In some embodiments, the logical router is part of a two-tier logical network structure. The two-tier structure of some embodiments includes a single logical router for connecting the logical network to a network external to the datacenter (referred to as a provider logical router (PLR) and administrated by, e.g., the owner of the datacenter), and multiple logical routers that connect to the single logical router and do not separately communicate with the external network (referred to as a tenant logical router (TLR) and administrated by, e.g., different tenants of the datacenter). Some embodiments implement the PLR in active-active mode whenever possible, and only use active-standby mode when stateful services (e.g., NAT, firewall, load balancer, etc.) are configured for the logical router.

For the PLR, some embodiments enable route exchange with the external network. Each of the centralized components of the PLR runs a dynamic routing protocol process to advertise prefixes of the logical network and receive routes towards the external network. Through a network control system of network controllers located both centrally in the datacenter and on the machines that implement the logical network, these routes are propagated to the other centralized components and the distributed routing component. Some embodiments use different administrative metrics in the routing information base (RIB) of the centralized component for routes learned directly from the external network and routes learned from a different peer centralized component that learned the routes from the external network. Thus, a centralized component will prefer routes that it learned directly to routes that involve redirection through peer centralized components of the logical router. However, when the different centralized components have interfaces that are configured with different L3 connectivity towards the external network, some embodiments create dummy interfaces on the centralized components that are used to redirect packets processed by a first centralized component through a second centralized component to the external network.

In active-standby mode, on the other hand, only one of the centralized components is fully operational at a time (the active component), and only this component sends out messages to attract traffic. In some embodiments, the two components use the same network layer address (but different data link layer addresses) for communicating with the distributed component, and only the active component replies to address resolution protocol (ARP) requests from this distributed component. Furthermore, only the active centralized component advertises routes to the external network to attract traffic.

When the logical router is a TLR, some embodiments either use no centralized components or two centralized components in active-standby mode when stateful services are configured for the logical router. The TLR operates internally in the same manner as the PLR in active-standby mode, with each of the two centralized components having the same network layer address, and only the active component responding to ARP requests. To connect to the PLR, some embodiments also assign each of the two components a same network layer address (though different from the address used to connect to its own distributed component. In addition, the management plane defines a transit logical switch between the distributed component of the PLR and the centralized components of the TLR.

In some cases, whether in active-active or active-standby mode, one (or more) of the centralized router components will fail. This failure may occur due to the machine on which the component operates crashing completely, the data compute node or datapath software that implements the machine corrupting, the ability of the component to connect to either the external network or through tunnels to other components of the logical network failing, etc. When the failed component is a standby in active-standby mode, no action need be taken in some embodiments. Otherwise, when one of the centralized components fails, one of its peer components becomes responsible for taking over its communications.

In active-standby mode, the standby centralized router component is responsible for taking over for the failed active centralized router component. To do so, if the logical router is a PLR, the new active component begins advertising routes to the external network so as to attract traffic from the external network (the failed component, if its connectivity to the external network remains, is responsible for stopping its own route advertisement so as to avoid attracting this traffic). In addition, the new active component sends messages (e.g., gratuitous ARP (GARP) replies) to the distributed routing component of the PLR that it is now responsible for the network layer address shared between the two components. If the logical router is a TLR, this same set of GARP replies are sent. In addition, to attract traffic from the PLR to which it connects, the new active component sends GARP replies to the transit logical switch that connects it to the PLR.

For the active-active mode of some embodiments, the management plane designates all of the centralized components for a logical router with a ranking at the time they are created. This ranking is then used to determine which of the peer components will take over for a failed component. Specifically, in some embodiments the centralized component with the next-highest ranking to that of the failed component takes over for the failed component. To take over, the overtaking component identifies the network layer address of the failed component that communicates with the distributed component for the logical router, and sends GARP replies associating its own data link layer address with the network layer address of the failed component.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIGS. 16A-B illustrate examples of northbound and southbound traffic for a two-tier logical topology with centralized services provided in the lower (TLR) tier by SRs.

DETAILED DESCRIPTION

Figure 2:
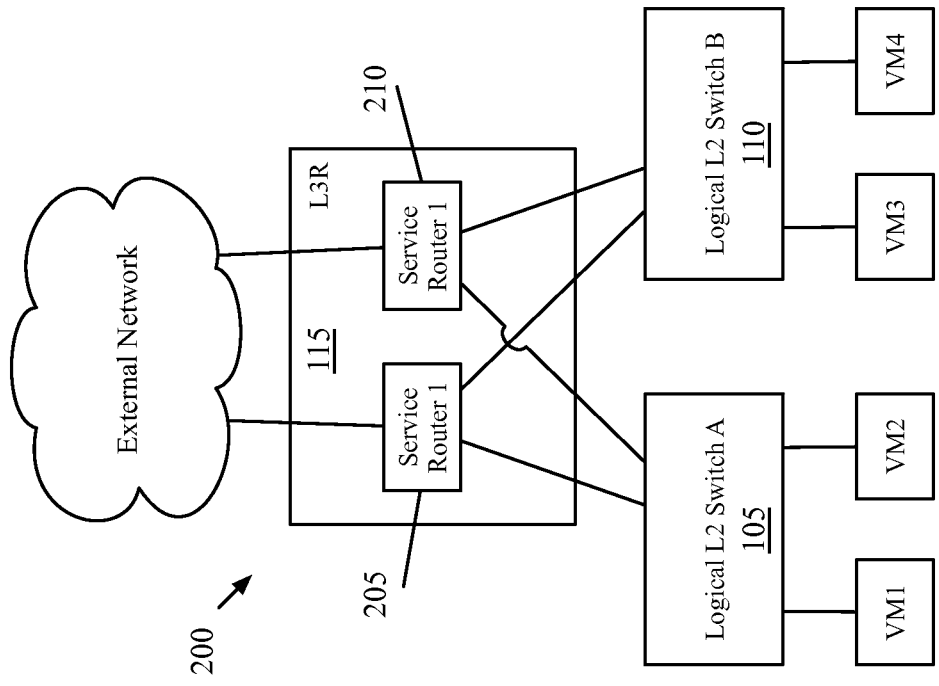
FIG. 2 illustrates a management plane view of the logical network of FIG. 1 when the logical router is implemented in a centralized manner.

Some embodiments provide a two-tier logical router topology for implementation in, e.g., a datacenter. These tiers include a top tier of a provider logical router (PLR) and a lower tier of tenant logical routers (TLR), in some embodiments. The two-tiered structure enables both the provider (e.g., datacenter owner) and the tenant (e.g., datacenter customer, often one of many such customers) control over their own services and policies. In some embodiments, the PLR layer is the logical layer that interfaces with external physical networks, and therefore dynamic routing protocols (e.g., BGP) may be configured on the PLR to enable the exchange of routing information with physical routers outside the datacenter. Some embodiments also allow the configuration of bidirectional forwarding detection (BFD) or similar protocols for monitoring whether physical network routers are up. Some datacenters may not have multiple tenants, in which case the need for separate PLR and TLRs is removed. In such cases, some embodiments use a single-tier logical router topology, with the single tier having the functionality of PLRs. The two-tier logical topology of some embodiments is described in greater detail in U.S. patent application Ser. No. 14/222,557, filed Mar. 21, 2014, now issued as U.S. Pat. No. 9,647,883, which is incorporated herein by reference.

In some embodiments, both PLRs and TLRs have the ability to support stateless services (e.g., access control lists (ACLs)) as well as stateful services (e.g., firewalls). In addition, logical switches (to which data compute nodes such as VMs may couple) may connect to either a PLR or a TLR. Furthermore, both PLRs and TLRs can be implemented in either a distributed manner (e.g., with the logical router processing performed in first-hop MFEs that physically couple directly to the data compute nodes) or a centralized manner (with the logical router processing performed in gateways for both north-south and east-west traffic). For centralized implementations, as well as for the centralized gateways by which PLRs interact with the physical network even when implemented in a distributed manner, both tiers of logical routers may be scaled out by using multiple physical boxes in order to provide additional throughput (e.g., using equal-cost multi-path (ECMP) techniques) as well as for failure protection.

In some embodiments, the logical routers may only use stateful services if implemented at least partially in a centralized (e.g., clustered) manner (to avoid the need for state-sharing between the logical router implementations). In different embodiments, these gateways (that provide centralized aspects of logical routers, as well as which form the connection to the external network for distributed PLRs) may be implemented as virtual machines (sometimes referred to as Edge VMs), in other types of data compute nodes (e.g., namespaces), or by using the Linux-based datapath development kit (DPDK) packet processing software (e.g., as a VRF in the DPDK-based datapath).

The following introduces some of the terminology and abbreviations used in the specification:

VNI (Virtual/Logical Network Identifier)—a unique identifier (e.g., a 24-bit identifier) for a logical domain (e.g., a logical switch)

PLR (Provider Logical Router—introduced above, a logical router over which a service provider (e.g., datacenter operator) has full control; interfaces directly with an external physical network.

TLR (Tenant Logical Router)—a logical router over which a tenant (e.g., a datacenter customer, a group within an enterprise, etc.) has full control; connects to a PLR to access an external physical network.

Distributed Logical Router—a logical router that supports first-hop routing; that is, the logical router is implemented in the managed forwarding elements to which the data compute nodes directly couple.

Centralized Logical Router—a logical router that does not support first hop-routing Service Router (SR)—part of the realization of a logical router that is used to provide centralized services; in some embodiments, the SR is not exposed to the network manager APIs except for troubleshooting purposes.

Distributed Router (DR)—part of the realization of a logical router used to provide first-hop routing; in some embodiments, the DR is also not exposed to the network manager APIs except for troubleshooting purposes.

Uplink—refers to both (i) the northbound interface of a logical router (directed towards the external physical network) and (ii) a team of pNICs of a gateway.

Logical switch—a logical L2 broadcast domain.

Transit logical switch—a logical switch created automatically by the network manager to connect SRs/DR of a TLR with the DR of a DR; in some embodiments, a transit logical switch has no data compute nodes (e.g., customer workload VMs) connected to it; furthermore, in some embodiments, the transit logical switch is not exposed to the network manager APIs except for troubleshooting purposes Context—a datapath representation of a logical router; in some embodiments, the context may be a VRF, a namespace, or a VM Transport Node, or Gateway—a node that terminates tunnels defined by the network manager; in various embodiments, may be a hypervisor-implemented virtual switch or a DPDK-based Edge Node; in some embodiments, transport node may be used interchangeably with datapath.

Deployment Container (DC), or Edge Cluster—a collection of homogeneous nodes, the uplinks of which share the same L2 connectivity; in some embodiments, all nodes in a DC are of the same type and belong to the same failure domain.

Edge Node—a node in a DC; may be a DPDK-based Edge or a hypervisor-implemented virtual switch The above introduces the concept of a two-tiered logical router configuration as well as certain aspects of the logical router configuration and implementation of some embodiments. In the following, Section I focuses on the overall high-level design of the logical router of some embodiments, while Section II describes the configuration of the various logical router components. Section III then describes the packet processing through the various pipelines of some embodiments. Next, Section IV describes ECMP processing in the active-active configuration, while Section V describes the active-standby configuration. Section VI then describes failover scenarios for the SRs. Finally, Section VII describes the electronic system with which some embodiments of the invention are implemented.

I. Logical Router and Physical Implementation

The following discussion describes the design of logical routers for some embodiments as well as the implementation of such logical routers by the network controllers of some embodiments. As mentioned above, the logical routers of some embodiments are designed such that they can be implemented in either a distributed or centralized manner, they can scale out with or without stateful (or stateless) services, and so that such services may be provided by either a VRF context in a datapath or by a virtual machine context.

Logical routers, in some embodiments, exist in three different forms. The first of these forms is the API view, or configuration view, which is how the logical router is defined by a user, such as a datacenter provider or tenant (i.e., a received definition of the logical router). The second view is the control plane, or management plane, view, which is how the network controller internally defines the logical router. Finally, the third view is the physical realization, or implementation of the logical router, which is how the logical router is actually implemented in the datacenter.

In the control plane view, the logical router of some embodiments may include one or both of a single DR and one or more SRs. The DR, in some embodiments, spans managed forwarding elements (MFEs) that couple directly to VMs or other data compute nodes that are logically connected, directly or indirectly, to the logical router. The DR of some embodiments also spans the gateways to which the logical router is bound. The DR, as mentioned above, is responsible for first-hop distributed routing between logical switches and/or other logical routers that are logically connected to the logical router. The SRs of some embodiments are responsible for delivering services that are not implemented in a distributed fashion (e.g., some stateful services).

A. Centralized Logical Router

Figure 1:
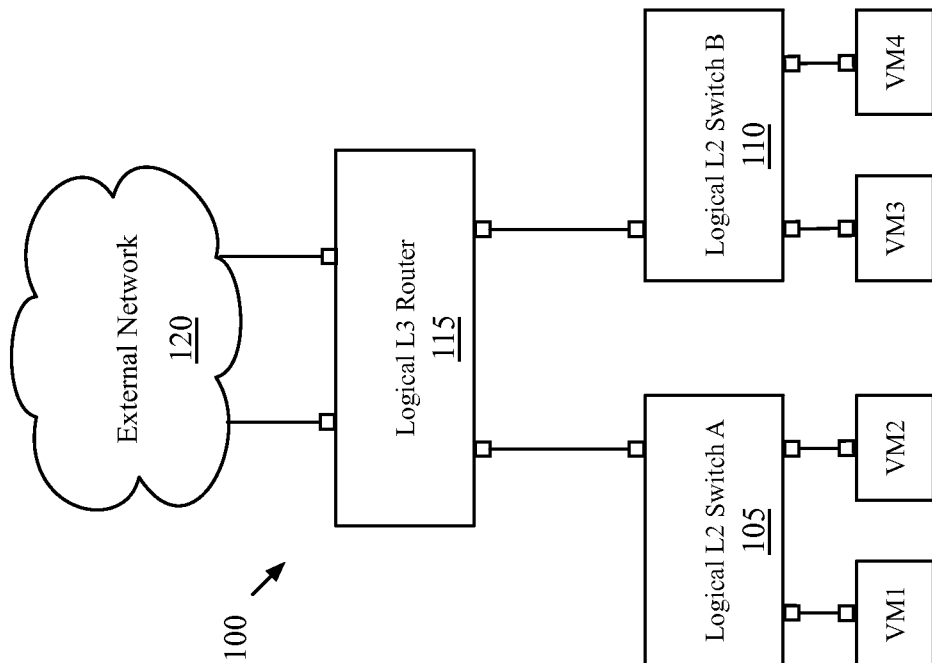
FIG. 1 illustrates a configuration view of a logical router, which represents a logical network as designed by a user.
Figure 3:
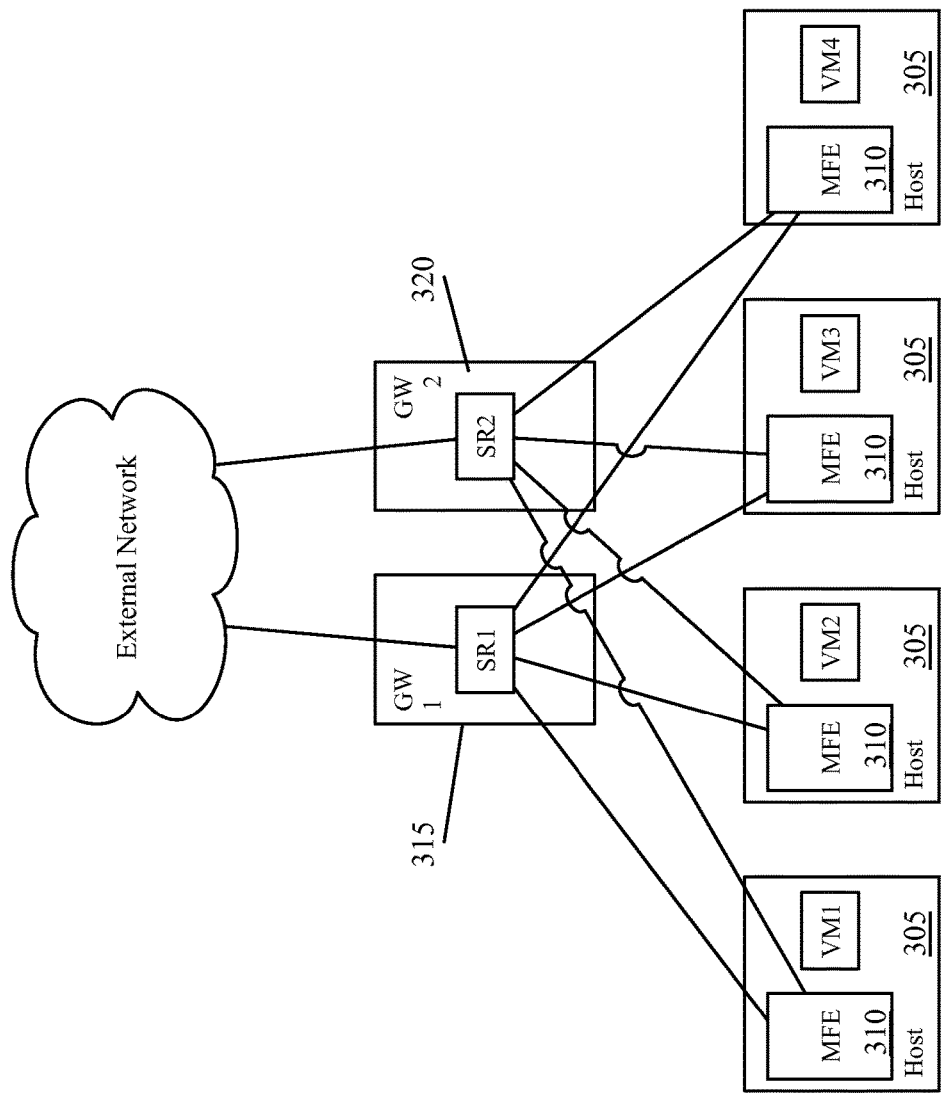
FIG. 3 illustrates a physical centralized implementation of the logical router of FIG. 1.

FIGS. 1-3 illustrate the three different views of a centralized logical router implementation. FIG. 1 specifically illustrates the configuration view, which represents a logical network 100 as designed by a user. As shown, the logical router 115 is part of a logical network 100 that includes the logical router 115 and two logical switches 105 and 110. The two logical switches 105 and 110 each have VMs that connect to logical ports. While shown as VMs in these figures, it should be understood that other types of data compute nodes (e.g., namespaces, etc.) may connect to logical switches in some embodiments. The logical router 115 also includes two ports that connect to the external physical network 120.

FIG. 2 illustrates the management plane view 200 of the logical network 100. The logical switches 105 and 110 are the same in this view as the configuration view, but the network controller has created two service routers 205 and 210 for the logical router 115. In some embodiments, these SRs operate in active-standby mode, with one of the SRs active and the other operating as a standby (in case of the failure of the active SR). Each of the logical switches 105 and 110 has a connection to each of the SRs 205 and 210. If the logical network 100 included three logical switches, then these three logical switches would each connect to both of the SRs 205 and 210.

Finally, FIG. 3 illustrates the physical centralized implementation of the logical router 100. As shown, each of the VMs that couples to one of the logical switches 105 and 110 in the logical network 100 operates on a host machine 305. The MFEs 310 that operate on these host machines are virtual switches (e.g., OVS, ESX) that operate within the hypervisors or other virtualization software on the host machines. These MFEs perform first-hop switching for the logical switches 105 and 110 for packets sent by the VMs of the logical network 100. The MFEs 310 (or a subset of them) also may implement logical switches (and distributed logical routers) for other logical networks if the other logical networks have VMs that reside on the host machines 305 as well.

The two service routers 205 and 210 each operate on a different gateway machine 315 and 320. The gateway machines 315 and 320 are host machines similar to the machines 305 in some embodiments, but host service routers rather than user VMs. In some embodiments, the gateway machines 315 and 320 each include an MFE as well as the service router, in order for the MFE to handle any logical switching necessary. For instance, packets sent from the external network 120 may be routed by the service router implementation on the gateway and then subsequently switched by the MFE on the same gateway.

The SRs may be implemented in a namespace, a virtual machine, or as a VRF in different embodiments. The SRs may operate in an active-active or active-standby mode in some embodiments, depending on whether any stateful services (e.g., firewalls) are configured on the logical router. When stateful services are configured, some embodiments require only a single active SR. In some embodiments, the active and standby service routers are provided with the same configuration, but the MFEs 310 are configured to send packets via a tunnel to the active SR (or to the MFE on the gateway machine with the active SR). Only if the tunnel is down will the MFE send packets to the standby gateway.

B. Distributed Logical Router

While the above section introduces a centralized implementation for a logical router, some embodiments use distributed logical router implementations that enable first-hop routing, rather than concentrating all of the routing functionality at the gateways. In some embodiments, the physical realization of a distributed logical router always has a DR (i.e., the first-hop routing). A distributed logical router will have SRs if either (i) the logical router is a PLR, and therefore connects to external physical networks or (ii) the logical router has services configured that do not have a distributed implementation (e.g., NAT, load balancing, DHCP in some embodiments). Even if there are no stateful services configured on a PLR, some embodiments use SRs in the implementation to help with failure handling in the case of ECMP.

Figure 4:
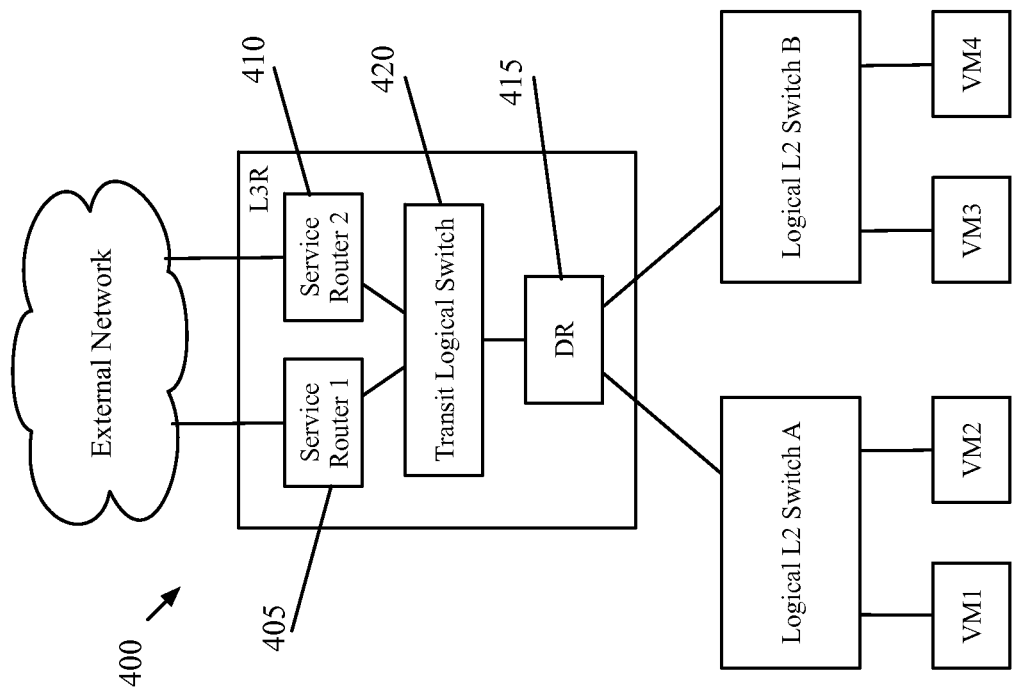
FIG. 4 illustrates a management plane view of the logical network of FIG. 1 when the logical router is implemented in a distributed manner.
Figure 5:
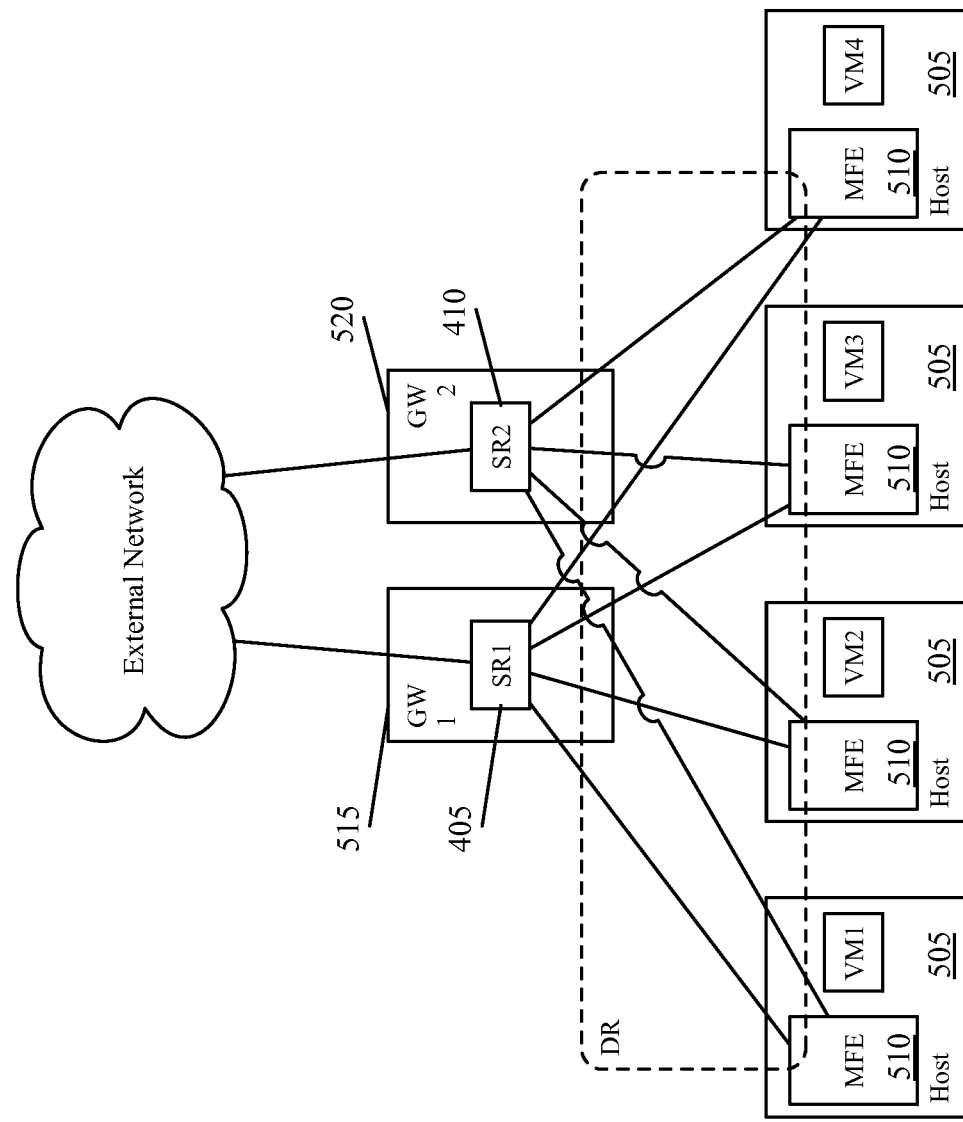
FIG. 5 illustrates a physical distributed implementation of the logical router of FIG. 1.

FIGS. 4 and 5 illustrate, respectively, the management plane view and physical implementation for a distributed logical router. The configuration view entered by the user is the same as that shown in FIG. 1 for a centralized router, with the difference being that the user (e.g., administrator) denotes that the logical router will be distributed. The control plane view 400 for the distributed implementation illustrates that, in addition to the two service routers 405 and 410, the control plane creates a distributed router 415 and a transit logical switch 420. The configuration of the northbound and southbound interfaces of the various router constructs 405-415 and their connections with the transit logical switch 420 will be described in further detail below. In some embodiments, the management plane generates separate routing information bases (RIBs) for each of the router constructs 405-415. That is, in addition to having separate objects created in the management/control plane, each of the router constructs 405 is treated as a separate router with separate routes. The transit logical switch 420 then has logical ports for each of these routers, and each of the router constructs has an interface to the transit logical switch.

FIG. 5 illustrates the physical distributed implementation of the logical router 100. As in the centralized implementation, each of the VMs that couples to one of the logical switches 105 and 110 in the logical network 100 operates on a host machine 505. The MFEs 510 perform first-hop switching and routing for the logical switches 105 and 110 and for the logical router 115 (in addition to performing switching and/or routing for other logical networks). As shown in FIG. 5, the distributed router 415 is implemented across the MFEs 510 as well as gateways 515 and 520. That is, the datapaths (e.g., in the MFEs 510, in a similar MFE in the gateways 515 and 520 or in a different form factor on the gateways) all include the necessary processing pipelines for the DR 415 (and the transit logical switch 420). The packet processing of some embodiments will be described in greater detail below.

C. Multi-Tier Topology

Figure 6:
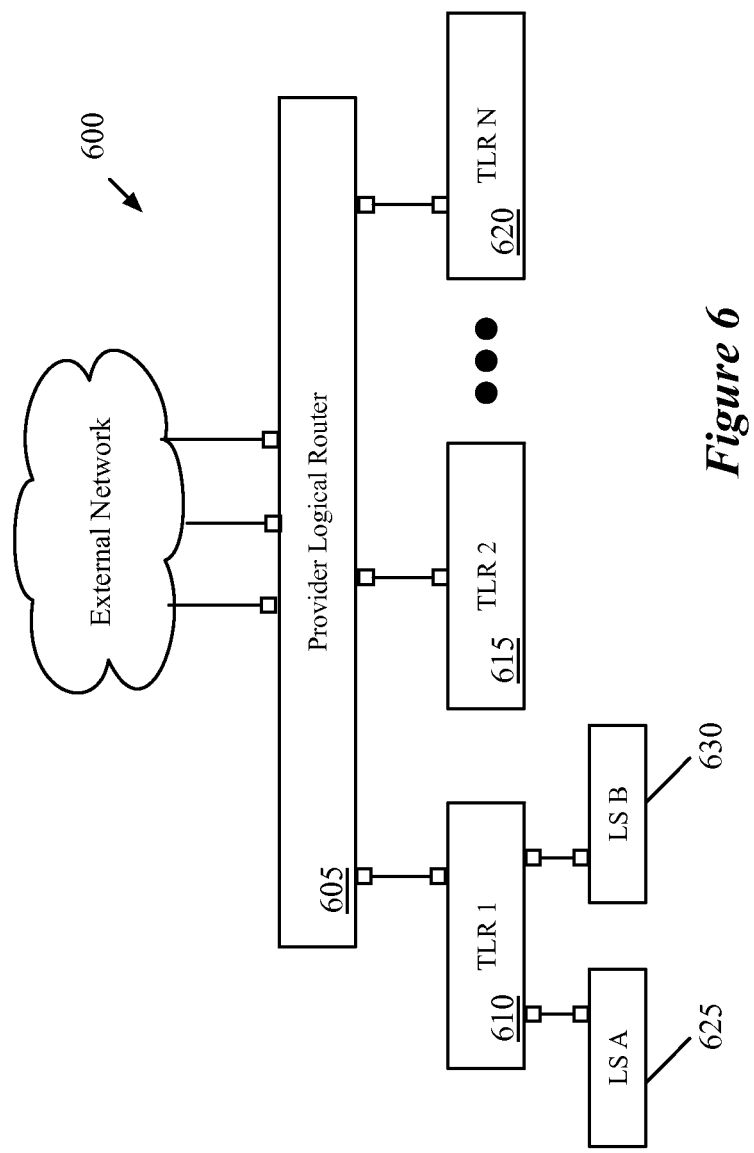
FIG. 6 conceptually illustrates a logical network with two tiers of logical routers.

The previous examples illustrate only a single tier of logical router. For logical networks with multiple tiers of logical routers, some embodiments may include both DRs and SRs at each level, or DRs and SRs at the upper level (the PLR tier) with only DRs at the lower level (the TLR tier). FIG. 6 conceptually illustrates a multi-tier logical network 600 of some embodiments, with FIGS. 7 and 8 illustrating two different management plane views of the logical networks.

FIG. 6 conceptually illustrates a logical network 600 with two tiers of logical routers. As shown, the logical network 600 includes, at the layer 3 level, a provider logical router 605, several tenant logical routers 610-620. The first tenant logical router 610 has two logical switches 625 and 630 attached, with one or more data compute nodes coupling to each of the logical switches. For simplicity, only the logical switches attached to the first TLR 610 are shown, although the other TLRs 615-620 would typically have logical switches attached (to which data compute nodes couple).

In some embodiments, any number of TLRs may be attached to a PLR such as the PLR 605. Some datacenters may have only a single PLR to which all TLRs implemented in the datacenter attach, whereas other datacenters may have numerous PLRs. For instance, a large datacenter may want to use different PLR policies for different tenants, or may have too many different tenants to attach all of the TLRs to a single PLR. Part of the routing table for a PLR includes routes for all of the logical switch domains of its TLRs, so attaching numerous TLRs to a PLR creates several routes for each TLR just based on the subnets attached to the TLR. The PLR 605, as shown in the figure, provides a connection to the external physical network 635; some embodiments only allow the PLR to provide such a connection, so that the datacenter provider can manage this connection. Each of the separate TLRs 610-620, though part of the logical network 600, are configured independently (although a single tenant could have multiple TLRs if they so chose).

Figure 7:
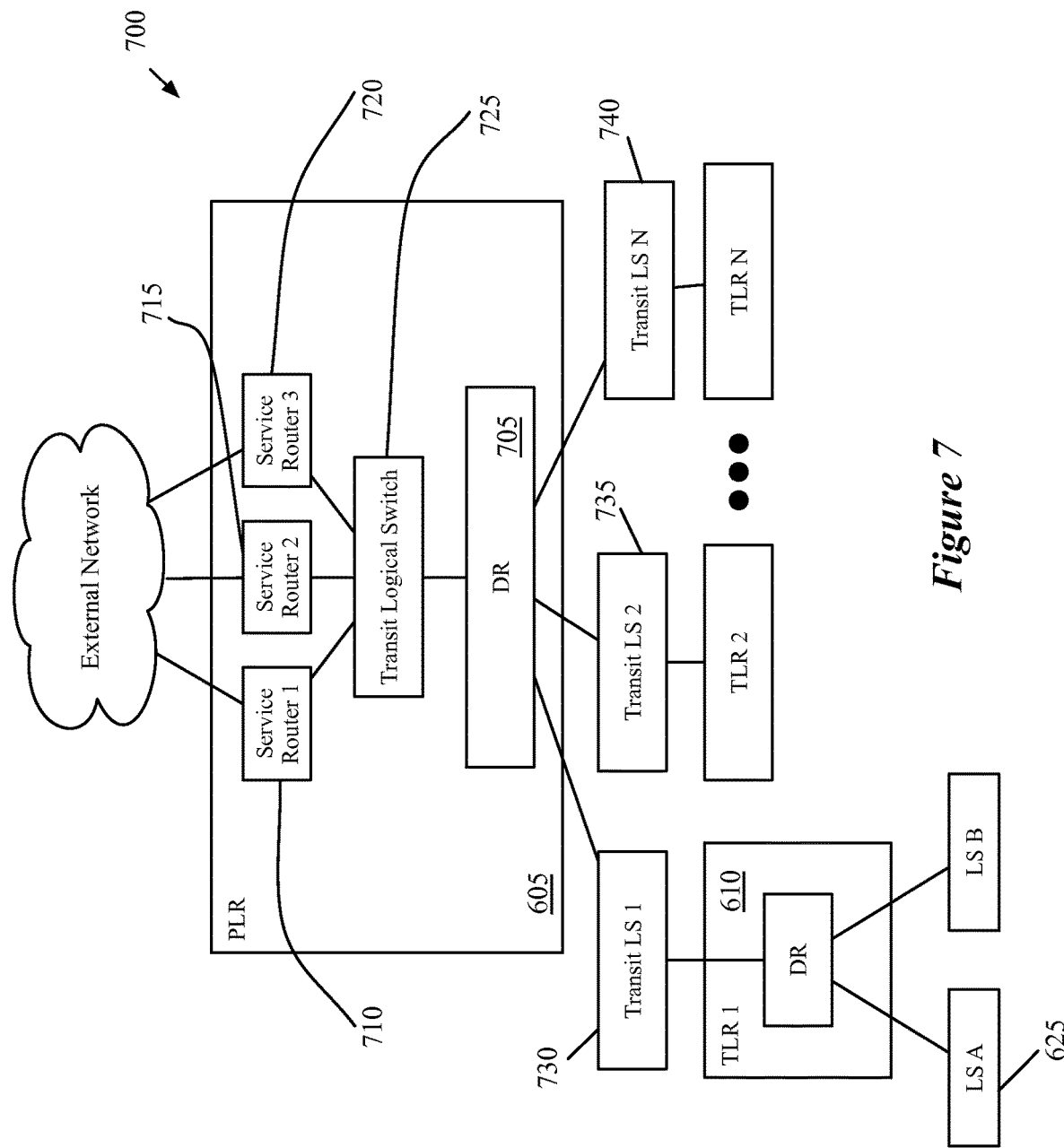
FIG. 7 illustrates the management plane view for the logical topology of FIG. 6 when a TLR in the logical network is completely distributed.
Figure 8:
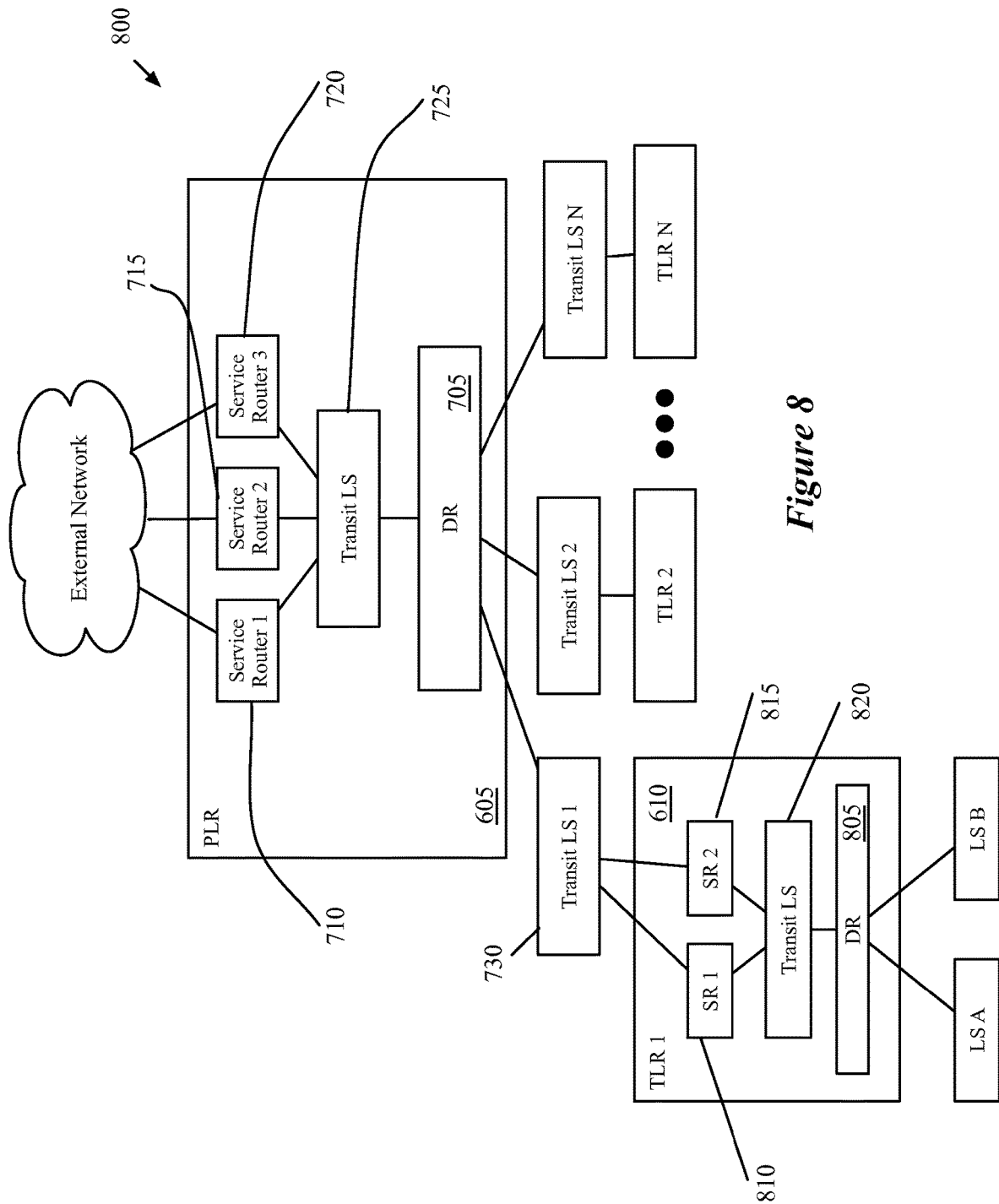
FIG. 8 illustrates the management plane view for the logical topology of FIG. 6 when the TLR in the logical network has a centralized component.

FIGS. 7 and 8 illustrate different possible management plane views of the logical network 600, depending on whether or not the TLR 605 includes a centralized component. In these examples, the routing aspects of the TLR 605 are always distributed using a DR. However, if the configuration of the TLR 605 includes the provision of stateful services, then the management plane view of the TLR (and thus the physical implementation) will include active and standby SRs for these stateful services.

Thus, FIG. 7 illustrates the management plane view 700 for the logical topology 600 when the TLR 605 is completely distributed. For simplicity, only details of the first TLR 610 are shown; the other TLRs will each have their own DR, as well as SRs in some cases. As in FIG. 4, the PLR 605 includes a DR 705 and three SRs 710-720, connected together by a transit logical switch 725. In addition to the transit logical switch 725 within the PLR 605 implementation, the management plane also defines separate transit logical switches 730-740 between each of the TLRs and the DR 705 of the PLR. In the case in which the TLR 610 is completely distributed (FIG. 7), the transit logical switch 730 connects to a DR 745 that implements the configuration of the TLR 610. Thus, as will be described in greater detail below, a packet sent to a destination in the external network by a data compute node attached to the logical switch 625 will be processed through the pipelines of the logical switch 625, the DR 745 of TLR 610, the transit logical switch 730, the DR 705 of the PLR 605, the transit logical switch 725, and one of the SRs 710-720. In some embodiments, the existence and definition of the transit logical switches 725 and 730-740 are hidden from the user that configures the network through the API (e.g., an administrator), with the possible exception of troubleshooting purposes.

FIG. 8 illustrates the management plane view 800 for the logical topology 600 when the TLR 605 has a centralized component (e.g., because stateful services that cannot be distributed are defined for the TLR). In some embodiments, stateful services such as firewalls, NAT, load balancing, etc. are only provided in a centralized manner. Other embodiments allow for some or all of such services to be distributed, however. As with the previous figure, only details of the first TLR 610 are shown for simplicity; the other TLRs may have the same defined components (DR, transit LS, and two SRs) or have only a DR as in the example of FIG. 7). The PLR 605 is implemented in the same manner as in the previous figure, with the DR 705 and the three SRs 710, connected to each other by the transit logical switch 725. In addition, as in the previous example, the management plane places the transit logical switches 730-740 between the PLR and each of the TLRs.

The partially centralized implementation of the TLR 610 includes a DR 805 to which the logical switches 625 and 630 attach, as well as two SRs 810 and 815. As in the PLR implementation, the DR and the two SRs each have interfaces to a transit logical switch 820. This transit logical switch serves the same purposes as the switch 725, in some embodiments. For TLRs, some embodiments implement the SRs in active-standby manner, with one of the SRs designated as active and the other designated as standby. Thus, so long as the active SR is operational, packets sent by a data compute node attached to one of the logical switches 625 and 630 will be sent to the active SR rather than the standby SR.

The above figures illustrate the management plane view of logical routers of some embodiments. In some embodiments, an administrator or other user provides the logical topology (as well as other configuration information) through an API. This data is provided to a management plane, which defines the implementation of the logical network topology (e.g., by defining the DRs, SRs, transit logical switches, etc.). In addition, in some embodiments a user associates each logical router (e.g., each PLR or TLR) with a set of physical machines (e.g., a pre-defined group of machines in the datacenter) for deployment. For purely distributed routers, such as the TLR 605 as implemented in FIG. 7, the set of physical machines is not important, as the DR is implemented across the managed forwarding elements that reside on hosts along with the data compute nodes that connect to the logical network. However, if the logical router implementation includes SRs, then these SRs will each be deployed on specific physical machines. In some embodiments, the group of physical machines is a set of machines designated for the purpose of hosting SRs (as opposed to user VMs or other data compute nodes that attach to logical switches). In other embodiments, the SRs are deployed on machines alongside the user data compute nodes.

In some embodiments, the user definition of a logical router includes a particular number of uplinks. Described herein, an uplink is a northbound interface of a logical router in the logical topology. For a TLR, its uplinks connect to a PLR (all of the uplinks connect to the same PLR, generally). For a PLR, its uplinks connect to external routers. Some embodiments require all of the uplinks of a PLR to have the same external router connectivity, while other embodiments allow the uplinks to connect to different sets of external routers. Once the user selects a group of machines for the logical router, if SRs are required for the logical router, the management plane assigns each of the uplinks of the logical router to a physical machine in the selected group of machines. The management plane then creates an SR on each of the machines to which an uplink is assigned. Some embodiments allow multiple uplinks to be assigned to the same machine, in which case the SR on the machine has multiple northbound interfaces.

As mentioned above, in some embodiments the SR may be implemented as a virtual machine or other container, or as a VRF context (e.g., in the case of DPDK-based SR implementations). In some embodiments, the choice for the implementation of an SR may be based on the services chosen for the logical router and which type of SR best provides those services.

In addition, the management plane of some embodiments creates the transit logical switches. For each transit logical switch, the management plane assigns a unique VNI to the logical switch, creates a port on each SR and DR that connects to the transit logical switch, and allocates an IP address for any SRs and the DR that connect to the logical switch. Some embodiments require that the subnet assigned to each transit logical switch is unique within a logical L3 network topology having numerous TLRs (e.g., the network topology 600), each of which may have its own transit logical switch. That is, in FIG. 8, transit logical switch 725 within the PLR implementation, transit logical switches 730-740 between the PLR and the TLRs, and transit logical switch 820 (as well as the transit logical switch within the implementation of any of the other TLRs) each require a unique subnet. Furthermore, in some embodiments, the SR may need to initiate a connection to a VM in logical space, e.g. HA proxy. To ensure that return traffic works, some embodiments avoid using link local IP addresses.

Some embodiments place various restrictions on the connection of logical routers in a multi-tier configuration. For instance, while some embodiments allow any number of tiers of logical routers (e.g., a PLR tier that connects to the external network, along with numerous tiers of TLRs), other embodiments only allow a two-tier topology (one tier of TLRs that connect to the PLR). In addition, some embodiments allow each TLR to connect to only one PLR, and each logical switch created by a user (i.e., not a transit logical switch) is only allowed to connect to one PLR or one TLR. Some embodiments also add the restriction that southbound ports of a logical router must each be in different subnets. Thus, two logical switches may not have the same subnet if connecting to the same logical router. Lastly, some embodiments require that different uplinks of a PLR must be present on different gateway machines. It should be understood that some embodiments include none of these requirements, or may include various different combinations of the requirements.

II. SR and DR Configuration

When a user configures a logical router, this configuration is used by the management plane to configure the SRs and DR for the logical router. For instance, the logical router 115 of FIG. 1 has four interfaces (two to the logical switches, and two uplinks). However, its distributed management plane implementation in FIG. 4 includes a DR with three interfaces and SRs with two interfaces each (a total of seven interfaces). The IP and MAC addresses and other configuration details assigned to the four interfaces as part of the logical router configuration are used to generate the configuration for the various components of the logical router.

In addition, as part of the configuration, some embodiments generate a routing information base (RIB) for each of the logical router components. That is, although the administrator defines only a single logical router, the management plane and/or control plane of some embodiments generates separate RIBs for the DR and for each of the SRs. For the SRs of a PLR, in some embodiments the management plane generates the RIB initially, but the physical implementation of the SR also runs a dynamic routing protocol process (e.g., BGP, OSPF, etc.) to supplement the RIB locally.

Some embodiments include several types of routes in the RIB of a logical routers, and therefore in the RIBs of its component routers. All routes, in some embodiments, include administrative distance values, used to determine priority, with larger values indicating lower priority types of route (i.e., if two routes exist for the same prefix, the one with a lower distance value is used). If multiple routes for the same prefix are in the RIB with the same distance value, traffic to these prefixes is spread across the different routes (e.g., using ECMP principles to balance the traffic evenly).

connected (0): prefixes configured on the logical router's ports static (1): configured by the administrator/user management plane internal (10): default routes—when a TLR is connected to a PLR, a default route pointing to the PLR is added to the RIB of the TLR; when a logical switch is connected to a TLR, the user allows the subnet to be redistributed, and the subnet is not NAT'ed, a default route pointing to the TLR for the subnet is added to the RIB of the PLR EBGP (20): the next four types are routes learned through dynamic routing protocols OSPF internal (30)

OSPF external (110)

IBGP (200).

It should be understood that not all logical routers will include both BGP and OSPF routes in some embodiments, and some logical routers may include neither. For instance, a logical router that does not include a connection to external networks may not use any routing protocol, and some logical routers may run only one type of route-sharing protocol, rather than both BGP and OSPF.

In addition, in some embodiments, the SRs of the PLRs (that use the dynamic routing protocols) merge the RIB received from the centralized controllers (containing static, connected, and management plane internal routes) with the routes learned from the physical routers (via the dynamic routing protocols). The SR locally calculates its FIB based on the incorporation of these dynamic routes in order to expedite route convergence, rather than sending the learned routes back to the centralized controller for recalculation. For the DRs, the centralized controllers of some embodiments pushes down the entire RIB, with a local control plane calculating the FIB.

A. DR Configuration

In some embodiments, the DR is always located on the southbound side (i.e., facing the data compute nodes of the logical network, rather than facing the external physical network) of the logical router implementation. Unless the logical router has no centralized component, the uplinks of the logical router will not be configured for the DR, whose northbound interfaces instead couple to the transit logical switch that is part of the logical router.

Figure 9:
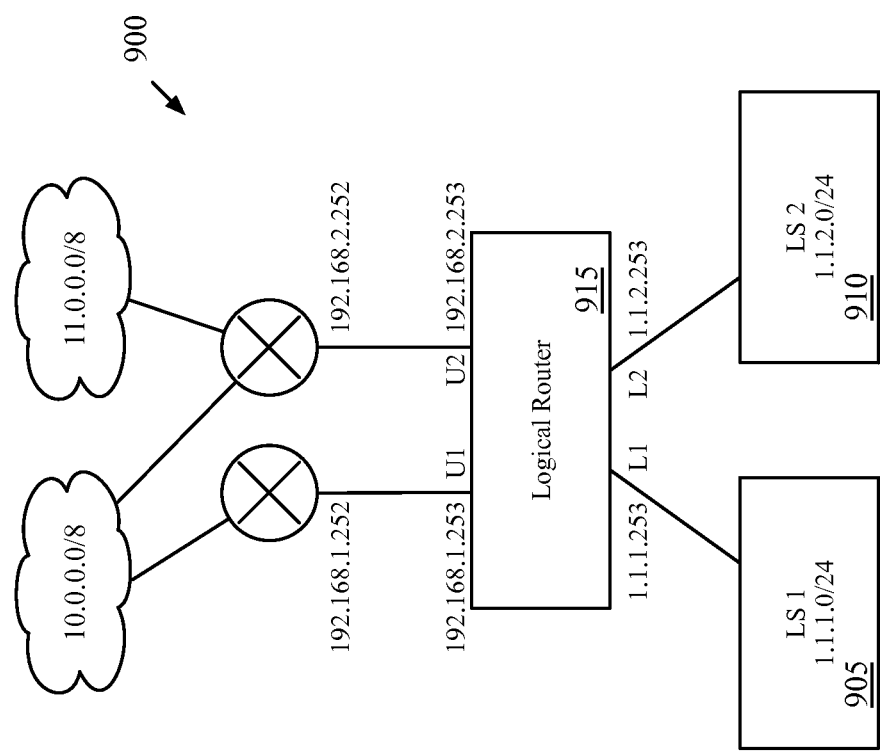
FIG. 9 conceptually illustrates a more detailed configuration of a logical network topology, including the network addresses and interfaces assigned by an administrator.

FIG. 9 conceptually illustrates the more detailed configuration of a logical network topology 900, including the network addresses and interfaces assigned by an administrator. As shown, the logical switches 905 and 910 are each assigned their own subnets, 1.1.1.0/24 and 1.1.2.0/24, and all of the data compute nodes attached to the logical switches 905 will have IP addresses in the corresponding subnet. The logical router 915 has an interface L1 to the first logical switch 905, with an IP address of 1.1.1.253 that is the default gateway for the data compute nodes in the subnet 1.1.1.0/24. The logical router 915 also has a second interface L2 to the second logical switch 910, with an IP address of 1.1.2.253 that is the default gateway for the data compute nodes in the subnet 1.1.2.0/24.

The northbound side of the logical router 915 has two uplinks, U1 and U2. The first uplink U1 has an IP address of 192.168.1.252 and connects to a first physical router 920 with an IP address of 192.168.1.252. The second uplink U2 has an IP address of 192.168.2.253 and connects to a second physical router 925 with an IP address of 192.168.2.252. The physical routers 920 and 925 are not actually part of the logical network, but rather connect the logical network to the external network. Though in the illustrated case each of the uplinks connects to a single, different physical router, in some cases each of the uplinks will connect to the same set of several physical routers. That is, both U1 and U2 might both connect to both of the physical routers 920 and 925. Some embodiments require that each of the external routers to which the uplinks connect provide the same connectivity, although this is not the case in the illustrated example. Instead, the first physical router 920 connects to the subnet 10.0.0.0/8, while the second router 925 connects to both the subnet 10.0.0.0/8 and 11.0.0.0/8.

For a logical router with a distributed component, some embodiments configure the DR as follows. The southbound interfaces are configured in the same way as the southbound interfaces of the logical router. These interfaces are those that connect to a logical switch in the logical topology, or to a lower-level logical router (e.g., the southbound interfaces of a PLR may connect to TLRs). The DR of some embodiments is allocated a single northbound interface, which is assigned an IP address and a MAC address. Assuming the logical router has one or more SRs, the northbound interface of the DR connects to a transit logical switch.

The RIB of the DR is assigned connected routes based on the subnets configured on its various southbound and northbound interfaces. These are the subnets configured for (i) the transit logical switch configured between the DR and SR components of the logical router, and (ii) any logical switches on its southbound interfaces. These logical switches on the southbound interfaces may be user-defined logical domains to which data compute nodes connect, or transit logical switches located between the DR of a PLR and any TLRs that connect to the PLR.

In addition, any static routes that egress from an uplink of the logical router are included in the RIB of the DR; however, these routes are modified such that the next-hop IP address is set to that of the uplink's SR. For example, a static route "a.b.c.0/24 via 192.168.1.252" (192.168.1.252 being an address of an external physical network router) is modified to be "a.b.c.0/24 via [IP of SR southbound interface]". Static routes that egress from a southbound interface of the logical router, on the other hand, are included in the RIB of the DR unmodified. In some embodiments, for each SR of the logical router, a default route of the type management plane internal is added to the RIB of the DR. Instead, in other embodiments, dynamic routes learned by a particular SR are added to the RIB, with the next-hop IP address modified to be the IP of the southbound interface of the particular SR. This is an alternative to the default route, because the management plane internal type would otherwise have a higher priority than the dynamic routes learned by the SR. However, for TLRs, the SRs do not run a dynamic routing protocol in some embodiments, so the default route with a next-hop IP address pointing to the interface of the active SR is used instead.

Figure 10:
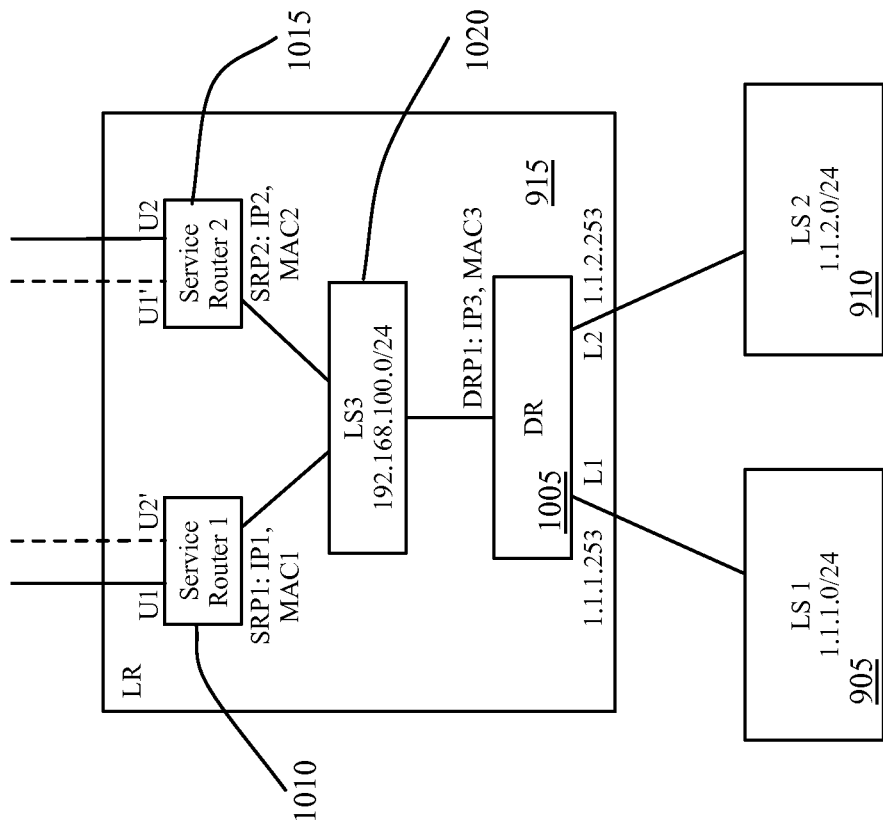
FIG. 10 illustrates the configuration of the logical topology of FIG. 9 by the management plane.

FIG. 10 illustrates the configuration 1000 of the logical topology 900 by the management plane. As shown, the logical switches 905 and 910 are configured as indicated by the user configuration. As in the previous examples, the logical router 915 includes a DR 1005, two SRs 1010 and 1015, and a transit logical switch 1020. The DR is assigned the two southbound interfaces of the logical router 905, which connect to the logical switches 905 and 910. The transit logical switch is assigned a subnet of 192.168.100.0/24, which needs to satisfy the requirement that it be unique among the logical switches that logically connect (directly or indirectly) to the logical router 905. Each of the three management plane router constructs 1005-1015 also includes an interface that connects to the transit logical switch, and has an IP address in the subnet of the transit logical switch. The northbound interfaces U1 and U2 are assigned to the two SRs 1010 and 1015, the configuration of which is described below.

Using the rules of some embodiments described above for generating the RIB, the RIB of the DR 1005 includes the following routes:

1.1.1.0/24 output to L1
1.1.2.0/24 output to L2
192.168.100.0/24 output to DRP1
192.168.1.0/24 via IP1
192.168.2.0/24 via IP2
10.0.0.0/8 via IP1
10.0.0.0/8 via IP2
11.0.0.0/8 via IP2
0.0.0.0/0 via IP1
0.0.0.0/0 via IP2

The above routes include three connected routes, for the logical switch domains connected to the DR (1.1.1.0/24, 1.1.2.0/24, and 192.168.100.0/24). In addition, the subnet on which the first uplink is located (192.168.1.0/24) is reached via the southbound interface of the first SR 1010 (IP1), while the subnet on which the second uplink is located (192.168.2.0/24) is reached via the southbound interface of the second SR 1015 (IP2). In addition, three static routes have been added by the user for the logical router 915, which the management plane automatically modifies for the DR 1005. Specifically, the routes include the network 10.0.0.0/8 via the southbound interface of either of the SRs, and the network 11.0.0.0/8 via the southbound interface of SR2. Lastly, default routes pointing to these same southbound interfaces are included. The IP addresses IP1, IP2, and IP3 that are created by the management plane for the ports of the logical router constructs that interface with the transit logical switch all are in the subnet 192.168.100.0/24.

In addition to configuring the RIB of the DR, the management plane also assigns MAC addresses to the DR interfaces in some embodiments. In some embodiments, some or all of the physical routing elements (e.g., software modules) in the physical network that implement the DR functionality only support a single MAC address. In this case, because the MAC of a DR port may come from that of a logical router port visible to users, this imposes requirements on how the management plane allocates MAC addresses for the logical router ports. Thus, in some embodiments, all DR/SR ports that connect to any logical switch which has user data compute nodes or SRs connected must share a common MAC address. In addition, if a DR/SR port is connected to another DR/SR or to a physical network, this port is assigned a unique MAC address in some embodiments (this assignment rule ignoress the transit logical switch when determining whether a DR/SR port is connected to another DR/SR port)

B. SR Configuration

As with the DR of a logical router, the management plane also configures each SR of the logical router with a separate RIB and interfaces. As described above, in some embodiments SRs of both PLRs and TLRs may deliver services (i.e., functionalities beyond simply routing, such as NAT, firewall, load balancing, etc.) and the SRs for PLRs also provide the connection between the logical network and external physical networks. In some embodiments, the implementation of the SRs is designed to meet several goals. First, the implementation ensures that the services can scale out—that is, the services assigned to a logical router may be delivered by any of the several SRs of the logical router. Second, some embodiments configure the SR in such a way that the service policies may depend on routing decisions (e.g., interface-based NAT). Third, the SRs of a logical router have the ability to handle failure (e.g., of the physical machine on which an SR operates, of the tunnels to that physical machine, etc.) among themselves without requiring the involvement of a centralized control plane or management plane (though some embodiments allow the SRs to operate at reduced capacity or in a suboptimal manner). Finally, the SRs ideally avoid unnecessary redirecting amongst themselves. That is, an SR should forward packets to the external physical network if it has the ability do so locally, only forwarding the packet to a different SR if necessary. Of course, the forwarding between SRs should avoid packet loops.

As shown in FIG. 10, each SR has one southbound interface that connects to the transit logical switch 1020 that resides between the SRs and the DR. In addition, in some embodiments, each SR has the same number of northbound interfaces as the logical router. That is, even though only one uplink may be assigned to the physical machine on which the SR operates, all of the logical router interfaces are defined on the SR. However, some of these interfaces are local interfaces while some of them are referred to as dummy interfaces.

The local northbound interfaces, in some embodiments, are those through which a packet can egress directly from the SR (e.g., directly to the physical network). An interface configured based on the uplink (or one of the uplinks) assigned to the SR is a local interface. On the other hand, an interface configured based on one of the other uplinks of the logical router assigned to a different SR is referred to as a dummy interface. Providing the SR with configuration for the dummy interfaces allows for the first-hop MFEs to send packets for any of the uplinks to any of the SRs, with that SR able to process the packets even if the packet is not destined for its local interface. Some embodiments, after processing a packet at one of the SRs for a dummy interface, forward the packet to the appropriate SR where that interface is local, in order for the other SR to forward the packet out to the external physical network. The use of dummy interfaces also allows the centralized controller (or set of controllers) that manages the network to push service policies that depend on routing decisions to all of the SRs, thereby allowing services to be delivered by any of the SRs.

As discussed below in Section IV, in some embodiments the SRs exchange routing information with the physical network (e.g., using a route advertisement protocol such as BGP or OSPF). One goal of this route exchange is that irrespective of which SR routes a packet towards the physical network, the routing decision should always point to either a local interface of the SR or a dummy interface that corresponds to an uplink of the logical router on a different SR. Thus, the policies associated with the logical router uplink can be applied by the SR even when the uplink is not assigned to that SR, enabling the scale out of stateful services. In some embodiments, the routes received from a peer SR will have a larger distance value than routes learned directly from a physical next-hop router, thereby ensuring that a SR will send a packet to its peer SR only when it cannot send the packet directly to a physical network router.

For a logical router that has one or more centralized components, some embodiments configure the SR as follows. For northbound interfaces, the SR has the same number of such interfaces as the logical router, and these interfaces each inherit the IP and MAC address of the corresponding logical router interfaces. A subset of these interfaces are marked as local interfaces (those for which the uplink is assigned to the SR), while the rest of the interfaces are marked as dummy interfaces. In some embodiments, the service policies defined for the logical router are pushed equivalently to all of the SRs, as these are configured in the same way from the network and interface perspective. The dynamic routing configuration for a particular logical router port/uplink are transferred to the local interface of the SR to which that particular uplink is assigned.

Each SR, as mentioned, is assigned a single southbound interface (also a local interface) that connects to a transit logical switch, with each SR's southbound interface connecting to the same transit logical switch. The IP addresses for each of these southbound interfaces is in the same subnet as the northbound interface assigned to the DR (that of the transit logical switch). Some embodiments differentiate the assignment of IP addresses between the SRs depending on whether the SRs are in active-active or active-standby mode. For active-active mode (i.e., when all of the SRs are treated as equals for routing purposes), different IP and MAC addresses are assigned to the southbound interfaces of all of the SRs. On the other hand, in active-standby mode, the same IP is used for both of the southbound interfaces of the two SRs, while each of the interfaces is assigned a different MAC address.

As indicated in the above subsection regarding DRs, users may configure static routes for the logical router. A static route (or a connected route) of the logical router that egresses from an uplink is copied to the RIB of the SR. The distance metric for such a route is unmodified if the uplink through which the route egresses is assigned to the SR; however, if the uplink is a dummy interface on the SR, then some embodiments add a value to this metric so that the SR will prefer a route that egresses from its local interface when the network can be reached without redirecting the packet to a different SR through a dummy interface. In addition, the SRs (of a top-level logical router) may learn dynamic routes and place these in their RIB (though some embodiments perform this locally, without involving the centralized controllers). In some embodiments, the dynamic routes learned from peer SRs are installed without this adjustment of the distance metric, because by default the metric for routes learned from IBGP (SR to SR peering) or OSPF are larger than the metric for routes learned from EBGP.

For each southbound interface of the logical router, some embodiments add a route for the corresponding network to the RIB of each SR. This route points to the northbound DR interface as its next-hop IP address. Furthermore, any other routes configured for the logical router that egress from the southbound interface are copied to the SR with the same northbound DR interface as the next-hop IP address.

Returning to the example of FIG. 10, as the logical router 915 has two uplinks, the management plane defines two service routers 1010 and 1015. The first service router 1010 has a local interface for U1 and a dummy interface for U2, referred to as U2'. Similarly, the second service router 1015 has a local interface for U2 and a dummy interface, U1', for the first uplink U1. Each of these SRs is assigned a southbound interface, with different IP and MAC addresses (as the SRs are in an active-active configuration). The IP addresses IP1 (for the first SR 1010) and IP2 (for the second SR 1015) are in the subnet 192.1.100.0/24, as is IP3 (the northbound interface of the DR 1005).

Using the rules of some embodiments, and assuming the a routing protocol (e.g., BGP) is enabled for the SRs, the RIB of the first SR 1010 will include the following routes:
    10.0.0.0/8 output to U1 via 192.168.1.252, metric 20 (via EBGP)
    10.0.0.0/8 output to U2' via 192.168.2.252, metric 200 (via IBGP)
    11.0.0.0/8 output to U2' via 192.168.2.252, metric 200 (via IBGP)
    192.168.1.0/24 output to U1, metric 0 (connected)
    192.168.100.0/24 output to SRP1, metric 0 (connected)
    1.1.1.0/24 via IP3, metric 10 (management plane internal)
    1.1.2.0/24 via IP3, metric 10 (management plane internal)
Similarly, the RIB of the second SR 1015 will include the following routes:
    10.0.0.0/8 output to U2 via 192.168.2.252, metric 20 (via EBGP)
    10.0.0.0/8 output to U1' via 192.168.1.252, metric 200 (via IBGP)
    11.0.0.0/8 output to U2 via 192.168.2.252, metric 20 (via EBGP)
    192.168.2.0/24 output to U2, metric 0 (connected)
    192.168.100.0/24 output to SRP2, metric 0 (connected)
    1.1.1.0/24 via IP3, metric 10 (management plane internal)
    1.1.2.0/24 via IP3, metric 10 (management plane internal)

C. Management Plane Processes

Figure 11:
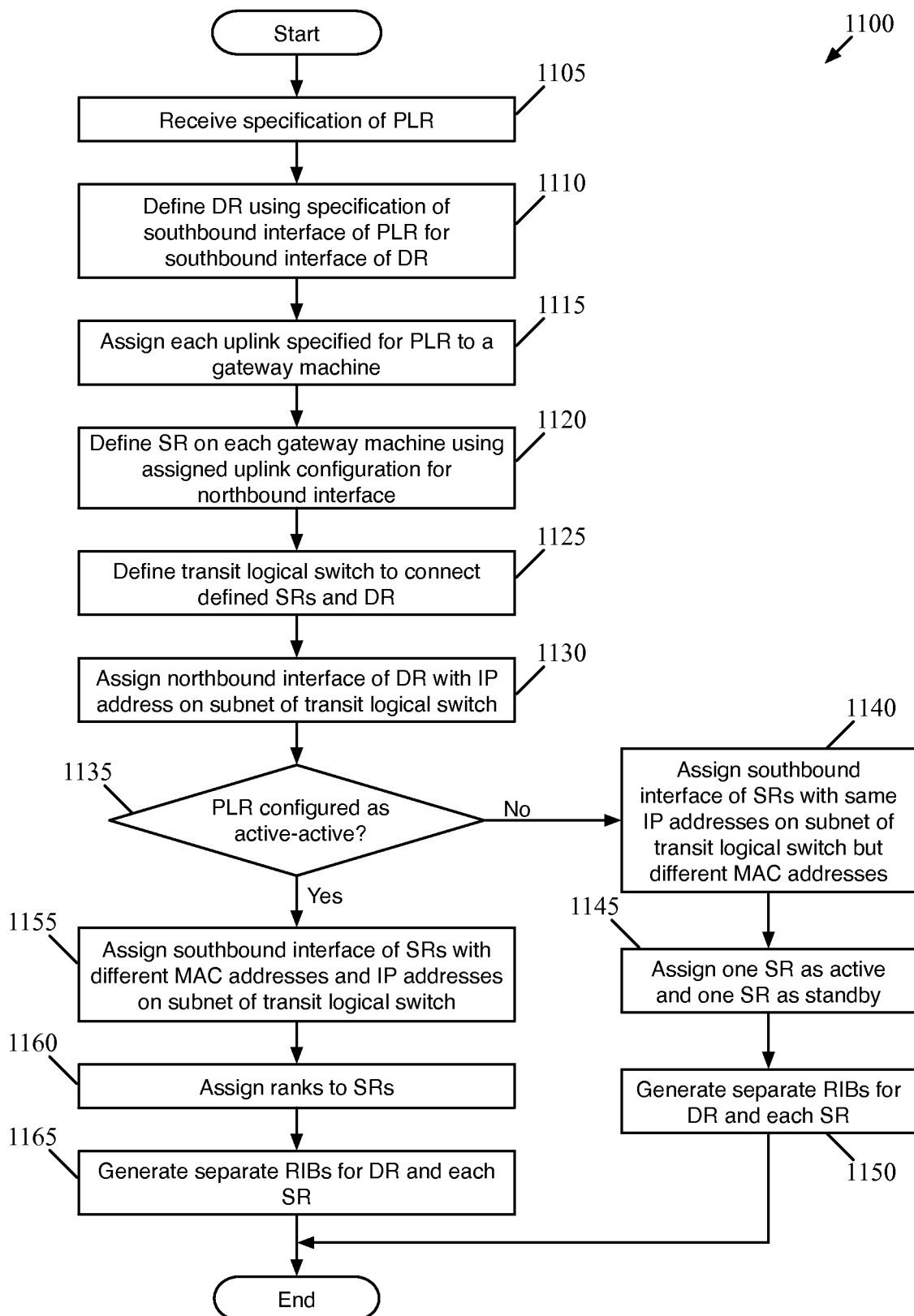
FIG. 11 conceptually illustrates a process of some embodiments for configuring a PLR based on a user specification.

FIG. 11 conceptually illustrates a process 1100 of some embodiments for configuring a PLR based on a user specification. In some embodiments, the process 1100 is performed by the management plane (e.g., a set of modules at a centralized controller that manages the networks of a datacenter). The management plane performs the configuration process, then uses a centralized control plane of the controller (or of a different network controller) to distribute the data to various local control planes on the various host machines that implement the configured logical router.

As shown, the process 1100 begins by receiving (at 1105) a specification of a PLR. The specification of a PLR (or definition of the PLR) is based on administrator input to define the PLR (e.g., an administrator employed by the owner of the datacenter). In some embodiments, this specification includes definitions of any services the PLR should provide, whether the PLR will be configured in active-active or active-standby mode (though some embodiments automatically use active-active mode unless stateful services are configured), how many uplinks are configured for the PLR, the IP and MAC addresses of the uplinks, the L2 and L3 connectivity of the uplinks, the subnets of any southbound interfaces of the PLR (one interface if the PLR is intended for a two-tier topology, and any number of interfaces if user logical switches will connect directly in a single-tier topology), any static routes for the RIB of the PLR, as well as other data. It should be understood that different embodiments may include different combinations of the listed data or other data in the configuration data for a PLR.

The process 1100 then defines (at 1110) a DR using this configuration data. This assumes that the PLR will not be completely centralized, in which case no DR is generated by the management plane. For the southbound interface of the DR, the management plane uses the southbound interface configuration of the PLR. That is, the IP address and MAC address for the DR are those specified for the logical router.

In addition, the process assigns (at 1115) each uplink specified for the PLR to a gateway machine. As described above, some embodiments allow (or require) the user to specify a particular set of physical gateway machines for the location of the SRs of the logical router. In some embodiments, the set of gateway machines might be together within a particular rack or group of racks of servers, or are otherwise related, with tunnels connecting all of the machines in a set. The management plane then assigns each of the uplinks to one of the gateway machines in the selected set. Some embodiments allow multiple uplinks to be assigned to the same gateway machine (so long as the logical router does not have only two uplinks configured in active-standby mode), while other embodiments only allow a single uplink per gateway machine for the PLR irrespective of whether in active-active or active-standby.

After assigning the uplinks to gateway machines, the process 1100 defines (at 1120) a SR on each of the selected gateway machines. For each SR, the process uses the configuration for the uplink assigned to that gateway machine as the configuration for the northbound interface of the SR. This configuration information includes the IP and MAC address of the uplink, as well as any uplink-specific policies. It should be understood that, for situations in which different policies and/or L3 connectivity are allowed and used between the different uplinks, some embodiments also configure dummy interfaces on the SRs in order to redirect packets if needed.

The process additionally defines (at 1125) a transit logical switch to connect the defined SRs and DR. In some embodiments, the management plane assigns a unique VNI (logical switch identifier) to the transit logical switch. In addition, some embodiments require that the subnet assigned to the transit logical switch be unique among the logical network topology. As such, the transit logical switch must use a subnet different from any user-defined logical switches that interface directly with the PLR, as well as all transit logical switches between the PLR and any TLRs that connect to the PLR, all transit logical switches within these TLRs, and any user-defined logical switches that connect to these TLRs.

Next, the process 1100 assigns (at 1130) a northbound interface to the DR. The northbound interface, in some embodiments, is assigned both a MAC address and an IP address (used for packets sent internally between the components of the PLR). In some embodiments, the IP address is in the subnet that was assigned to the transit logical switch defined at 1125. The configuration of the transit logical switch includes an association of this MAC address with one of its logical ports.

The process then determines (at 1135) whether the PLR is configured in active-active mode (or active-standby mode). As noted above, in some embodiments, this determination is made by the administrator as part of the configuration settings for the PLR. In other embodiments, the management plane automatically defines the SRs in active-active configuration for PLRs unless stateful services are set up, in which case the SRs are defined in active-standby mode.

When the PLR is configured in active-standby mode, the process assigns (at 1140) southbound interfaces of each of the two SRs (or more than two SRs, if there are multiple standbys). In the active-standby case, these southbound interfaces all have the same IP address, which is in the subnet of the transit logical switch defined at operation 1125. Although the two interfaces receive the same IP address, some embodiments assign different MAC addresses, so as to differentiate the two as destinations for northbound packets routed by the DR. In other embodiments, the same MAC addresses are used as well, with different mechanisms in the case of failover used as described below.

The process then assigns (at 1145) one of the SRs as active and one of the SRs as standby. Some embodiments make this determination randomly, while other embodiments attempt to balance the assignment of active and standby SRs across the gateway machines, as described in greater detail in U.S. Patent Publication 2015/0063364, filed Jan. 28, 2014, which is incorporated herein by reference. The SR assigned as active will respond to ARP requests for the southbound interface, and will advertise prefixes to the external physical network from its northbound interface. The standby SR, on the other hand, will not respond to ARP requests (so as to avoid receiving northbound traffic), and will not advertise prefixes (but will maintain a BGP session in order to receive routes from the external network in case of failure of the active SR.

Lastly, the process 1100 generates (at 1150) separate RIBs for the DR and for each of the SRs. The separate RIBs are generated based on the configuration data in the manner described in the previous subsections, as well as below in Section V. The process then ends. In some embodiments, the management plane also calculates the FIB centrally, while in other embodiments the local control planes (operating on the host and gateway machines) performs the RIB traversal to generate the FIB to use in actual forwarding of packets by the logical router components. In either case, the RIB is updated on the SRs based on the dynamic routes learned from the external network, and that data is propagated to the DR via central controllers. The calculation of the FIB by network controllers of some embodiments is described in greater detail in U.S. patent application Ser. No. 14/214,545, filed Mar. 14, 2014, now issued as U.S. Pat. No. 9,313,129, which is incorporated herein by reference.

On the other hand, when the PLR is configured in active-active (ECMP) mode, the process assigns (at 1155) southbound interfaces of each of the SRs. In the active-active cases, these southbound interfaces are each assigned different IP addresses in the subnet of the transit logical switch defined at operation 1125, as well as different MAC addresses. With different IP addresses, each of the SRs can handle northbound packets based on the IP address selected for a given packet by the DR pipeline in a host machine.

Next, the process assigns (at 1160) ranks to the SRs. As described in detail below, the SRs use the ranks in case of failover to determine which SR will take over responsibilities for a failed SR. In some embodiments, the next-highest ranked SR takes over for a failed SR by taking over its southbound interfaces so as to attract northbound traffic that would otherwise be sent to the IP address of the failed SR.

Finally, the process generates (at 1165) separate RIBs for the DR and for each of the SRs. The separate RIBs are generated based on the configuration data in the manner described in the previous subsections, as well as below in Section IV. The process then ends. In some embodiments, the management plane also calculates the FIB centrally, while in other embodiments the local control planes (operating on the host and gateway machines) performs the RIB traversal to generate the FIB to use in actual forwarding of packets by the logical router components. In either case, the RIB is updated on the SRs based on the dynamic routes learned from the external network, and that data is propagated to the DR via central controllers.

Figure 12:
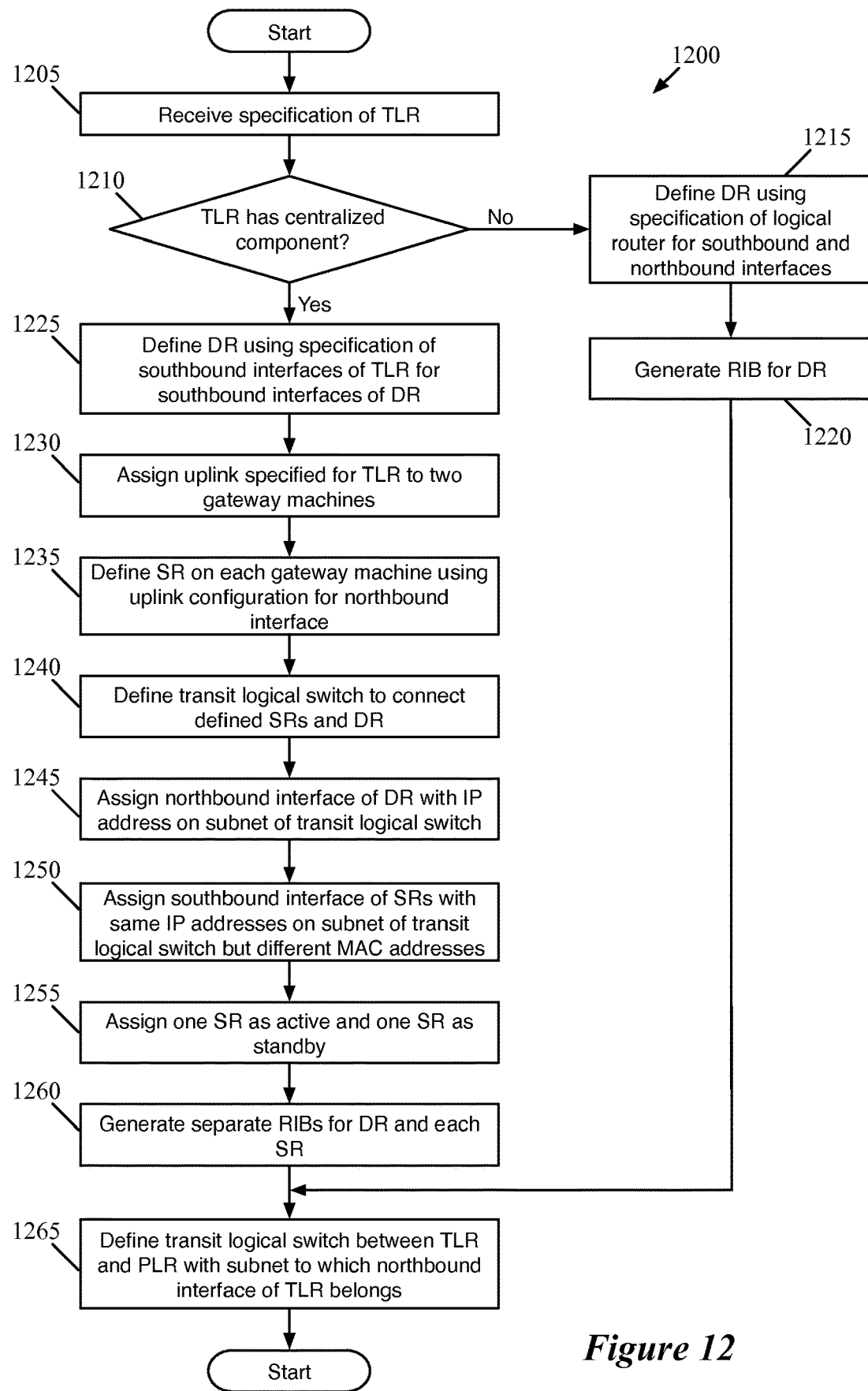
FIG. 12 conceptually illustrates a process of some embodiments for configuring a TLR based on a user specification.

The above description of FIG. 11 indicates the operations of the management plane to generate the various components for a PLR (upper tier logical router). FIG. 12 conceptually illustrates a process 1200 of some embodiments for configuring a TLR based on a user specification. In some embodiments, the process 1200 is performed by the management plane (e.g., a set of modules at a centralized controller that manages the networks of a datacenter). The management plane performs the configuration process, then uses a centralized control plane of the controller (or a different network controller) to distribute the data to various local control planes on the various host machines that implement the configured logical router.

As shown, the process begins by receiving (at 1205) a specification of a TLR. The specification of a TLR (or definition of the TLR) is based on administrator input to define the TLR (e.g., an administrator employed by a tenant of the datacenter). In some embodiments, this specification includes definitions of any services the TLR should provide, which PLR the TLR should connect to through its uplink, any logical switches that connect to the TLR, IP and MAC addresses for the interfaces of the TLR, any static routes for the RIB of the TLR, as well as other data. It should be understood that different embodiments may include different combinations of the listed data or other data in the configuration data for the TLR.

The process 1200 then determines (at 1210) whether the TLR has a centralized component. In some embodiments, if the TLR does not provide stateful services, then no SRs are defined for the TLR, and it is implemented only in a distributed manner. On the other hand, some embodiments require SRs in active-standby mode when stateful services are provided, as shown in this figure.

When the TLR does not provide stateful services or otherwise require a centralized component, the process defines (at 1215) a DR using the specification of the logical router for both the southbound and northbound interfaces. The DR may have numerous southbound interfaces, depending on how many logical switches are defined to connect to the TLR. On the other hand, some embodiments restrict TLRs to a single northbound interface that sends packets to and receives packets from a PLR. The process also generates (at 1220) a RIB for the DR. The RIB for the DR will include all of the routes for the logical router, generated as described above.

On the other hand, when the TLR provides stateful services or requires a centralized component for other reasons, the process defines (at 1225) a DR using the received configuration data. For the southbound interfaces of the DR, the management plane uses the southbound interface configurations of the TLR. That is, the IP address and MAC address for each southbound interface are those specified for the ports of the logical router to which the various logical switches couple.

In addition, the process assigns (at 1230) the uplink specified for the TLR to two gateway machines. While some embodiments allow TLRs to operate in active-active mode with multiple uplinks, the process 1200 is for embodiments that restrict the TLRs to a single uplink in active-standby mode. As described above, some embodiments allow (or require) the user to specify a particular set of physical gateway machines for the location of the SRs of the logical router. In some embodiments, the set of gateway machines might be together within a particular rack or group of racks of servers, or are otherwise related, with tunnels connecting all of the machines in a set. The management plane then assigns the uplink to two of the gateway machines in the selected set.

After assigning the uplinks to gateway machines, the process 1200 defines (at 1235) a SR on each of the two gateway machines. For each SR, the management plane uses the configuration for the single uplink as the configuration for the northbound interface of the SR. As there is only one northbound interface, the process applies the same configuration to both of the SRs. That is, not only is the same IP address used for both northbound interfaces, but the services on the interfaces are configured in the same manner as well. However, different MAC addresses are used for the northbound interfaces, so as to differentiate the active and standby SRs.

The process additionally defines (at 1240) a transit logical switch to connect the defined SRs and DR. In some embodiments, the management plane assigns a unique VNI (logical switch identifier) to the transit logical switch. In addition, some embodiments require that the subnet assigned to the transit logical switch be unique among the logical network topology. As such, the management plane must assign the transit logical switch a subnet different than any of the user-defined logical switches that interface with the TLR, as well as any transit logical switches between the TLR (or other TLRs) and the PLR, as well as all transit logical switches within other TLRs that connect to the same PLR, the transit logical switch within the PLR, and the user-defined logical switches that connect to the other TLRs.

Next, the process assigns (at 1245) a northbound interface to the DR. This interface, in some embodiments, is assigned both a MAC address and an IP address (used for packets sent internally between the components of the TLR). In some embodiments, the IP address is in the same subnet that was assigned to the transit logical switch at 1140. The process also assigns (at 1250) southbound interfaces of each of the two SRs. As this is an active-standby configuration, these southbound interfaces have the same IP address, which is in the subnet of the transit logical switch defined at operation 1140. Although the two interfaces receive the same IP address, some embodiments assign different MAC addresses, so as to differentiate the two as destinations for northbound packets routed by the DR. In other embodiments, the same MAC addresses are used as well, with different mechanisms in the case of failover used as described below.

The process 1200 then assigns (at 1255) one of the SRs as active and one of the SRs as standby. Some embodiments make this determination randomly, while other embodiments attempt to balance the assignment of active and standby SRs across the gateway machines. The SR assigned as active will respond to ARP requests for the southbound (from the DR of this TLR) and northbound (from the DR of the PLR) interfaces. The standby SR, on the other hand, will not respond to ARP requests (so as to avoid receiving northbound or southbound traffic).

Next, the process generates (at 1260) separate RIBs for the DR and for each of the SRs. The separate RIBs are generated based on the configuration data in the manner described in the previous subsections, as well as below in Section IV. In some embodiments, the management plane also calculates the FIB centrally, while in other embodiments the local control planes (operating on the host and gateway machines) performs the RIB traversal to generate the FIB to use in actual forwarding of packets by the logical router components. In either case, the RIB is updated on the SRs based on the dynamic routes learned from the external network, and that data is propagated to the DR via central controllers.

Irrespective of whether the TLR is generated with or without SRs, the process 1200 defines (at 1265) another transit logical between the TLR and the PLR to which it connects. This transit logical switch has a unique VNI, and a subnet to which the uplink IP address of the TLR belongs. In addition, an interface on the DR of the PLR is created in the same subnet to connect to the transit logical switch. The process then ends.

It should be understood that while the processes 1100 and 1200 illustrate a specific order for performing these various operations, these processes are merely conceptual. In various different embodiments, the management plane may perform the actual operations in various different orders, or even perform some of the operations in parallel. For instance, the management plane could define the transit logical switch first, prior to defining the SR or DR at all, could define all of the logical router components completely before assigning them to separate physical machines, etc.

III. Packet Processing

The above sections describe the configuration of the various logical router components by the management plane. These logical router components (as well as the logical switches, both those defined by the user and those defined by the management plane for connecting logical router components) are implemented in the datacenter by various managed forwarding elements (MFEs). As shown in FIG. 5, for example, the data compute nodes attached to the user-defined logical switches reside on physical host machines, on which MFEs operate (e.g., within the virtualization software of the host machine) as first-hop packet processing elements. These MFEs implement the logical switches of a logical network as well as the DRs, in some embodiments.

Figure 13:
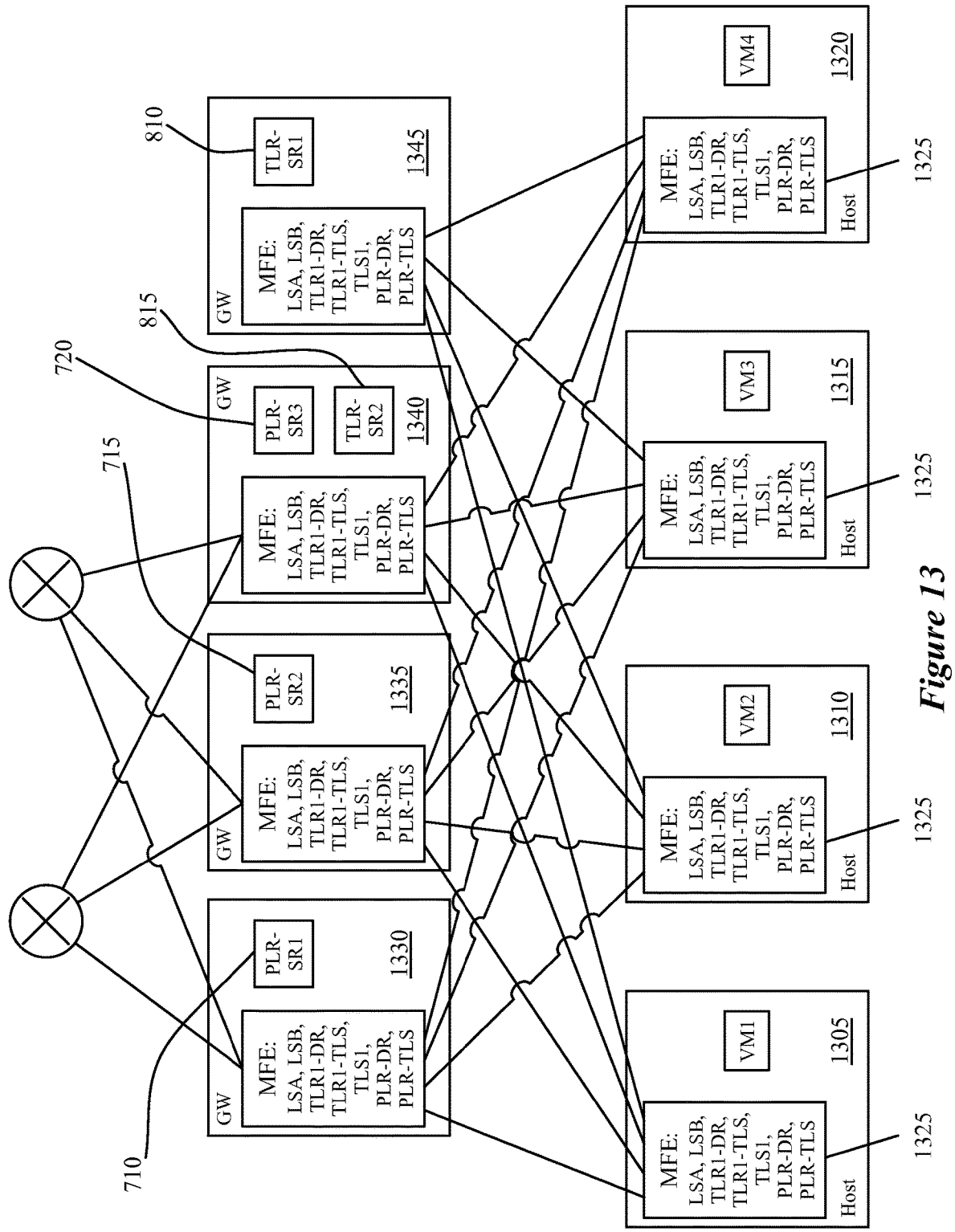
FIG. 13 conceptually illustrates a physical implementation of the management plane constructs for the two-tiered logical network shown in FIG. 8, in which the TLR and the PLR both include SRs as well as a DR.

FIG. 13 conceptually illustrates a physical implementation of the management plane constructs for a two-tiered logical network shown in FIG. 8, in which the TLR 610 and the PLR 605 both include SRs as well as a DR. It should be understood that this figure only shows the implementation of the TLR 610, and not the numerous other TLRs, which might be implemented on numerous other host machines, and the SRs of which might be implemented on other gateway machines.

This figure assumes that there are two VMs attached to each of the two logical switches 625 and 630, which reside on the four physical host machines 1305-1320. Each of these host machines includes a MFE 1325. These MFEs may be flow-based forwarding elements (e.g., Open vSwitch) or code-based forwarding elements (e.g., ESX), or a combination of the two, in various different embodiments. These different types of forwarding elements implement the various logical forwarding elements differently, but in each case they execute a pipeline for each logical forwarding element that may be required to process a packet.

Thus, as shown in FIG. 13, the MFEs 1325 on the physical host machines include configuration to implement both logical switches 625 and 630 (LSA and LSB), the DR 805 and transit logical switch 815 for the TLR 610, and the DR 705 and transit logical switch 725 for the PLR 605. Some embodiments, however, only implement the distributed components of the PLR on the host machine MFEs 1325 (those that couple to the data compute nodes) when the TLR for a data compute node residing on the host machine does not have a centralized component (i.e., SRs). As discussed below, northbound packets sent from the VMs to the external network will be processed by their local (first-hop) MFE, until a transit logical switch pipeline specifies to send the packet to a SR. If that first SR is part of the TLR, then the first-hop MFE will not perform any PLR processing, and therefore the PLR pipeline configuration need not be pushed to these MFEs by the centralized controller(s). However, because of the possibility that one of the TLRs 615-620 may not have a centralized component, some embodiments always push the distributed aspects of the PLR (the DR and the transit LS) to all of the MFEs. Other embodiments only push the configuration for the PLR pipelines to the MFEs that are also receiving configuration for the fully distributed TLRs (those without any SRs).

In addition, the physical implementation shown in FIG. 13 includes four physical gateway machines 1330-1345 (also called edge nodes, in some embodiments) to which the SRs of the PLR 605 and the TLR 610 are assigned. In this case, the administrators that configured the PLR 605 and the TLR 610 selected the same group of physical gateway machines for the SRs, and the management plane assigned one of the SRs for both of these logical routers to the third gateway machine 1340. As shown, the three SRs 710-720 for the PLR 605 are each assigned to different gateway machines 1330-1340, while the two SRs 810 and 815 for the TLR 610 are also each assigned to different gateway machines 1340 and 1345.

This figure shows the SRs as separate from the MFEs 1350 that operate on the gateway machines. As indicated above, different embodiments may implement the SRs differently. Some embodiments implement the SRs as VMs (e.g., when the MFE is a virtual switch integrated into the virtualization software of the gateway machine, in which case the SR processing is performed outside of the MFE. On the other hand, some embodiments implement the SRs as VRFs within the MFE datapath (when the MFE uses DPDK for the datapath processing). In either case, the MFE treats the SR as part of the datapath, but in the case of the SR being a VM (or other data compute node), sends the packet to the separate SR for processing by the SR pipeline (which may include the performance of various services). As with the MFEs 1325 on the host machines, the MFEs 1350 of some embodiments are configured to perform all of the distributed processing components of the logical network.

A. Single-Tier Topology

Figure 14A:
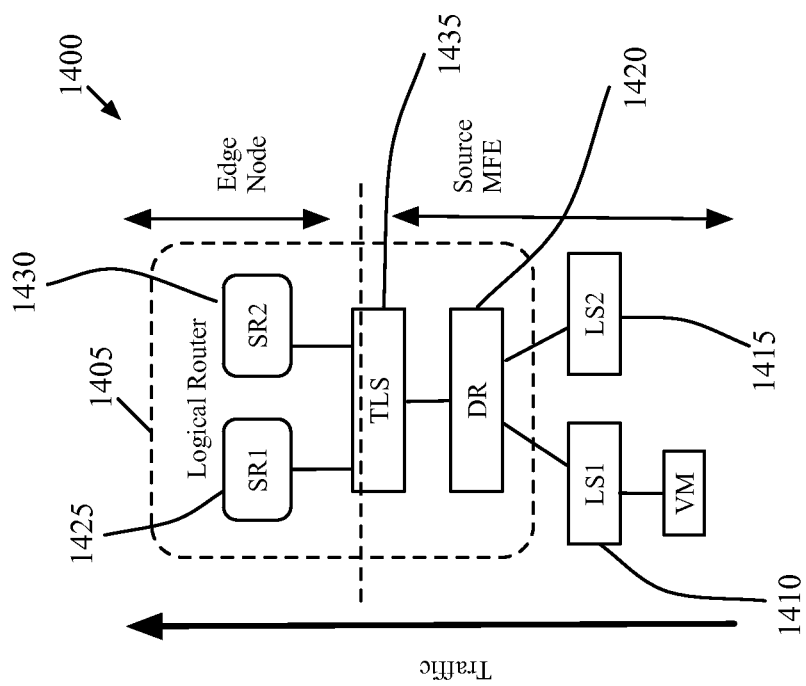
FIGS. 14A-B illustrate examples of traffic that egresses from the logical network (northbound traffic) and ingresses to the logical network (southbound traffic), respectively, for a logical topology with a single tier of logical routers.
Figure 14B:
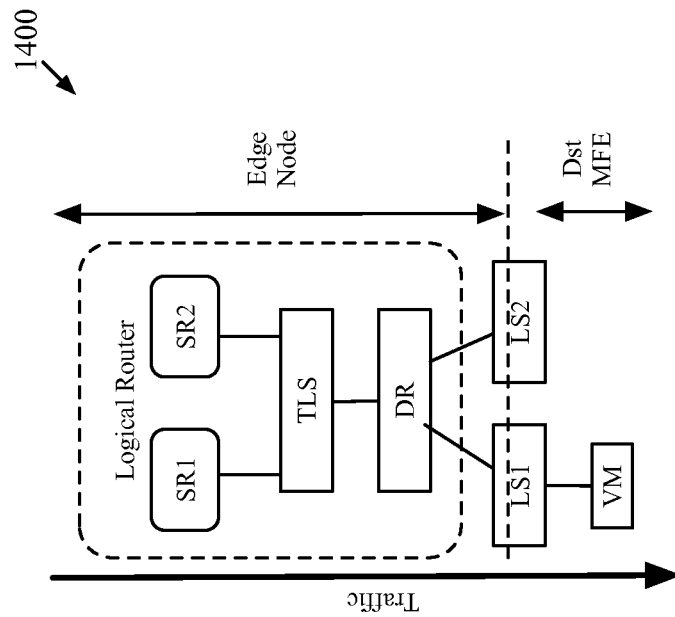

The packet processing pipelines for various examples will now be described. FIGS. 14A and 14B illustrate examples of traffic that egresses from the logical network (northbound traffic) and ingresses to the logical network (southbound traffic), respectively, for a logical topology with a single tier of logical routers. These figures illustrate a single tier topology 1400 with a logical router 1405 (with a connection to external networks) and two logical switches 1410 and 1415. As described above, the logical router 1405 includes a DR 1420, two SRs 1425 and 1430, and a transit logical switch 1435.

In some embodiments, east-west traffic (i.e., traffic from a data compute node on LS1 to a data compute node on LS2 is handled primarily at the first-hop MFE (e.g., the MFE of the virtualization software on the host machine for the source data compute node), then tunneled to the destination MFE. As such, the packets do not pass through the SRs, and thus does not receive any services provided by these SRs. Other embodiments, however, allow for routing policies that send certain east-west traffic to the SRs for processing.

As shown in FIG. 14A, when a VM or other data compute node on a machine sends a northbound packet, the datapath on the MFE initially runs the source logical switch pipeline (e.g., based on the ingress port through which the packet is received, the source MAC address, etc.). This pipeline specifies to forward the packet to the DR 1420, the pipeline for which also takes place on the source MFE. This pipeline identifies one of the SRs 1425 and 1430 as its next hop. In the active-standby case, the pipeline identifies the active SR; in the active-active case, some embodiments use ECMP to select one of the SRs, as described below. Next, the source MFE executes the pipeline for the transit logical switch 1435, which specifies to tunnel the packet to the appropriate gateway machine (edge node) that hosts the selected SR. The gateway machine (e.g., the MFE on the gateway machine) receives the packet, decapsulates it (to remove the tunneling data), and identifies the SR based on the logical context information on the packet (e.g., the VNI of the transit logical switch 1435) as well as the destination MAC address that corresponds to the SR's southbound interface. The SR pipeline is then executed (by the MFE in some embodiments, and by a VM implementing the SR in other embodiments). The SR pipeline sends the packet to the physical network. If the SR pipeline specifies a local interface, then the packet is delivered directly to the physical network; on the other hand, if the SR pipeline specifies a dummy interface, the packet may be redirected through a tunnel to a different gateway machine to which the specified interface is local.

FIG. 14B illustrates the packet processing for ingressing (southbound) packets. The packet is received at one of the gateway machines on which an SR operates. The MFE at the gateway machine identifies the destination SR based on the VLAN and destination MAC address of the incoming packet, and runs the SR pipeline (e.g., sends the packet to the VM on which the SR operates, or runs the pipeline directly in the datapath, depending on how the SR is implemented). The SR pipeline identifies the DR 1420 as its next hop. The MFE then executes the transit logical switch 1435 pipeline, which forwards the packet to the DR, as well as the DR pipeline, which routes the packet to its destination. The destination logical switch pipeline (i.e., one of the logical switches 1410 and 1415) is also executed, which specifies to tunnel the packet to the MFE of the host machine on which the destination VM resides. After decapsulating the packet, the destination MFE delivers the packet to the VM.

B. Two-Tier Topology without Centralized Services in TLR

Figure 15B:
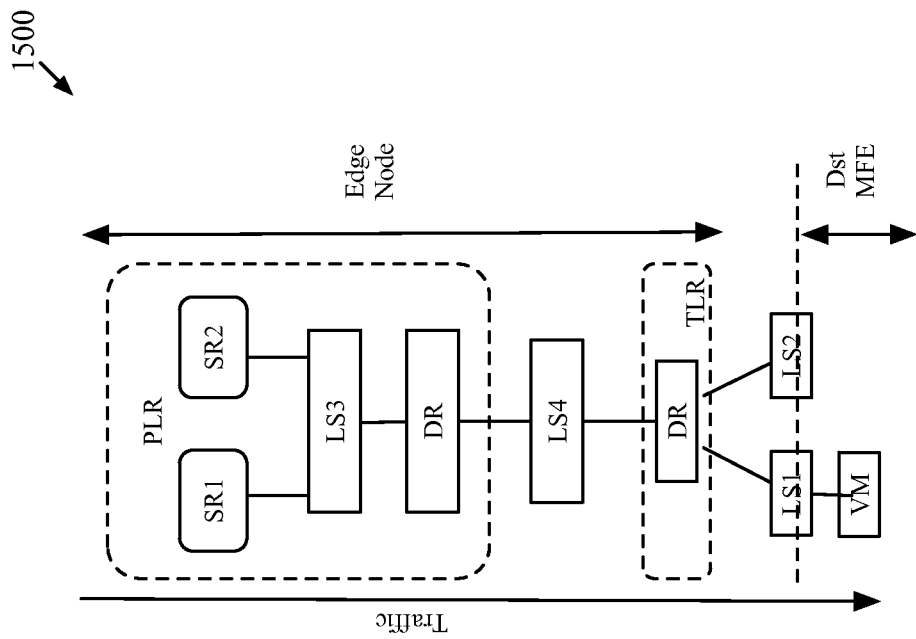
FIGS. 15A-B illustrate examples of northbound and southbound traffic for a two-tier logical topology, with no centralized services provided in the lower (TLR) tier.
Figure 15A:
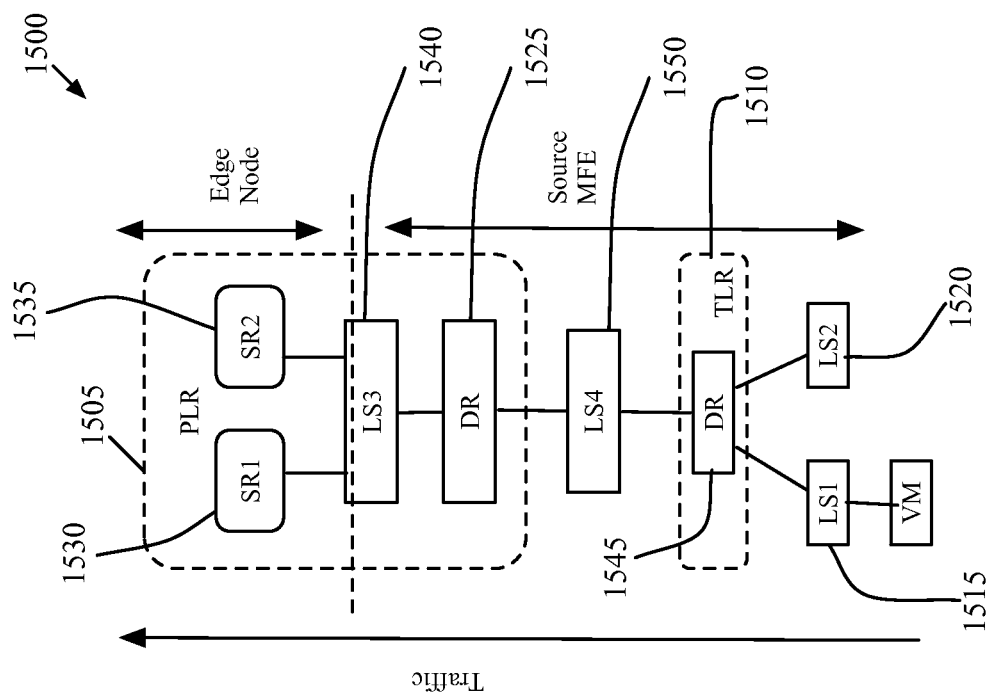

FIGS. 15A and 15B illustrate examples of northbound and southbound traffic for a two-tier logical topology, with no centralized services provided in the lower (TLR) tier. These figures illustrate a two-tier topology 1500 with a PLR 1505 (with two uplinks to external networks), a TLR 1510, and two logical switches 1515 and 1520. The PLR 1505 includes a DR 1525, two SRs 1530 and 1535, and transit logical switch 1540 that connects the three components. The TLR 1510 does not have centralized services configured, and therefore only includes a single DR component 1545. Between the DR 1545 of the TLR and the DR 1525 of the PLR the management plane inserts a second transit logical switch 1550.

The processing pipeline for the two-tier topology without stateful services at the TLR level is similar to the single-tier topology pipeline, but with additional pipelines executed at the first-hop MFE. As shown in FIG. 15A, when a VM or other data compute node on a machine sends a northbound packet, the datapath on the MFE of the source machine initially runs the source logical switch pipeline (e.g., based on the ingress port through which the packet is received, the source MAC address, etc.). This pipeline specifies to forward the packet to the DR 1545 of the TLR 1510, the pipeline for which is also executed on the source (first-hop) MFE. This pipeline identifies the southbound interface of the DR 1525 as its next-hop, and the source MFE then executes the pipeline for the transit logical switch 1550 interposed between the two DRs. This logical switch pipeline logically forwards the packet to the DR port (the upper-layer DR), and the source MFE then executes the pipeline for the DR 1525 as well. This pipeline identifies one of the SRs 1530 and 1535 as the next hop for the packet. In the active-standby case, the pipeline identifies the active SR; in the active-active case, some embodiments use ECMP to select one of the SRs, as described below.

Next, the source MFE executes the pipeline for the transit logical switch 1540 internal to the PLR 1505, which specifies to tunnel the packet to the appropriate gateway machine (edge node) that hosts the selected SR (identified by the transit logical switch pipeline based on MAC address, in some embodiments). The gateway machine (e.g., the MFE on the gateway machine) receives the packet, decapsulates it (to remove the tunneling encapsulation), and identifies the SR based on the logical context information on the packet (e.g., the VNI of the transit logical switch 1540) as well as the destination MAC address that corresponds to the SR's southbound interface. The SR pipeline is then executed (by the MFE in some embodiments, and by a VM implementing the SR in other embodiments). The SR pipeline sends the packet to the physical network. If the SR pipeline specifies a local interface, then the packet is delivered directly to the physical network; on the other hand, if the SR pipeline specifies a dummy interface, the packet may be redirected through a tunnel to a different gateway machine to which the specified interface is local.

Southbound traffic is also handled similarly to the single-tier case. As shown in FIG. 15B, a southbound packet is received at one of the gateway machines on which an SR of the PLR 1505 operates. The MFE at the gateway machine identifies the destination SR (some embodiments allow the gateway machines to host numerous SRs for various different logical routers) based on the VLAN and destination MAC address of the incoming packet, and runs the SR pipeline (e.g., sends the packet to the VM on which the SR operates, or runs the pipeline directly in the datapath, depending on how the SR is implemented). The SR pipeline identifies the DR 1525 as its next hop, so the MFE then executes the transit logical switch 1540 pipeline, which forwards the packet to the DR 1525. The DR 1525 pipeline identifies the TLR DR 1545 as its next hop, and thus the MFE on the edge node also executes the pipeline of the transit logical switch 1550 and subsequently, that of the DR 1545. The lower-level DR pipeline routes the packet to its destination, so the destination logical switch pipeline (i.e., one of the logical switches 1515 and 1520) is also executed, which specifies to tunnel the packet to the MFE of the host machine on which the destination VM resides. After decapsulating the packet, the destination MFE delivers the packet to the VM.

For east-west traffic, in some embodiments, the source MFE handles all of the processing, as in the single-tier case. Within a TLR (e.g., from a VM on the first logical switch 1513 to a VM on the logical switch 1520, only the single DR pipeline (and the two logical switch pipelines) needs to be executed. For packets sent across TLRs, the source MFE executes all three of the DR pipelines in some embodiments (so long as the destination TLR-DR and logical switch pipelines are implemented on the source MFE. As in the single-tier case, some embodiments allow east-west traffic to be sent to the SRs on the gateway machines, while other embodiments do not enable the centralized services for east-west traffic.

C. Two-Tier Topology with Centralized Services in TLR

Finally, FIGS. 16A and 16B illustrate examples of northbound and southbound traffic for a two-tier logical topology with centralized services provided in the lower (TLR) tier by SRs. These figures illustrate a two-tier topology 1600 with a PLR 1605 (with two uplinks to external networks), a TLR 1610 (with centralized services), and two logical switches 1615 and 1620. The PLR 1605 includes a DR 1625, two SRs 1630 and 1635, and a transit logical switch 1640 that connects the three components. The TLR also includes a DR 1645, two SRs 1650 and 1655, and a transit logical switch 1660 that connects its three components. The management plane also has inserted a third transit logical switch 1665 between the SRs 1650 and 1655 of the TLR 1610 and the DR 1625 of the PLR 1605.

Unlike the previous examples, in which nearly the entire packet processing pipeline was performed at the first hop, packet processing for the logical topology 1600 is spread across three machines for both northbound and southbound traffic. As shown in FIG. 16A, when a VM or other data compute node on a machine sends a northbound packet, the datapath on the MFE of the source machine initially runs the source logical switch pipeline, as in the previous examples. This pipeline specifies to forward the packet to the DR 1645 of the TLR 1610, the pipeline for which is also executed on the source (first-hop) MFE. This DR pipeline identifies the southbound interface of one of the SRs 1650 and 1655 as its next hop IP address. In some embodiments, the TLR SRs are always configured in active-standby mode, so the next hop is the same for both of the SRs but the packet is routed to the MAC address of the active SR.

The source MFE then executes the pipeline for the transit logical switch 1660 internal to the TLR 1610, which specifies to tunnel the packet to the appropriate gateway machine (edge node) that hosts the selected SR of the TLR 1610 (which the transit logical switch identifies based on the destination MAC address after routing by the DR 1645 pipeline). The gateway machine (e.g., the MFE on the gateway machine) receives the packet, decapsulates it, and identifies the SR based on the logical context information on the packet (e.g., the VNI of the transit logical switch 1660 as well as the destination MAC address that corresponds to the SR's southbound interface. The SR pipeline (including any of the stateful services) is then executed (e.g., by the MFE or a VM implementing the SR), which specifies the southbound interface of the DR 1625 as its next hop address. The transit logical switch 1665 pipeline is executed on the current edge node (Edge Node 2 in the figure), as is the DR pipeline of the PLR 1605. This DR pipeline identifies one of the SRs 1630 and 1635 as the next hop for the packet, in the same manner as described in the previous examples.

The edge node MFE executes the pipeline for the transit logical switch 1640 internal to the PLR 1605, which specifies to tunnel the packet to the appropriate gateway machine that hosts the selected SR 1630 or 1635 (identified by the transit logical switch pipeline based on MAC address, in some embodiments). The gateway machine (e.g., the MFE on the gateway machine) receives the packet, decapsulates it (to remove the tunneling encapsulation), and identifies the SR based on the logical context information on the packet (e.g., the VNI of the transit logical switch 1640) as well as the destination MAC address that corresponds to the SR's southbound interface. The SR pipeline is then executed (by the MFE in some embodiments, and by a VM implementing the SR in other embodiments). The SR pipeline sends the packet to the physical network. If the SR pipeline specifies a local interface, then the packet is delivered directly to the physical network; on the other hand, if the SR pipeline specifies a dummy interface, the packet may be redirected through a tunnel to a different gateway machine to which the specified interface is local.

Southbound traffic processing is also distributed across three machines (unless the SR for the PLR 1605 and the SR for the TLR 1610 are located on the same gateway machine). As shown in FIG. 16B, a southbound packet is received at one of the gateway machines on which an SR of the PLR 1605 operates. The MFE at the gateway machine identifies the destination SR based on the VLAN and destination MAC address of the incoming packet, and runs the SR pipeline (e.g., sends the packet to the VM on which the SR operates, or runs the pipeline directly in the datapath, depending on how the SR is implemented). The SR pipeline identifies the DR 1625 as its next hop, so the MFE then executes the transit logical switch 1640 pipeline, which forwards the packet to the DR 1625. The DR 1625 pipeline identifies the northbound interface of one of the SRs 1650 and 1655 of the TLR 1610 as its next hop. In the active-standby case, the active SR is selected.

The MFE on the first gateway machine then executes the transit logical switch 1665 pipeline, which specifies to tunnel the packet to a second gateway machine (Edge Node 2) on which this second SR that performs stateful services for the TLR 1610 is located. The second gateway machine (e.g., the MFE on the second gateway machine) decapsulates the packet and identifies the destination SR based on the VNI and MAC address on the packet. The MFE runs the SR pipeline (either in its datapath or by sending the packet to a VM on the gateway machine), which identifies the DR 1645 as the next hop. The MFE thus executes the transit logical switch 1660 pipeline, which forwards the packet to the DR 1645, and then executes this DR pipeline as well. The DR pipeline routes the packet to its destination, so the destination logical switch pipeline (one of the logical switches 1615 and 1620) is executed, and the packet is tunneled to the MFE of the host machine on which the destination VM resides. After decapsulating the packet, the destination MFE delivers the packet to the VM.

For east-west traffic within a TLR, the source logical switch, DR, and destination logical switch pipelines are all executed at the first-hop MFE, then the packet is tunneled to the destination MFE. IF the packet requires processing by the centralized services, only the source logical switch, DR, and transit logical switch pipelines are performed at the first-hop MFE, with the SR pipeline, transit logical switch (again), DR (again), and destination logical switch pipelines performed by the gateway machine before tunneling the packet to the destination. For cross-TLR traffic, the packet starts out in the same way, with the first-hop MFE performing the source logical switch, DR, and transit logical switch pipelines to select a SR. The gateway machine on which the selected SR runs then executes the SR pipeline to identify the DR of the PLR, the transit logical switch pipeline between the TLR and the PLR, the DR of the PLR pipeline (which identifies a next hop as a component of a different TLR), and at least the transit logical switch between the PLR and the destination TLR. If the destination TLR has only a DR, then that pipeline is also executed at the first gateway machine, along with the destination logical switch, before tunneling the packet to its destination MFE. If the destination TLR has SRs, the transit logical switch specifies to tunnel the packet to the gateway machine for a selected SR of the destination TLR. That second gateway machine executes the SR pipeline, the transit logical switch pipeline internal to the destination TLR, the DR pipeline for that TLR, and the destination logical switch pipeline, before tunneling the packet to the destination MFE.

The same principle applies in all of the above cases, which is to perform the processing pipelines as early as possible. Thus, all of the pipelines for a given packet are performed at the first-hop MFE (e.g., the hypervisor-based virtual switch that receives a packet from a VM on that hypervisor), until the packet needs to be sent to a SR pipeline only present on a specific gateway machine. That gateway machine then performs all of the processing it can, until the packet is sent out to a physical network or to a different gateway machine (or to its destination for east-west traffic).

D. Additional Logical Router Behavior

Much like physical routers, logical routers are implemented to perform typical routing functionalities such as decrementing the time to live (TTL) for packets that it routes, and performing ARP. In some embodiments, a logical router with both DR and SRs only decrements a packet once, by the first component that acts upon the packet. Thus, for northbound and east-west traffic, the DR decrements the TTL, whereas the SR decrements the TTL for southbound traffic. In some embodiments, the DR implementation has instructions to only decrement TTL for packets received on its southbound interface, and the SRs have similar instructions to only decrement TTL for packets received on their northbound interfaces. The component that handles decrementing the TTL for a packet also handles generating an ICMP error message if the TTL is dropped to zero.

The logical routers of some embodiments do not forward broadcast packets, and thus do not support directed broadcast (a feature typically disabled on physical routers as well). However, if an IP broadcast packet is received on the logical network to which it is addressed, the logical router of some embodiments treats itself as a destination of the packet.

For ARP, in some embodiments, the logical router rewrites the MAC address of the inner packet (i.e., the packet before a tunnel encapsulation is appended to the packet) to indicate which transport node is sending the ARP packet, so that the ARP response is forwarded to the correct transport node. For the tunnel encapsulation, some embodiments use stateless transport tunneling (STT) along with VXLAN semantics.

E. Packet Processing by SR

The above descriptions describe the packet processing by the SR as simply one additional logical forwarding element in the datapath for a packet, which may not be implemented at the first hop (for northbound or east-west packets, at least). However, where the other logical forwarding elements (logical switches, DRs, transit logical switches) basically involve ingress processing, logical forwarding, and egress processing (the ingress and egress processing may involve ACLs), the SR processing may include other functions such as stateful services in addition to the forwarding-related processing.

Figure 17:
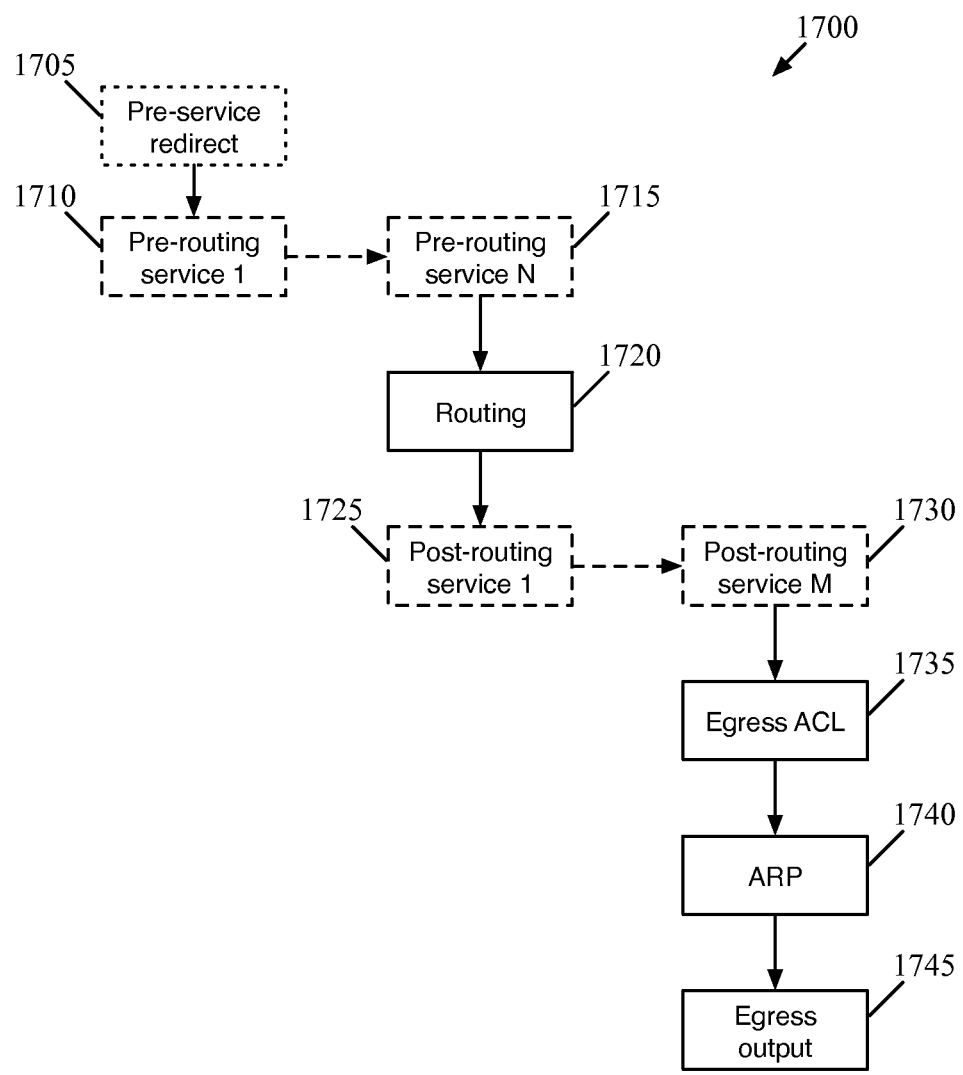
FIG. 17 conceptually illustrates the various stages of SR processing of some embodiments.

FIG. 17 conceptually illustrates the various stages of SR processing 1700 of some embodiments. Some of these stages are only included in the processing when the SR includes non-forwarding services (e.g., NAT, stateful firewall, load balancing, etc.). Thus, the diagram shows certain stages in dashed rather than solid lines to indicate that the SR only performs these stages if configured for services. In addition, the pre-service redirect stage 1705 is illustrated using dotted lines to indicate that the SR only performs this stage if the SR contains services and its logical router is configured in active-active mode.

As shown, when a SR receives a packet (whether the SR is implemented as a VM or as a VRF in a DPDK-based datapath), the first stage 1705 is the pre-service redirect operation. As mentioned, the SR only performs this stage if stateful services are configured and the SRs are operating in active-active mode. The pre-service redirect stage 1705 involves redirecting the packet to the owner SR for a connection (e.g., a transport connection) to which the packet belongs. However, if no services are configured on the logical router, or the SR is operating in active-standby mode (in which case all packets are sent to the active SR), then this stage is not needed. In some embodiments, the pre-service redirect stage does not decrement TTL (as the packet will be properly decremented when routed at a later stage).

The pre-routing service stages 1710-1715 may involve any number of stateful services configured on the SR for performance prior to routing. The SR performs these stages upon determining that no redirect is necessary or receiving a packet via redirect from a different SR. Of course, if no stateful services are configured on the SR, these operations will not be performed as well. Depending on the configuration of the SR, and whether certain services require the determination of an egress logical port of the logical router, some services may be performed either before or after routing.

After all the pre-routing services have been performed by the SR, the SR then performs the routing stage 1720. As discussed above, the routing tables for all of the SR instances will be similar. For instance, if multiple SRs can reach the same network, then all SRs will have multiple routes for that network, with routes that point to a local interface having a smaller distance metric than routes that point to a dummy interface, so the local interface will be chosen when possible. The routing stage 1720 results in a routing decision, which includes a next hop IP address and an egress logical port of the logical router (in some embodiments, the egress logical port may already be known based on routing performed by the DR for northbound packets).

After being routed, the packet proceeds to the post-routing services stages 1725-1730. These stages, like the pre-routing services stages 1710-1715, are only performed by the SR if stateful services are configured on the logical router. In some embodiments, some or all of the post-routing service stages may depend on the routing decision. For example, interface-based NAT configured for the logical router may depend on the logical egress port. In addition, some embodiments require that the post-routing services do not alter the routing decision (though they may cause the SR to drop the packet, in some cases).

Next, the SR processes the packet through the egress ACL stage 1735. At this stage, the SR enforces any security policies configured for the logical egress port of the logical router. The SR then ARPs (at stage 1740) the next hop to determine the new destination MAC address for the packet. When the egress interface of the SR is a dummy interface, in some embodiments the ARP is injected into the destination L2 via proxy in the same way that the DR performs ARP in the logical space. After ARP concludes, the SR modifies the source and destination MAC addresses of the packet.

Lastly, the packet proceeds to the egress output stage 1745. If the egress interface is local, the packet is sent to the proper VLAN. On the other hand, if the egress interface is remote, the SR forwards the packet to the dummy interface's SR, which then sends the packet out via the proper VLAN. In some embodiments, the packet is sent to the correct peer SR, which then performs ARP and outputs the packet. However, this technique requires either for the packet to store next-hop information or for the peer SR to re-perform the routing stage. In some embodiments, the egress output stage does not decrement TTL. The TTL is instead decremented by either the routing stage at this SR or, if received through redirect at the output stage of a different SR, then by the routing stage at that different SR.

IV. ECMP Routing in Multi-Tier Logical Networks

As mentioned above, some embodiments use equal-cost multi-path routing techniques, for both northbound and southbound packets, with regard to the SRs of a PLR. In some embodiments, the use of ECMP is only allowed when no stateful service is configured on the logical router that interfaces with the physical network (e.g., the PLR in a two-tier topology). In order for packets to be forwarded using ECMP techniques, a PLR requires multiple uplinks and for BGP (or another dynamic routing protocol) to be enabled. In some embodiments, the multiple uplinks may be located in the same L2 domain.

As described previously, the user (administrator) associates a logical router with a particular set of physical gateway machines. The management plane then assigns the various uplinks of the PLR to different gateway machines in this set of physical gateway machines. Some embodiments enforce a rule that the various gateway machines within a specifiable set have uniform physical connectivity to the external network (e.g., that all of the machines have access to the same set of VLANs), which simplifies the logic at the management plane. At each gateway machine to which the management plane has assigned an uplink, an SR is created.

Some embodiments place additional requirements on the uniform physical connectivity. Specifically, in some embodiments all of the gateway machines spanned by a PLR have the same L3 connectivity (i.e., all of these machines connect to the same set of physical routers). Furthermore, with BGP enabled (a requirement for ECMP), all of these physical next-hops (the physical routers) are required to have the same physical connectivity. This means that all SRs for a particular PLR will receive the same set of routes from their physical next-hops, with the possibility of transient route differences between SRs that disappear fairly quickly.

With this set of requirements, the dummy uplinks are not required, as packets will not need to be redirected between uplinks (as all uplinks have the same policies and same connectivity).

Figure 19:
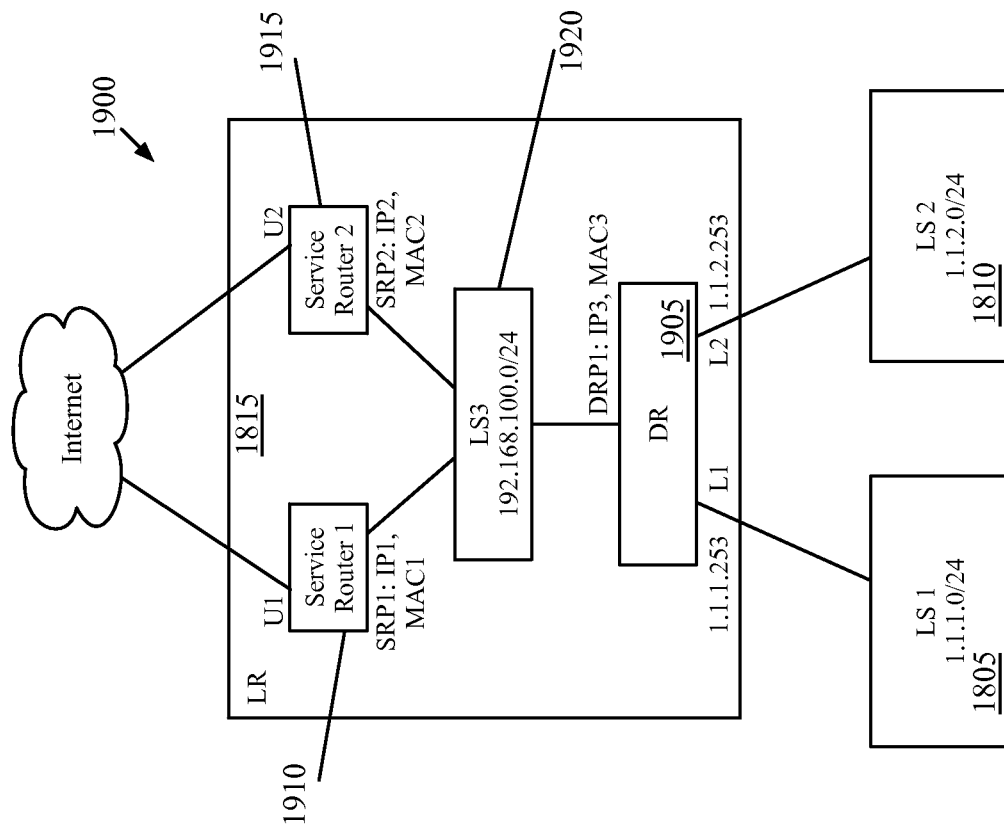
FIGS. 18 and 19 illustrate a single-tier logical network topology and the management plane view of that topology that meets the requirements for the use of ECMP.
Figure 18:
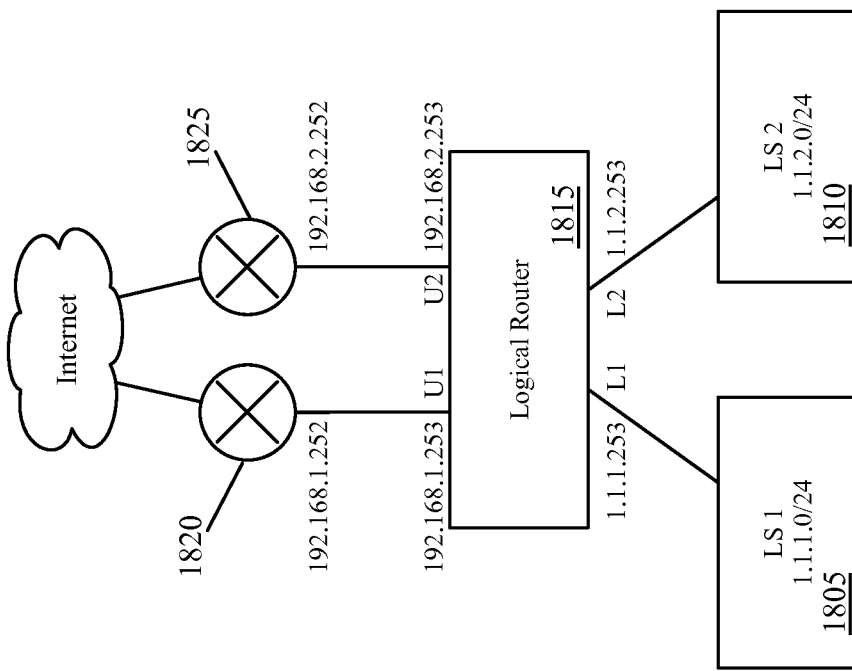

FIGS. 18 and 19 illustrate a single-tier logical network topology 1800 and the management plane view of that topology that meets the above-stated requirements for the use of ECMP. The network topology 1800 is similar to that of FIG. 9, but each of the two uplinks has the same L3 connectivity. The logical network topology 1800 includes two logical switches 1805 and 1810 that connect to a logical router 1815. The configuration of these components is the same as with the network topology 900, except for the configuration of the physical routers to which the uplinks connect. That is, the interfaces between the logical router 1815 and the logical switches 1805 and 1810 are all the same, and the two uplinks U1 and U2 of the logical router 1815 connect to physical routers 1820 and 1825 with the same next hop IP addresses. However, whereas in the previous example the physical routers provided connectivity to different networks, here the physical routers both have the same L3 connectivity to the Internet.

Thus, in FIG. 19, the management plane view 1900 of the logical network is nearly the same as well. The management plane again defines, for the logical router 1815, a DR component 1905, two SRs 1910 and 1915 for the two uplinks, and a transit logical switch 1920. The only modification to the configuration is that no dummy interfaces are configured on the SRs, because the two uplinks have the same configuration and RIB, so one of the SRs should not receive a packet that needs to be forwarded out of the second SR. As such, the routes in the RIB for redirection that were described in the previous section will not be included in the RIB of these SRs.

In some embodiments, ECMP is used in conjunction with BGP (or other dynamic routing protocols). Each SR of the logical router establishes a BGP session with the one or more physical routers to which it connects. For instance, in the example of FIG. 18 and FIG. 19, the SR 1910 initiates a session with the physical router 1820, while the SR 1915 initiates a session with the physical router 1825. In some embodiments, each of the uplinks would be connected to both of the physical routers, and thus each uplink would have two routing sessions. In some embodiments, a module on the gateway machine separate from the SR implementation initiates the BGP session with the router. For instance, when the SR is implemented as a VM, the BGP module may be part of the VM or a separate module operating as part of the hypervisor, in a separate VM or other data compute node, etc. During these sessions, the SR advertises the prefixes in the logical space (e.g., the logical switch subnets 1.1.1.0/24 and 1.1.2.0/24) to the physical routers, using the same metric for each of the prefixes. The BGP integration techniques of some embodiments are described in U.S. patent application Ser. No. 14/214,561, filed Mar. 14, 2014, now issued as U.S. Pat. No. 9,590,901, which is incorporated herein by reference.

With all of the SRs advertising the same routes to the physical routers, the physical routers can then treat the SRs as equal-cost routing options, and spread traffic through the various SRs. In the example shown in FIGS. 18 and 19, each of the physical routers can only send packets to one of the SRs. However, each of the physical routers has the same connectivity, so packets sent from the networks behind them towards the logical network will be spread evenly between the two routers 1820 and 1825, and therefore spread evenly between the two SRs. When each SR connects to all of the physical routers, then each of these physical routers can spread traffic evenly between the SRs on their own.

For northbound packets, the DR of some embodiments uses ECMP techniques to distribute packets among the various SRs, which provide equal connectivity for northbound packets. By running BGP (or a different dynamic routing protocol), the SRs learn routes from the physical routers in addition to advertising routes for the logical network prefixes. As mentioned, the SRs locally incorporate these routes into their RIBs, and can recalculate their FIBs based on the newly learned routes. However, for the DR to use ECMP, the routes must also be given to the RIB of the DR, which is implemented at numerous machines.

In some embodiments, the SRs report the learned routes to the centralized network controllers that configure and manage the SRs (as well as the MFEs that implement the distributed logical forwarding elements). The centralized controllers then update the RIB of the DR accordingly, and distribute the updates to the MFEs that implement the DR. Different embodiments may update the DRs at different rates, depending on the desired balance between keeping an up-to-date RIB and the processing load on the central controllers. Rather than distributing the RIB, some embodiments compute the FIB at the centralized controllers, then distribute the updated FIB to the MFEs that implement the DR.

In other embodiments, rather than continuously updating the routes, the centralized controller instead adds to the DR RIB default routes that point to all of the SRs. These routes are classified as management plane internal, so they are only used by the DR if they are not overruled by static routes input by an administrator. Because the routes for the different SRs have the same administrative distance metric, the DR treats them as equal-cost options, dividing traffic between the SRs with ECMP techniques.

V. Active-Standby for Stateful Services

While the above section describes the SR setup for active-active configuration with ECMP (when all of the two or more SRs are treated as equal options), some embodiments use an active-standby configuration with two SRs. Some embodiments use the active-standby configuration when stateful services are configured on the SRs. In this case, the benefit of avoiding having to continuously share state between the SRs may outweigh the negatives of sending all of the northbound and southbound traffic between multiple SRs (while using a standby for backup in case of failure). In the active-standby case, the state is periodically synchronized between the two SRs, though this need not be done at per packet speeds.

In some embodiments, for active-standby configuration, the administrator is required to configure two uplinks when defining the logical router, and the uplinks need not be in the same L2 domain. However, because the active and standby SRs should be equivalent options to the DR (with the active SR the preferred of the two options), some embodiments require the two SRs to have uniform L3 connectivity. This is, of course, not an issue when the active-standby SRs are configured for a TLR with stateful services, as both SRs will have one next hop, the DR of the PLR to which the TLR connects. For a PLR in active-standby configuration, the two uplinks should be configured with the same connectivity in some embodiments. In addition, for a PLR, some embodiments allow (or require) the configuration of dynamic routing protocols (e.g., BGP) on the SRs.

Figure 20:
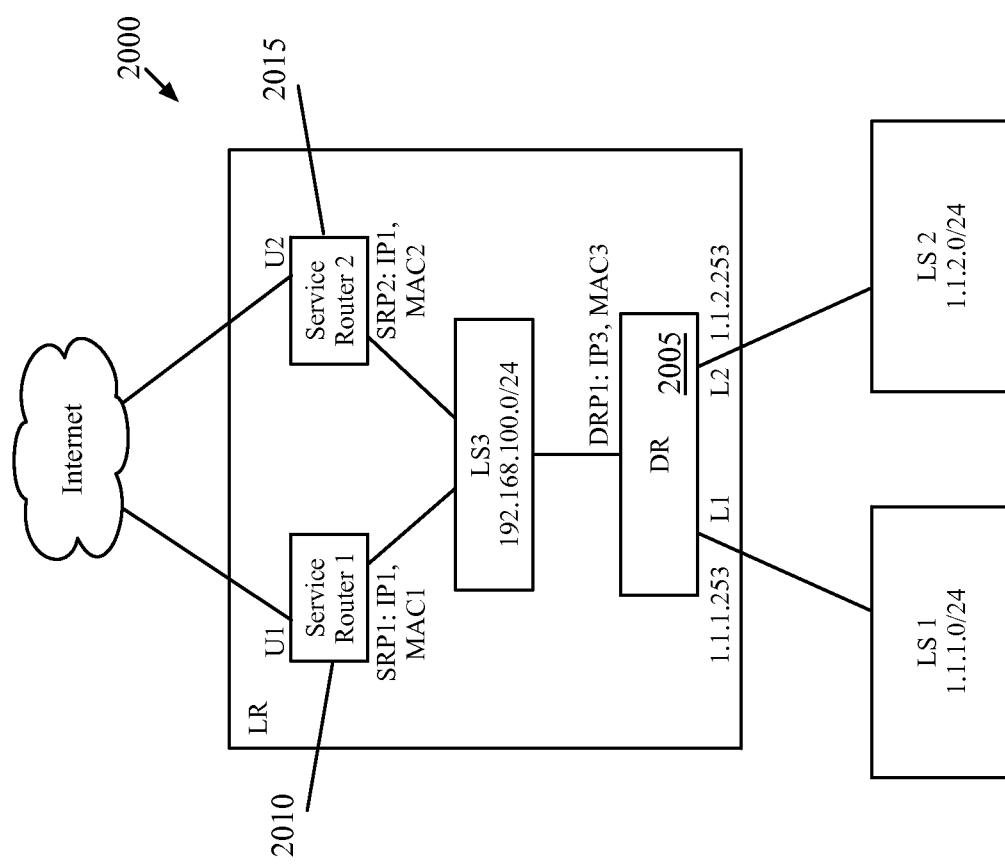
FIG. 20 illustrates a management plane view of the logical network topology of FIG. 18 when the logical router is configured in active-standby mode, rather than active-active (ECMP) mode.

FIG. 20 illustrates a management plane view 2000 of the logical network topology 1800 when the logical router is configured in active-standby mode, rather than active-active (ECMP) mode. Here, the only difference in configuration from the active-active mode shown in FIG. 19 is that the southbound interfaces of the SRs 2010 and 2015 are assigned the same IP address, but different MAC addresses.

The management plane configures the DR 2005 in the same manner as in the general case of FIGS. 9 and 10, in terms of assigning MAC and IP addresses to its southbound and northbound interfaces. When constructing the RIB, the same connected routes are used, and the same static route rules apply as described above in Section II (e.g., northbound routes are copied to the DR but modified to set the SR IP address as its next hop). In this case, because there is only one IP address for the SR, all northbound routes use this single IP as the next hop address. Similarly, rather than creating multiple default routes to the various different SR IP addresses, a single default route with this lone IP address as the next hop is added to the RIB of the DR. Thus, the RIB for the DR 2005 in FIG. 20 includes the following routes:

1.1.1.0/24 output to L1
1.1.2.0/24 output to L2
192.168.100.0/24 output to DRP1
192.168.1.0/24 via IP1
192.168.2.0/24 via IP1
0.0.0.0/0 via IP1

Each of the SRs 2005 will be configured in mostly the same manner. When the logical router is a PLR (or in a one-tier topology, as in the example), the IP and MAC addresses of the northbound interfaces are the same as those assigned to the two uplinks configured for the PLR. On the other hand, when the logical router is a TLR, it may only have one uplink that is configured to connect to the PLR. In this case, the IP addresses of the two northbound interfaces are the same, but each SR is assigned a different MAC address. Similarly, in either of these two cases (PLR or TLR), a single IP address is assigned to the two southbound interfaces (as in FIG. 20, in which both of these interfaces have an IP address of IP1), with two different MAC addresses for the two SRs.

Any uplink-independent service policies the controller pushes to both of the SRs identically, in some embodiments. If any service policies that depend on the uplink are allowed and configured, then these are pushed to the SRs on which the uplink with which they are associated exists. In addition, any dynamic routing configurations of a logical router port are transferred to the northbound interface of the SRs.

The RIB for the SRs is similar to that described above in Section II for the general case. Static and connected routes that egress from an uplink of the logical router are added to the RIB of the SR without modification. For each southbound interface of the logical router (e.g., routes for logical switch subnets), a route for the network is added with the next hop IP address set to the northbound interface of the DR. Any route in the RIB of the logical router that egresses from this southbound interface is also added to the RIB of the SR with this same next hop IP address. The RIB of SR1 2010 in the example of FIG. 20 will include the following routes, prior to learning any additional routes via dynamic routing protocols:

0.0.0.0/0 output to U1 via 192.168.1.252
192.168.1.0/24 output to U1
192.168.100.0/24 output to SRP1
1.1.1.0/24 via IP3
1.1.2.0/24 via IP3

In addition, when the SR is set as a standby SR (rather than active SR), the SR does not answer ARP on its southbound interface in some embodiments. ARP packets for the southbound IP of the SR will be broadcast on the transit logical switch that connects the SRs and the DR, and both the active and standby SRs will be responsive to that IP address. However, only the active SR will respond to ARP requests, so that the DR will route packets to the MAC address of the active SR rather than the standby SR. The standby SR in some embodiments will nevertheless accept packets received by the northbound interface, in order to run its dynamic routing protocol and keep an up-to-date set of routes in case it becomes the active SR. However, the standby SR does not advertise prefixes to the external networks, unless it becomes active.

VI. SR Failover

As described above, the SRs may be implemented in different embodiments as VMs or other data compute nodes or as VRFs within DPDK-based datapaths. In both cases, the possibility of different types of failure (partial tunnel failure, complete tunnel failure, physical machine crashes, etc.) may cause a SR to go down. However, different SR implementations may respond to different types of failures in different manners.

A. Failure Handling with DPDK-Based SRs

In some embodiments, as described, the SRs of a logical router operate on gateway machines, or edge nodes, as VRFs within the DPDK-based datapaths. These gateway machines are grouped into sets (e.g., based on physical location within a datacenter), and the gateway machines of a set that collectively host all of the SRs for a particular logical router are connected by a set of tunnels (e.g., a full mesh of tunnels in some embodiments). Thus, tunnels exist between all of the gateway machines on which a SR operates.

Some embodiments use Bidirectional Forwarding Detection (BFD) sessions to maintain these tunnels, in order to monitor the aliveness of peer gateway machines. However, as using only the single BFD session between the tunnel endpoints would require depending on a single information channel to detect the aliveness of a peer, some embodiments also use a second channel between each pair of gateway machines. Specifically, in some embodiments, a separate management network exists between the gateways for sending control data (e.g., for communication with the network controllers). Thus, each gateway has a separate IP address on the management network, and these connections may be used to send heartbeat messages over the management network. This prevents the possibility of tunnel failure between two peers resulting in both of the gateway machines determining that the other has crashed and initiating actions that cause confusion when the peer is not actually down. Instead, during tunnel failure, each of the nodes can detect that their peer machine is still up, and thus conclude that the tunnel has failed and not the peer machine (and thus its SRs) itself.

In some embodiments, the failure conditions are different for SRs of PLRs and SRs of TLRs. When the tunnels of a gateway machine that provide connectivity to the MFEs on which the user VMs run (e.g., the MFEs 1325 of FIG. 13 to which the user VMs directly connect) fail, all SRs on the gateway machine are no longer operational (even for the SRs of PLRs, as traffic sent to the PLRs by external physical routers will be blackholed. On the other hand, when a gateway machine loses its connectivity to the physical routers, the SRs of TLRs on the gateway are still treated as operational, as northbound traffic to the TLRs will have the DR of a PLR as a next hop, which should always be available (as it is also implemented within the datapath on the gateway). The SRs of PLRs, however, are no longer considered operational, as any northbound traffic originating from VMs of the logical network will be blackholed. When a gateway machine that hosts SRs of PLRs loses its physical connectivity (or its BGP sessions), in some embodiments the gateway machine sends a message (e.g., a specific diagnostic code such as "concatenated path down") to other gateway machines that host SRs of the same PLR.

Based on the BFD session on the tunnel with a peer, the status of heartbeat messages over the second (e.g., management) channel with the peer, and whether a message has been received from the peer indicating that the peer's physical connectivity is down, a first gateway machine can make a conclusion about its peer second gateway machine and take certain actions based on those conclusions. For example, if the tunnel is active and no connectivity down message is received, then the first gateway machine concludes that the peer second gateway machine is healthy, and continues processing packets as normal. However, if the tunnel to the peer is up, but the connectivity down message has been received, then the first gateway machine concludes that the peer is still active but has lost its physical connectivity. As such, the SR on the first gateway machine takes over the SR (as described below) on the second gateway machine if the SR belongs to a PLR, but takes no action with regard to SRs of TLRs.

If the tunnel goes down (based on the BFD session no longer being active) between the first gateway machine and the peer second gateway machine, but the secondary channel heartbeat messages are still received, then the first gateway machine concludes that the peer second gateway machine is still healthy and handling northbound and southbound packets (although redirection may be a problem if needed). However, if both the tunnel and the secondary channel are down, then the first gateway machine concludes that the peer has gone down (e.g., crashed). In this case, the SR on the first gateway machine takes over for the SR on the second gateway machine (as described below), irrespective of whether the SRs belong to a PLR or a TLR.

In some embodiments, each gateway machine has a local network controller (sometimes referred to as a chassis controller) that operates on the machine. The chassis controller of some embodiments receives data tuples from the central network controller and uses the data tuples to configure the MFE on the machine. This chassis controller is also, in some embodiments, responsible for determining when the health status of its gateway machine changes, as well as when that of a peer gateway machine changes. When one of the three indicators of communication (tunnel BFD session, secondary channel, and physical connectivity down messages) between the gateway machines is affected (based on a loss of connectivity, the gateway machine crashing, etc.), the chassis controller of some embodiments determines how this affects each SR hosted on its gateway machine.

The actions taken by the chassis controller with respect to a particular one of its SRs then depend on (i) whether the SR belongs to a PLR or a TLR, (ii) whether the SR works in active-active or active-standby mode, (iii) its own local health status, and (iv) the health status of the peer gateway machine(s) hosting the other SRs of the same logical router. For example, the chassis controller could determine that its local SR should no longer be treated as functional, in which case it may send signals to this effect to a combination of (i) other gateway machines, (ii) the host machines on which user VMs reside, and (iii) physical external routers. The chassis controller can also make the determination that a local SR should become active, in which case it may start a failover process to activate the SR. Furthermore, the chassis controller could make the determination that a remote SR is no longer functional, and start a failover procedure to take over this remote SR locally.

When a failure condition is detected, various embodiments may take various different actions to partially or completely remedy the situation. Different types of failure cases may include complete or partial tunnel failure, gateway machine or MFE crashes, link aggregate group (LAG) status going down, BGP session failing, non-uniform routes among SRs. While resurrection of an SR is not actually a failure scenario, it also results in actions taken by the gateway machine chassis controller(s) to manage the SRs.

1. Complete Tunnel Failure

Complete tunnel failure may occur due to the gateway machine crashing, or due to pNIC or physical network issues. When complete tunnel failure occurs at a particular gateway machine, (i) all of the MFEs at host machines with user VMs or other data compute nodes lose tunnels to the particular gateway machine, (ii) other gateway machines lose tunnels to the particular gateway machine, and (iii) the particular gateway machine loses tunnels to the other gateway machines.

From the point of view of the MFE at a host machine, when its tunnel to the particular gateway machine fails, the DR of a PLR can reach some SRs (assuming all of the gateway machines spanned by the PLR do not fail at once) but cannot reach the SR on the particular gateway machine. As such, in some embodiments, the datapath or chassis controller on the host machine automatically removes the affected routes (that use the SR on the particular gateway machine as the next hop IP address) from the FIB of the DR. Some embodiments associate each next hop with a virtual tunnel endpoint (VTEP) of the respective gateway machine. When the tunnel towards a particular VTEP is down, all next hops associated with the particular VTEP are marked as down, and thus removed when calculating the FIB for the DR by the local chassis controller.

The other gateway machines detect the failure of the particular gateway machine tunnels through the status of the BFD sessions, and that the secondary channel is still up. These other gateway machines (e.g., the local chassis controller on the other gateway machines) can then initiate a failover process to take over the SRs hosted on the failed gateway machine.

For SRs on the failed gateway machine that are configured in active-active mode, some embodiments use a ranking mechanism to determine how the failed SR is taken over by one of the other machines. In some embodiments, the management plane assigns each of the N SRs in an active-active configuration a ranking, from 1 to N. These rankings may be assigned randomly, or using a different technique, and are distributed to the local chassis controller of all of the gateway machines that host SRs for a particular logical router in active-active configuration. Based on the ranking of the failed SR, the next-highest ranked SR automatically takes over the southbound interface of the failed SR. For the northbound interface, no action needs to be taken by the other SRs, as the physical routers will recognize that the SR is down when the BGP session terminates. To take over the interface, the overtaking SR sends several gratuitous ARP (GARP) messages for all of the IP addresses that it is taking over to the transit logical switch on its southbound interface. These messages announce that the IP addresses are now associated with the MAC address of its southbound interface. If the failed SR has already taken over other IP addresses (due to previous failure of other SRs for the logical router), then multiple IP addresses are taken over by the new overtaking SR.

For SRs on the failed gateway machine that are configured in active-standby mode, some embodiments treat the failure of the active SR and the failure of the standby SR differently. Specifically, if the failed SR is a standby, some embodiments take no action (i.e., they do not instantiate a new standby machine), on the assumption that the standby machine will be brought back up in good time. If the failed SR is the active SR of a TLR, then both the southbound and northbound interface IP addresses are migrated to the standby SR. Because the TLR has only a single uplink, both of the SRs share both northbound and southbound IP addresses, but with different MAC addresses. In both cases, some embodiments send GARP messages to the relevant transit logical switch to effectuate the migration of the IP addresses. For the SR of a PLR, only the southbound interface is migrated, because the two uplinks should have separate IP addresses even in active-standby mode. Furthermore, the new active SR begins advertising prefixes to physical routers to draw southbound packets to itself rather than to the failed SR. In the case in which the same IP and MAC addresses are used for the southbound interfaces of the active-standby SRs, some embodiments use Reverse ARP (RARP) to refresh the MAC:VTEP mapping (that is, so packets will be sent over the correct tunnel to the newly active SR).

On the gateway machine that has lost all of its tunnels, the chassis controller determines that the most likely cause is some sort of local failure, and thus determines that its local SRs should no longer be active. Thus, any SR that is announcing prefixes to the external physical routers via BGP session withdraws its announced prefixes, so as to avoid attracting southbound traffic that will be blackholed.

2. Partial Tunnel Failure

Partial tunnel failure occurs when only some of the tunnels between the gateway machine and other machines in the datacenter go down. This could be due to complete failure at one of the machines with a tunnel to the particular gateway machine (which would result in the loss of one tunnel), due to conditions at the particular gateway machine that result in some of its tunnels going down, etc. Described here is the case when conditions at the particular gateway machine result in a subset of its tunnels failing. As a result, (i) some of the MFEs at host machines with user VMs or other data compute nodes lose tunnels to the particular gateway machine, (ii) some of the other gateway machines lose tunnels to the particular gateway machine, and (iii) the particular gateway machine loses tunnels to some other gateway machines.

The MFEs at host machines that lose tunnels to the particular gateway machine treat this in the same manner as complete tunnel failure, as from the perspective of the host machine this is simply an unreachable gateway. As such, the datapath or chassis controller on the host machine automatically removes the affected routes that use the SR on the particular gateway machine as the next hop IP address from the FIB of the DR, as described above in subsection 1.

As noted, partial tunnel failure can result in various different scenarios. For instance, in some cases, a gateway machine may be reachable by some of the host machine MFEs, but not by its peers. Referring to FIG. 13 (which illustrates SRs as VMs but is nevertheless applicable) as an example, the gateway machine 1330 might be reachable by the host machines 1305-1320 but not reachable by gateways 1335 and 1340. In this case, the local chassis controller on the gateway machine 1330 will take over the SRs of the PLR that are running on both gateway machines 1335 and 1340. In addition, the gateway machine 1335 (or machine 1340, depending on the ranking) will take over the SR running on the gateway machine 1330. This results in some of the MFEs (that can reach all of the gateway machines) receiving replies from multiple gateway machines when the DR running on it sends an ARP request for the southbound interface IP address of the SR hosted on the first gateway machine 1330. So long as the SRs are in an active-active configuration (with no stateful services), this will not create a correctness problem. However, in the case of an active-standby configuration, this would mean that both of the SRs are now active, which could cause traffic disruption issues.

Partial tunnel failure can also cause problems in active-standby mode when, at a particular gateway machine, the tunnels to some of the host machines go down, but the peer gateway machines remain reachable. In this case, because the tunnels between the SRs are functioning, no failover occurs. In active-active mode, the datapath at the host machines (or the local chassis controller) can make the decision to forward traffic over the tunnels that are still up without issue. However, in active-standby mode, if the tunnels to the active SR are down, then the MFE will send packets to the standby SR, which does not process them. Similarly, in both active-active and active-standby configurations, the gateway machine may not be able to pass on southbound traffic from physical routers, which is therefore blackholed in some embodiments.

3. Machine Crash

In some cases, the entire gateway machine may crash, or the DPDK fastpath may crash. As the fastpath is responsible for sending the BFD packets in some embodiments, either of these situations is the same as a complete tunnel failure. As the MSR process (which handles BGP sessions for the SRs on the gateway machine) may continue to run when only the fastpath crashes (and not the entire gateway machine), physical routers will still have the ability to send packets to the gateway machine. This traffic is blackholed in some embodiments until the fastpath is restarted.

4. LAG Status Down

In some embodiments, the gateway machines use link aggregate groups (LAG) to reach the external physical routers. When a gateway machine that hosts a SR of a PLR loses the entire LAG, in some embodiments the machine sends the physical connectivity down message (described above) over tunnels to its peer gateway machines that also host the SRs of that PLR. In this case, the takeover procedure described above with respect to complete tunnel failure occurs (the next highest-ranked SR takes over the IP addresses of the SR).

Some embodiments instead mark all tunnels as down as a technique to induce failover. However, this results in the SRs of TLRs on the machine being failed over to other gateway machines as well, which is unnecessary when only the physical connectivity is down. This can lead to numerous GARP messages sent to the MFEs at host machines, and therefore some embodiments use the first technique that only fails over the SRs of PLRs.

In some cases, only some of the physical uplinks in the LAG go down. So long as at least one of the physical uplinks in the LAG remains functional, the gateway machine does not take any action and continues operating as normal. Furthermore, in some embodiments, tunnel traffic (within the datacenter) uses a separate LAG. If that entire LAG goes down, this results in complete tunnel failure, described above in subsection 1.

5. BGP Session Down

In some cases, the BGP session for the SRs may go down (e.g., because the MSR process on the gateway machine crashes). When graceful restart is enabled for the BGP process, no failover actions need to be taken so long as the session is reestablished within the timeout set for graceful restart. In order to be able to detect when the MSR process (or other BGP module) has gone down, some embodiments require the process to refresh the status of all BGP sessions periodically, even if the status has not changed.

On the other hand, if graceful restart is not enabled or the timeout for the restart expires, the gateway machine of some embodiments sends a physical connectivity down message to its peer gateway machines that also host SRs for the same PLR, in order to indicate that its SR is no longer functioning. From the perspective of the peer gateway machines, this is the same as if the LAG status is down, in that the SR interfaces on the gateway with the non-functioning BGP session will be taken over by the next-highest ranked SR. In addition, so long as one BGP session is functioning, and all physical next hops have the same L3 connectivity, then no failover action need be taken.

6. Non-Uniform Routes Among SRs

Failures in the external physical network to which the SRs of a PLR connect may also affect the SRs. For instance, some external physical routers might withdraw a route for a subnet, while other physical routers do not. Some embodiments solve this issue locally on the gateway machines without involving the central network controllers.

As mentioned, in some embodiments, the SRs have iBGP peering with each other, and eBGP routes (learned from the external physical routers) are sent over the iBGP sessions without changing the next hop. By reference to FIG. 10, any eBGP routes learned by the SR 1015, which have a next hop of 192.168.2.252 (in the same subnet as the uplink U2), are learned by the SR 1010 via iBGP. These routes are then installed in the SR 1010 with a next hop of 192.168.2.252 because the SR has a dummy interface (U2') for the actual uplink on the other SR 1015. This same technique also happens for route withdrawal scenarios.

7. SR Resurrection

Although SRs may go down for various reasons indicated in the previous subsections, the SRs will generally be brought back up after a period of time. This may be indicated at other machines by a BFD session towards the particular gateway machine with the SR that had failed coming back up, or by the receipt of a message clearing the physical connectivity down flag. In some embodiments, the local chassis controller on all of the other gateway machines then evaluates whether the local SRs should continue taking over the remote SRs using the same methodology as described above.

For example, if an IP address currently taken over by a local SR from a remote SR should be given back to the remote SR (i.e., the local SR should no longer be taking over the IP address), then the local SR stops answering ARPs for the IP address. For some embodiments, the local chassis controller removes the IP address from the local SR's southbound interface. If an IP address should be taken over by a local SR (e.g., because it has come back up), then it follows the failover procedure described above in subsection 1. In addition, if a local SR is designated as standby, and the active SR resumes functioning, then the local SR stops advertising prefixes to the external physical routers. Similarly, if a local SR designated as active resumes functioning, it also resumes advertising prefixes.

B. Failure Handling with VM-Based SRs

Figure 21:
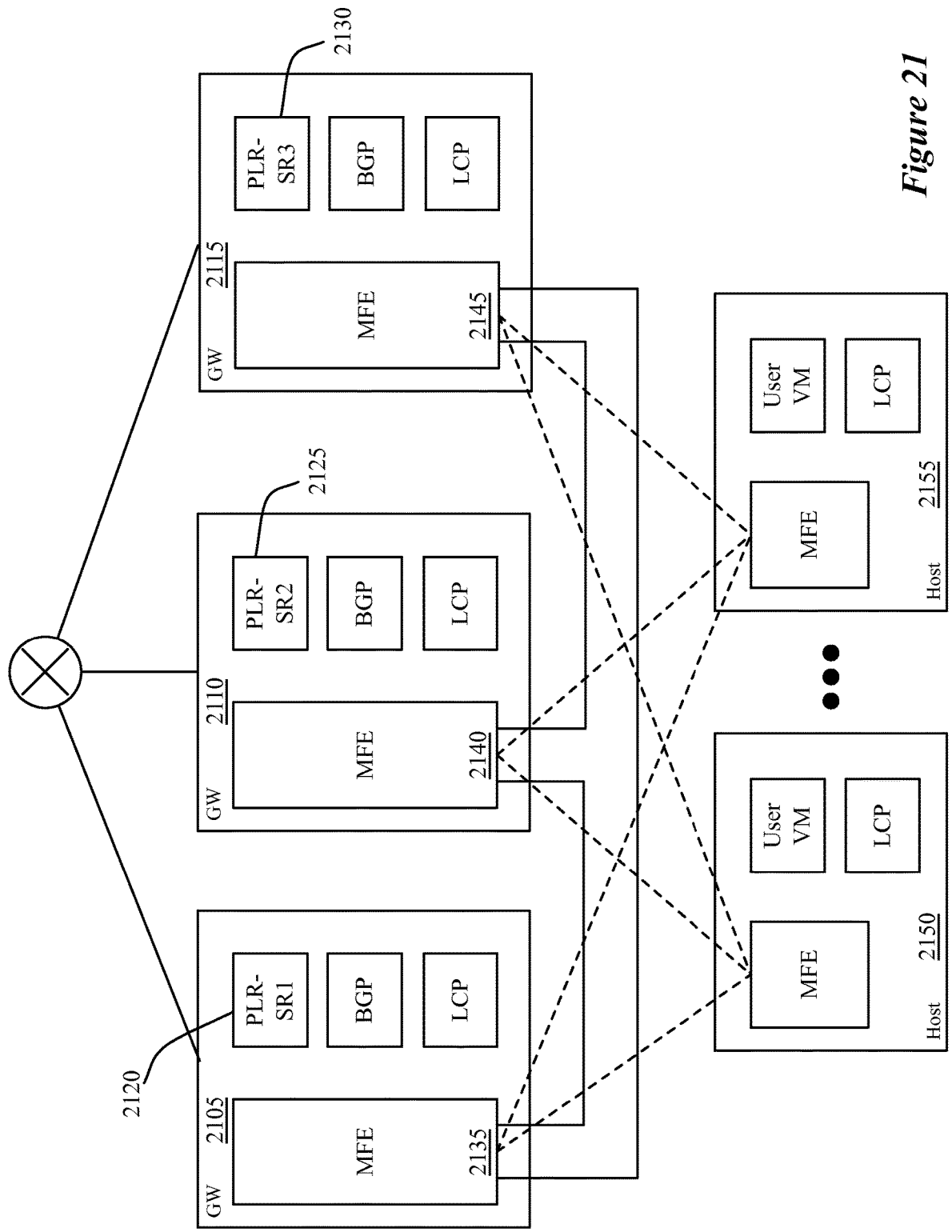
FIG. 21 illustrates an example physical implementation of three gateway machines that host the three reSRs for a particular PLR.

As noted above, some embodiments use VM (or other data compute nodes) on the gateway machines to host SRs in a datacenter, rather than (or in addition to) hosting SRs in DPDK-based datapaths of the gateway machines. FIG. 21 illustrates an example physical implementation 2100 of three gateway machines 2105-2115 that host the three SRs 2120-2130 for a particular PLR. Each of the gateway machines includes a MFE, a BGP process (e.g., the MSR process described in the above subsection A), and a local control plane, or chassis controller.

The MFEs 2135-2145 on the gateway machines 2105-2115 may be virtual switches such as OVS, ESX, a different hypervisor-based virtual switch, or other software forwarding elements that can handle distributed L2 and L3 forwarding. As shown, the three MFEs 2135-2145 have a full mesh of tunnels between them, and these three MFEs also have tunnels to MFEs located at a set of host machines 2150-2155, that host user VMs. The host machines 2150-2155 also have local control planes.

The physical implementation 2100 of a network topology with three active SRs operating as VMs will be used in this subsection to describe various different failure scenarios. In general, when one of the VMs hosting an SR fails or the tunnels between them fail, the other peer SRs will attempt to take over the failed SR's responsibilities. In some embodiments, the SRs that belong to the same logical router send heartbeat messages to each other via the transit logical switch periodically (e.g., by broadcasting a heartbeat message onto the transit logical switch, which will be delivered to all of the other SRs on the transit logical switch).

1. Crash of VM Hosting an SR

In some cases, the actual VM that hosts one of the SRs may crash due to any number of reasons. As mentioned above, when the SRs operate in active-active mode (as in FIG. 21), then the management plane assigns each of the VMs a rank for use in failover scenarios. In the case of FIG. 21, SR1 on gateway machine 2105 is the highest ranked, SR2 on gateway machine 2110 is the second-highest ranked, and SR3 on gateway machine 2115 is the third-highest ranked among the SRs.

Figure 22:
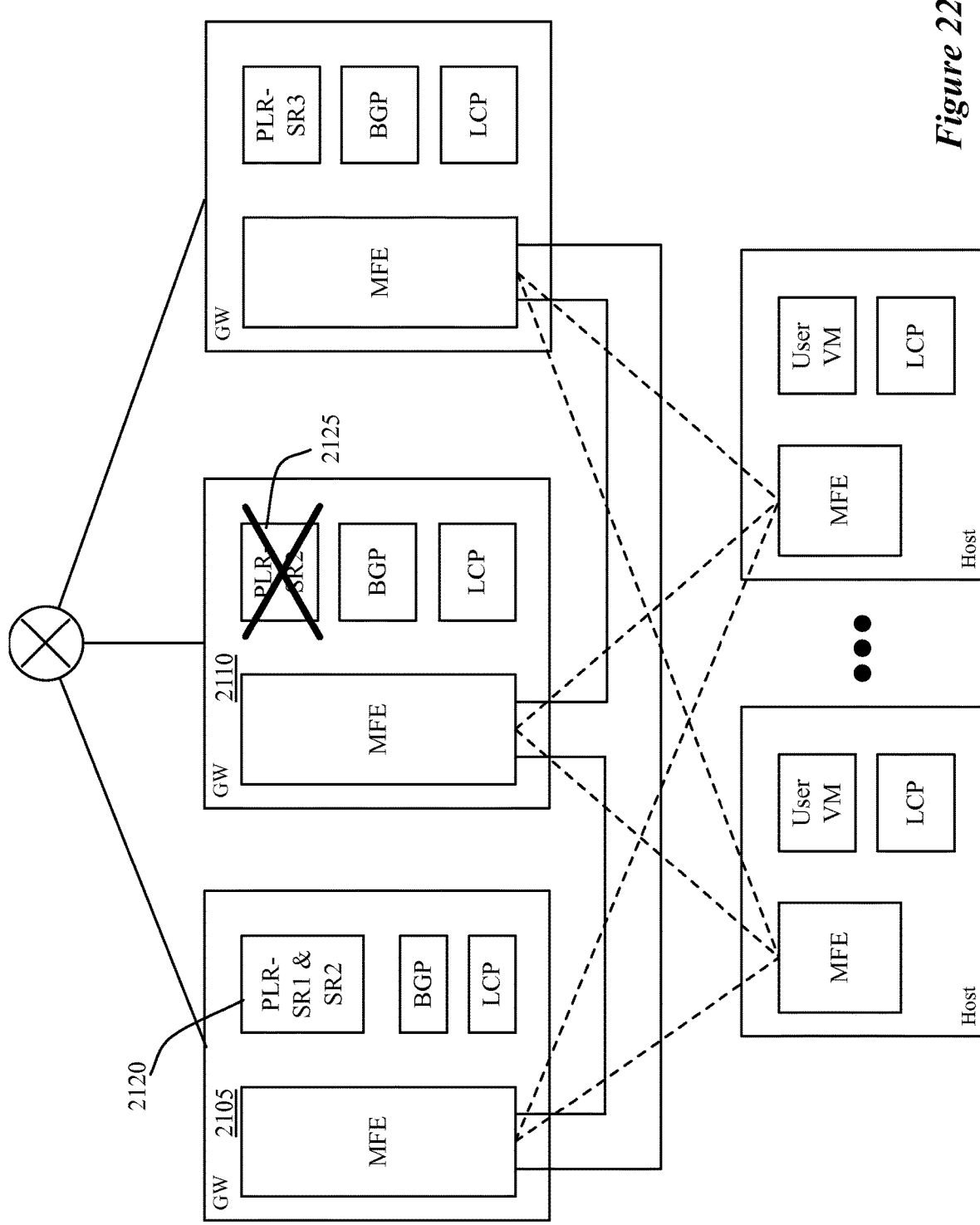
FIG. 22 conceptually illustrates the result of one of the VMs that implements one of the SRs of FIG. 21 crashing.

FIG. 22 conceptually illustrates the result of one of the VMs crashing. Specifically, this figure illustrates that the VM in which the SR 2125 operates on the gateway machine 2110 crashes. As a result, this VM is unable to send out heartbeat messages to the other SRs 2120 and 2130, although the tunnels between the gateway machines are still operational (e.g., for other SRs that operate in other VMs on the gateway machine. In this sense, while the various failure mechanisms affect all of the DPDK-based SRs on a machine (as they are all implemented as VRFs within a datapath), crashes of the VMs for the VM-based SRs only affect the single SR operating in that VM, and not the other SRs on the gateway machine.

The other SRs 2120 and 2130 detect the failure of the SR 2125 due to the missing heartbeats, and therefore take over responsibility for the failed SR. Normally, all of the SRs store information for the IP addresses of their own southbound interfaces as well as the southbound interfaces of the other SRs. That is, SR 2120 stores information about its own interface to the transit logical switch that connects the SRs, as well as the corresponding interface of the SRs 2125 and 2130. The SR 2120, however, normally only answers ARP requests for its own interface.

When a SR's VM crashes, as shown in FIG. 22, the next highest ranked SR that is still alive is responsible for taking over the failed SRs southbound interface IP address, as well as any IP addresses the failed SR had previously taken over.

For instance, if SR3 2130 had previously crashed, then its southbound interface would be taken over by SR2 2125. Thus, FIG. 22 illustrates that the SR 2120 is now acting as both SR1 and SR2. Assuming the logical network forwards northbound packets using ECMP principles, the host machines 2150-2155 should route two-thirds of all northbound traffic for the logical router to which the SRs 2120-2130 belong to the VM on gateway 2105 (e.g., to that VM's MAC address), as packets forwarded to the IP addresses of both SR1 and SR2 will be routed to that MAC.

In order for the VM on the gateway 2105 to take over the IP address of SR2 2125, the VM sends GARP messages for this IP address (and, in other cases, all IP addresses that it takes over) to the transit logical switch that connects the DR and the SRs 2120-2130. In some embodiments, the VM sends multiple GARP messages in order to better ensure that the message is received. The MFE 2135 receives these GARP messages, and sends them to the MFE 2145 (for delivery to SR3 2130) as well as to the MFEs at the various hosts 2150-2155 (so that the DR will know to remove from its ARP cache the old SR2 IP to MAC address mapping).

In the case of two SRs in active-standby mode (e.g., if the SRs belong to a TLR, or a PLR with stateful services configured), then the southbound interfaces share the same IP address but with different MAC addresses in some embodiments, as described above. If the standby VM crashes, then in some embodiments the management plane does not initiate a new standby, on the assumption that the VM will come back up without the active SR's VM also failing. When the active SR's VM fails, however, the standby VM identifies this failure (as no heartbeat messages are received), and generates GARP messages so as to remove the mapping of the southbound IP address to the crashed SR's MAC address in the ARP table for the DR in the host machine MFEs (so that these MFEs will route packets to the new active SR rather than the old active SR). In some embodiments, the tunneling protocol layer (e.g., the VXLAN layer) on the host machines also learns the MAC: VTEP mapping for the new MAC address. the same IP and MAC addresses are used for the southbound interfaces of the active-standby SRs, some embodiments use Reverse ARP (RARP) to refresh the MAC:VTEP mapping at the host machine MFEs (so packets will be sent over the correct tunnel to the newly active SR).

Lastly, if the standby (now active) VM operates as a SR for a PLR, it begins route advertisement to the physical external routers. When the BGP process on the gateway machine with the failed SR operates outside of the VM with the SR, then in some embodiments the local control plane at that gateway machine stops the BGP process from continuing to advertise routes as well, so that the gateway machine will not attract ingress traffic for the failed SR.

2. Complete Tunnel Failure

Complete tunnel failure may occur due to the gateway machine crashing, the MFE on the gateway machine having problems, or due to pNIC or physical network issues. When complete tunnel failure occurs at a particular gateway machine, (i) all of the MFEs at host machines with user VMs or gateway machines lose tunnels to the particular gateway machine, (ii) SRs on other gateway machines determine that the SRs on the particular gateway machine have failed, and (iii) the SRs on the particular gateway machine determine that the SRs on the other gateway machines have failed. In some embodiments, if the particular gateway machine no longer receives heartbeat messages on any of the tunnels, the logic on the particular gateway machine determines that it has lost its tunnel connectivity, not that the other VMs have done so.

Figure 23:
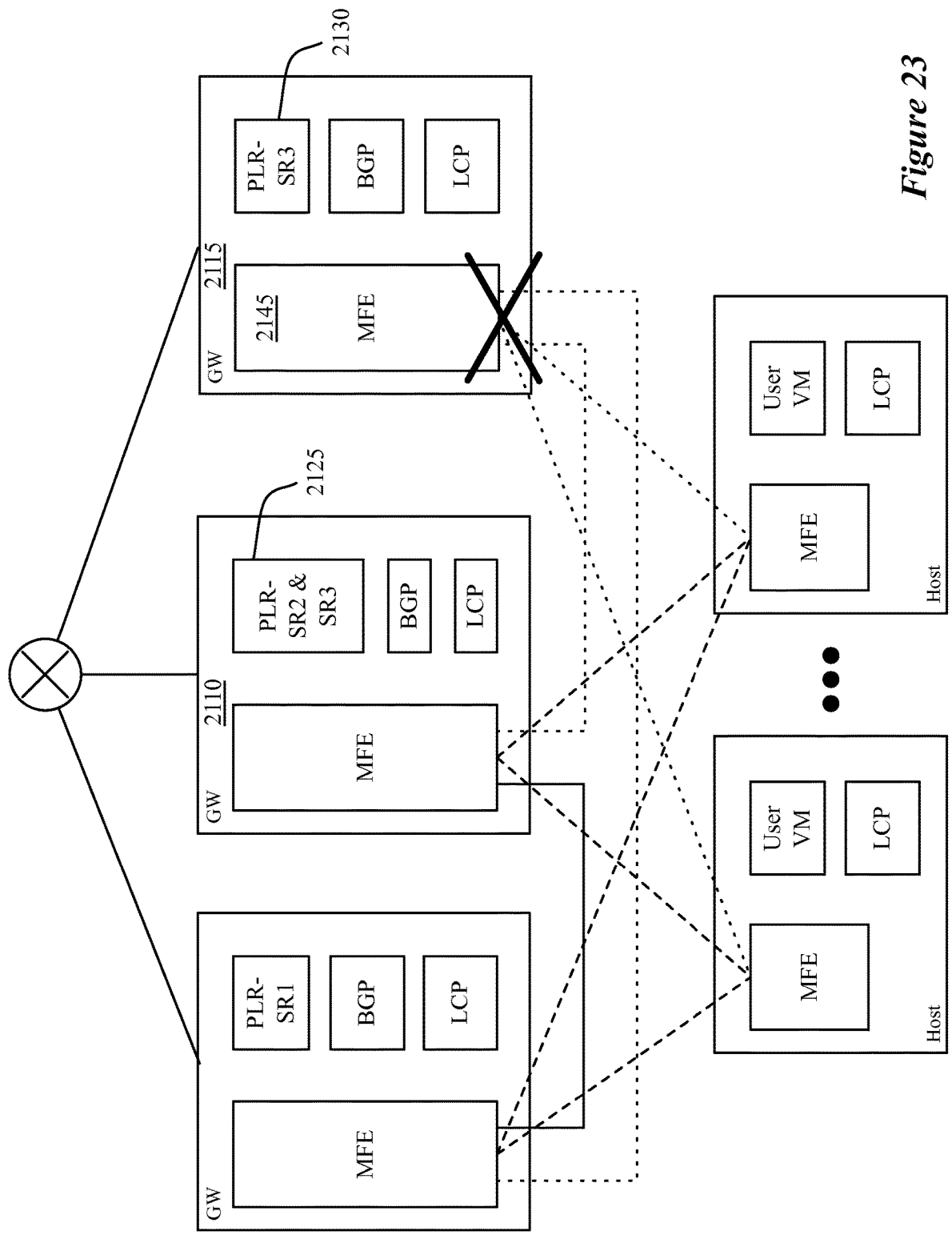
FIG. 23 conceptually illustrates the result of complete tunnel failure at an MFE on the gateway machine that hosts one of the SRs of FIG. 21.

FIG. 23 conceptually illustrates the result of complete tunnel failure at the MFE 2145 on the gateway machine 2115 that hosts SR3 2130. As shown, the MFE 2145 has failed such that the tunnels from this MFE to the other gateway machines and host machines are down (indicated by the dotted lines). As a result, the other SRs that belong to the same PLR (configured in active-active mode) start a failover process to take over the southbound interface IP addresses of the failed SR 2130.

In some embodiments, the next-highest ranked SR that is still alive is responsible for taking over the failed SR's southbound interface IP address, as well as any IP addresses the failed SR had previously taken over. Thus, FIG. 23 illustrates that the VM for SR 2125 is now acting as both SR2 and SR3. Assuming the logical network forwards northbound packets using ECMP principles, the host machines 2150-2155 should route two-thirds of all northbound traffic for the logical router to which the SRs 2120-2130 belong to the VM on gateway 2110 (e.g., to that VMs MAC address), as packets forwarded to the IP address of both SR2 and SR3 will be routed to that MAC.

In order for the VM on the gateway 2110 to take over the IP address of SR3 2130, the VM sends GARP messages for this IP address (and, in other cases, all IP addresses that it takes over) to the transit logical switch that connects the DR and the SR 2120-2130. In some embodiments, the VM sends multiple GARP messages in order to better ensure that the message is received. The MFE 2140 receives these GARP messages, and sends them to the MFE 2135 (for delivery to SR1 2120) as well as to the MFEs at the various hosts 2150-2155 (so that the DR will know to remove from its ARP cache the old SR2 IP to MAC address mapping).

In the case of two SRs in active-standby mode (e.g., if the SRs belong to a TLR, or a PLR with stateful services configured), then the southbound interfaces share the same IP address but with different MAC addresses in some embodiments. If the tunnels from a gateway machine with a standby SR fail, then the management plane does not initiate a new standby SR in some embodiments. When the tunnels from a gateway machine with an active SR fail, however, the standby VM identifies this failure (as no heartbeat messages are received from the active SR), and generates GARP messages so as to remove the mapping of the southbound IP address to the failed SR's MAC address in the ARP table for the DR in the host machine MFEs (so that these MFEs will route packets to the new active SR rather than the old active SR). In some embodiments, the tunneling protocol layer (e.g., the VXLAN layer) on the host machines also learns the MAC:VTEP mapping for the new MAC address. Lastly, if the standby (now active) VM operates as a SR for a PLR, it begins route advertisement to the physical external routers. In addition, in some embodiments, the gateway machine with the failed tunnels stops its own BGP process from continuing to advertise routes.

3. Partial Tunnel Failure

Partial tunnel failure occurs when only some of the tunnels between the gateway machine and other machines in the datacenter go down. This could be due to complete failure at one of the machines with a tunnel to the particular gateway machine (which would result in the loss of one tunnel), due to conditions at the particular gateway machine that result in some of its tunnels going down, etc. Described here is the case when conditions at the particular gateway machine result in a subset of its tunnels failing. As a result, (i) some of the MFEs at host machines with user VMs lose tunnels to the particular gateway machine, (ii) some of the other gateway machines lose tunnels to the particular gateway machine, and (iii) the particular gateway machine loses tunnels to some other gateway machines.

The MFEs at host machines that lose tunnels to the particular gateway machine treat this in the same manner as complete tunnel failure, as from the perspective of the host machine this is simply an unreachable gateway. As such, the datapath or chassis controller on the host machine automatically removes the affected routes that use the SR on the particular gateway machine as the next hop IP address from the FIB of the DR.

As noted, partial tunnel failure can result in various different scenarios. For instance, in some cases, a gateway machine may be reachable by some of the host machine MFEs, but not by its own peers. Referring to FIG. 13 as an example, the gateway machine 1330 might be reachable by the host machines 1305-1320 but not reachable by gateways 1335 and 1340. In this case, the local chassis controller on the gateway machine 1330 will take over the SRs of the PLR that are running on both gateway machines 1335 and 1340. In addition, the gateway machine 1335 (or machine 1340, depending on the ranking) will take over the SR running on the gateway machine 1330. This results in some of the MFEs (that can reach all of the gateway machines) receiving replies from multiple gateway machines when the DR running on it sends an ARP request for the southbound interface IP address of the SR hosted on the first gateway machine 1330. So long as the SRs are in an active-active configuration (with no stateful services), this will not create a correctness problem. However, in the case of an active-standby configuration, this would mean that both of the SRs are now active, which could cause traffic disruption issues.

Partial tunnel failure can also cause problems in active-standby mode when, at a particular gateway machine, the tunnels to some of the host machines go down, but the peer gateway machines remain reachable. In this case, because the tunnels between the SRs are functioning, no failover occurs. In active-active mode, the datapath at the host machines (or the local chassis controller) can make the decision to forward traffic over the tunnels that are still up without issue. However, in active-standby mode, if the tunnels to the active SR are down, then the MFE will send packets to the standby SR, which does not process them. Similarly, in both active-active and active-standby configurations, the gateway machine may not be able to pass on southbound traffic from physical routers, which is therefore blackholed in some embodiments.

4. vNIC to Physical Router is Down

In some embodiments, each VM on which the SR runs uses a first vNIC to connect to the MFE for packets sent to and from the physical router(s) (if the SR belongs to a PLR), a second vNIC for sending heartbeat messages to its peers, and a third vNIC for packets sent to and received from the logical network. In some embodiments, some or all of these vNICs may be the same. For instance, the SR might use the same vNIC to send heartbeat messages and communicate with physical routers, or to send heartbeat messages and communicate with the logical network.

If the VM loses the first vNIC (with the physical router) for any reason, in some embodiments the SR stops sending a heartbeat message. As such, once its peer VMs that host the other SRs for the PLR detect that the heartbeat messages have stopped from the SR, they take failover actions as described above in subsection 1, as if the VM had crashed. If the VM loses the second vNIC (for heartbeat messages), the peer VMs will detect that no heartbeat messages are incoming, and take the same failover actions to take control of the failed SR's IP addresses. Lastly, if the VM loses the third vNIC (for logical network traffic), it indicates the situation in a heartbeat message, and the peers can follow the same failover procedure.

5. BGP Session Down

In some cases, the BGP session for the SRs may go down (e.g., because the MSR process on the gateway machine crashes). When graceful restart is enabled for the BGP process, no failover actions need to be taken so long as the session is reestablished within the timeout set for graceful restart. In order to be able to detect when the MSR process (or other BGP module) has gone down, some embodiments require the process to refresh the status of all BGP sessions periodically, even if the status has not changed.

On the other hand, if graceful restart is not enabled or the timeout for the restart expires, the gateway machine uses the heartbeat message to indicate that the SR is no longer functioning (e.g., by ceasing the heartbeat messages). From the perspective of the peer SRs, the SR with non-functioning BGP will be treated as down and the above failover procedures apply.

C. Failover Process

Figure 24:
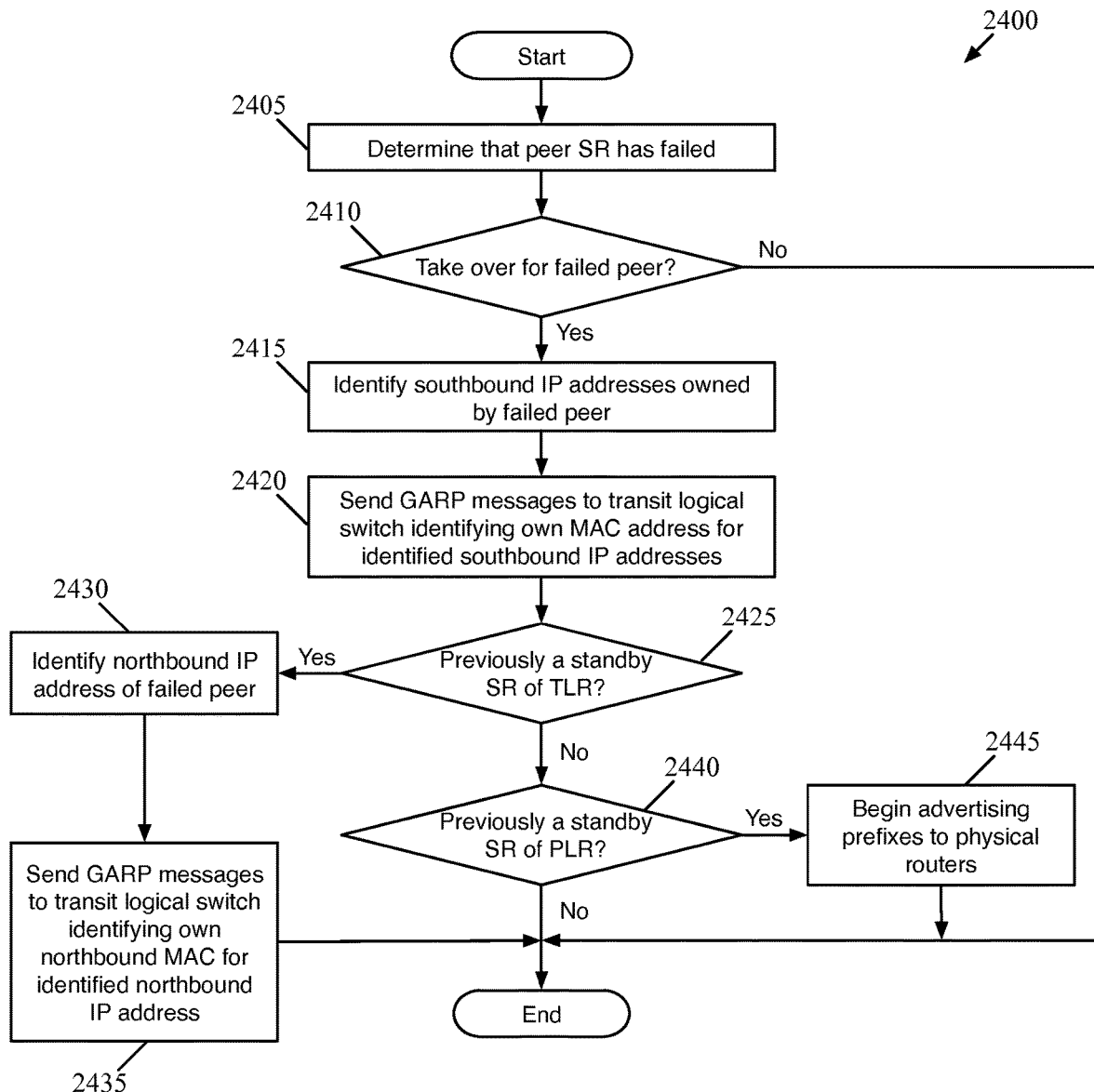
FIG. 24 conceptually illustrates a process performed by a SR in case of failover of a peer SR.

FIG. 24 conceptually illustrates a process 2400 performed by a SR in case of failover of a peer SR. In various embodiments, this process may be performed by either the local control plane operating on the gateway machine of the SR (for either a VM or a VRF in a DPDK-based datapath), the SR itself (if implemented as an edge VM), or the datapath (if implemented as a VRF in a DPDK-based datapath). That is, the operations of process 2400 apply to both of the described types of SRs, though the implementation of the processes may be different for the different types.

As shown, the process 2400 begins by determining (at 2405) that a peer SR has failed. As described in the preceding subsections, a SR might fail for various reasons, and in different capacities. For example, the tunnel connectivity within the datacenter that enable logical network communication might go down, the ability of the SR to communicate with the external physical network could become unavailable, the VM that implements the SR could crash (if the SR is implemented as such), the datapath could crash, the entire gateway machine hosting the SR could crash, etc. It should be understood that in some cases (e.g., all tunnel connectivity from the gateway machine going down, the datapath crashing, etc.) all of the SRs on a gateway machine will be considered failed, and their various peers will perform the process 2400 or a similar process.

Upon determining that its peer SR has failed, the process 2400 then determines (at 2410) whether to take over for the failed peer. For example, if the failed peer is the standby SR in an active-standby configuration, then the active SR needs not take any action. In addition, for an active-active configuration, only one of the peer SRs will need to take over for a failed SR. As described above, which of the SRs takes over for a particular failed SR is predetermined based on the ranks assigned by the management plane at the time of creation of the SRs.

When the SR is not responsible for taking over for the failed SR, the process ends. Otherwise, the process identifies (at 2415) the southbound IP addresses owned by the failed peer, for which it is now responsible. These may be different situations in active-active compared to active-standby mode. Specifically, in active-standby mode, the two SRs share an IP address on the southbound interface, so the SR will simply take over acting on its own IP address. In active-active mode, the SRs all have different southbound IP addresses. In this case, the overtaking SR is now responsible for the originally-assigned IP address of the failed SR, as well as any additional southbound interface IP addresses that the failed SR had previously taken responsibility for (due to failure of the other peer SRs).

For each identified southbound IP address, the process 2400 sends (at 2420) one or more GARP reply messages to the transit logical switch that connects the SRs and the DR of their logical router. The GARP messages identify the SR's own southbound MAC address as now associated with the southbound IP address or addresses identified at operation 2415. This enables the other components on the transit logical switch to clear their ARP caches so as to avoid sending packets routed to the identified IP address to the failed destination. For the DR, implemented on numerous gateway and host machines throughout the datacenter, the GARP reply is broadcast to these numerous machines so that the ARP caches on the various MFEs can be cleared.

The process then determines (at 2425) whether the SR performing the process (or the SR on the machine whose local controller chassis is performing the process) was previously a standby SR of a TLR. It should be understood that the process 2400 is merely conceptual, and that operation 2425 is implemented in some embodiments by default on all TLR standby SRs, and that no specific determination need be made. When the failed SR was the active SR in an active-standby configuration, the standby SR is responsible for attracting southbound traffic that previously would have been sent to the failed SR.

Thus, if the SR was formerly a standby SR of a TLR, the process 2400 identifies (at 2430) the northbound IP address of the failed peer, which it shares (as the TLR only is allowed one uplink in some embodiments). The process next sends (at 2430) one or more GARP reply messages to the transit logical switch that connects the SRs to the DR of a PLR. The GARP messages identify the SR's own northbound MAC address as now associated with the IP address of the uplink configured for the TLR. This enables the DR of the PLR to clear its ARP cache (more specifically, for the various MFEs that implement this DR across the datacenter to clear their ARP caches). The process then ends.

If the SR performing the process was not a standby SR of a TLR, the process determines (at 2440) whether this SR was previously a standby SR of a PLR. Again, it should be understood that in some embodiments no specific determination is actually made by the SR or local controller chassis that performs the process 2400. When this SR was a standby SR for a PLR, the SR begins advertising (at 2445) prefixes to its external physical routers. In the active-active case, the SR would have already been advertising these prefixes in order to attract ECMP traffic. However, in the active-standby configuration, the standby does not advertise prefixes, instead only receiving routes from the external routers. However, in order to attract southbound traffic, the new active (formerly standby) SR begins advertising prefixes. The process then ends.

VII. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 25:
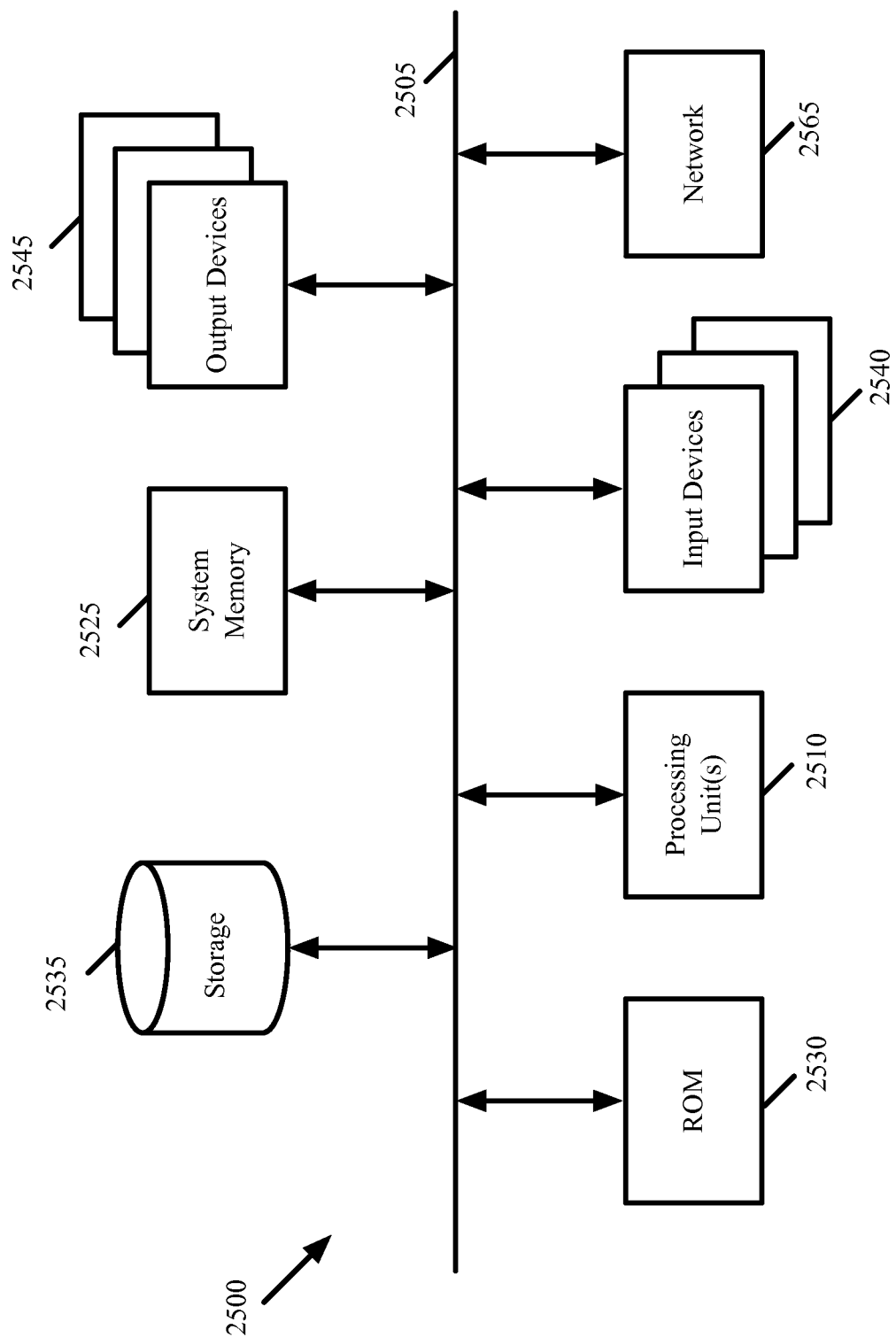
FIG. 25 conceptually illustrates an electronic system with which some embodiments of the invention are implemented.

FIG. 25 conceptually illustrates an electronic system 2500 with which some embodiments of the invention are implemented. The electronic system 2500 can be used to execute any of the control, virtualization, or operating system applications described above. The electronic system 2500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2500 includes a bus 2505, processing unit(s) 2510, a system memory 2525, a read-only memory 2530, a permanent storage device 2535, input devices 2540, and output devices 2545.

The bus 2505 collectively represents all system, peripheral, and chipset buses that communicatively connect the numerous internal devices of the electronic system 2500. For instance, the bus 2505 communicatively connects the processing unit(s) 2510 with the read-only memory 2530, the system memory 2525, and the permanent storage device 2535.

From these various memory units, the processing unit(s) 2510 retrieve instructions to execute and data to process in order to execute the processes of the invention. The processing unit(s) may be a single processor or a multi-core processor in different embodiments.

The read-only-memory (ROM) 2530 stores static data and instructions that are needed by the processing unit(s) 2510 and other modules of the electronic system. The permanent storage device 2535, on the other hand, is a read-and-write memory device. This device is a non-volatile memory unit that stores instructions and data even when the electronic system 2500 is off. Some embodiments of the invention use a mass-storage device (such as a magnetic or optical disk and its corresponding disk drive) as the permanent storage device 2535.

Other embodiments use a removable storage device (such as a floppy disk, flash drive, etc.) as the permanent storage device. Like the permanent storage device 2535, the system memory 2525 is a read-and-write memory device. However, unlike storage device 2535, the system memory is a volatile read-and-write memory, such a random access memory. The system memory stores some of the instructions and data that the processor needs at runtime. In some embodiments, the invention's processes are stored in the system memory 2525, the permanent storage device 2535, and/or the read-only memory 2530. From these various memory units, the processing unit(s) 2510 retrieve instructions to execute and data to process in order to execute the processes of some embodiments.

The bus 2505 also connects to the input and output devices 2540 and 2545. The input devices enable the user to communicate information and select commands to the electronic system. The input devices 2540 include alphanumeric keyboards and pointing devices (also called "cursor control devices"). The output devices 2545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 25, bus 2505 also couples electronic system 2500 to a network 2565 through a network adapter (not shown). In this manner, the computer can be a part of a network of computers (such as a local area network ("LAN"), a wide area network ("WAN"), or an Intranet, or a network of networks, such as the Internet. Any or all components of electronic system 2500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 11, 12, and 24) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for implementing a logical router in a network, the method comprising:

receiving a definition of a logical router to serve as an interface between a logical first network and a second network external to the logical first network;

to implement the logical router, defining a plurality of routing components comprising (1) a distributed routing component to be implemented on a first plurality of computers, and (2) a plurality of centralized routing components to be implemented on a second plurality of computers that comprises a subset of the first plurality of computers but not all of the first plurality of computers, the centralized routing components (1) to forward northbound packet flows from the logical first network to and the second network, and (2) to forward southbound packet flows from the second network to the logical first network, and the distributed routing component to route packets (1) within the logical first network and (2) to and from the centralized routing components; and distributing definitions of the plurality of routing components to the first and second pluralities of computers to implement the distributed and centralized routing components.

2. The method of claim 1 further comprising automatically defining a logical switch for logically handling traffic between the distributed routing component and the plurality of centralized routing components.

3. The method of claim 1, wherein the definition of the logical router comprises specification of a plurality of interfaces for connecting with the second network, each interface comprising a network address and a data link address, wherein defining the plurality of routing components comprises:

assigning a first one of the plurality of interfaces to a first gateway machine and a second one of the plurality of interfaces to a second gateway machine; and defining a first centralized routing component for implementation on the first gateway machine and a second centralized routing component for implementation on the second gateway machine.

4. The method of claim 3, wherein:

defining the first centralized routing component comprises defining (i) a first interface for the first centralized routing component using configuration details of the first interface assigned to the first gateway machine and (ii) a second interface for the second centralized routing component used to communicate with a distributed routing component; and defining the second centralized routing component comprises defining (i) a first interface for the second centralized routing component using configuration details of the second interface assigned to the second gateway machine and (ii) a second interface for the second centralized routing component used to communicate with the distributed routing component.

5. The method of claim 4, wherein defining the plurality of routing components further comprises defining a logical switch with ports to which the second interface of the first centralized routing component, the second interface of the second centralized routing component, and an interface of the distributed routing component all couple.

6. The method of claim 4, wherein the second interface of the first centralized routing component and the second interface of the second centralized routing component have different network addresses and different data link layer addresses.

7. The method of claim 4, wherein the second interface of the first centralized routing component and the second interface of the second centralized routing component have a same network address and different data link layer addresses.

8. The method of claim 3, wherein network address data for the first interface of the first centralized routing component is based on network address data for the first one of the plurality of interfaces and network address data for the second interface of the first centralized routing component is generated separately from any configuration details of the definition of the logical router.

9. The method of claim 1, wherein the logical router is a first logical router that includes a plurality of interfaces for communicating with the second network, the method further comprising receiving a definition of a second logical router that connects to an interface of the first logical router, wherein the second logical router only communicates with the second network through the first logical router.

10. The method of claim 9 further comprising defining a single distributed routing component for the second logical router when no stateful services are configured for the second logical router.

11. The method of claim 9 further comprising defining (i) a distributed routing component and (ii) two centralized routing components for the second logical router when stateful services are configured for the second logical router, each of the defined routing components for the second logical router comprising a separate set of routes and a separate set of logical interfaces.

12. The method of claim 11 further comprising defining a logical switch with ports to which an interface of each of the two centralized routing components and a single interface of a distributed routing component of the first logical router couple.

13. The method of claim 11, wherein a first of the two centralized routing components of the second logical router is designated as active and a second of the two centralized routing components of the second logical router is designated as standby, wherein the first centralized routing component of the second logical router responds to ARP requests and the second centralized routing component of the second logical router does not respond to ARP requests.

14. A method for implementing a logical router in a network, the method comprising:

receiving a definition of a logical router to serve as an interface between a logical first network and a second network external to the logical first network;

defining a plurality of routing components to implement the logical router, the defined routing components including a distributed routing component to be implemented on a first plurality of computers and a plurality of centralized routing components to be implemented on a second plurality of computers that comprises a subset of the first plurality of computers but not all of the first plurality of computers, the centralized routing components to serve as interfaces between the logical first network and the second network, while the distributed routing components to route packets within the logical first network and to and from the centralized routing components; and defining a logical switch for logically handling traffic between the distributed routing component and the pluralities of centralized routing components;

distributing definitions of the plurality of routing components to the first and second pluralities of computers to implement the distributed and centralized routing components;

wherein each centralized routing component is implemented by one computer that does not implement any of the other centralized routing components, while the distributed routing component and logical switch are implemented by each computer that implements a centralized routing component.

15. A non-transitory machine readable medium storing a program which when executed by at least one processing unit implements a logical router in a network, the program comprising sets of instructions for:

receiving a definition of a logical router to serve as an interface between a logical first network and a second network external to the logical first network;

to implement the logical router, defining a plurality of routing components comprising (1) a distributed routing component to be implemented on a first plurality of computers, and (2) a plurality of centralized routing components to be implemented on a second plurality of computers that comprises a subset of the first plurality of computers but not all of the first plurality of computers, the centralized routing components (1) to forward northbound packet flows from the logical first network to the second network, and (2) to forward southbound packet flows from the second network to the logical first network, and the distributed routing component to route packets (1) within the logical first network and (2) to and from the centralized routing components; and distributing definitions of the plurality of routing components to the first and second pluralities of computers to implement the distributed and centralized routing components.

16. The machine readable medium of claim 15, wherein the program further comprising a set of instructions for automatically defining a logical switch for logically handling traffic between the distributed routing component and the plurality of centralized routing components, wherein the set of instructions for implementing the plurality of routing components comprises a set of instructions for implementing each of the centralized routing components on a single computer and implementing the distributed routing component and logical switch across a plurality of computers.

17. The machine readable medium of claim 15, wherein the definition of the logical router comprises specification of a plurality of interfaces for connecting with the second network, each interface comprising a network address and a data link address, wherein the set of instructions for defining the plurality of routing components comprises sets of instructions for:

assigning a first one of the plurality of interfaces to a first gateway machine and a second one of the plurality of interfaces to a second gateway machine; and defining a first centralized routing component for implementation on the first gateway machine and a second centralized routing component for implementation on the second gateway machine.

18. The machine readable medium of claim 17, wherein:

the set of instructions for defining the first centralized routing component comprises a set of instructions for defining (i) a first interface for the first centralized routing component using configuration details of the first interface assigned to the first gateway machine and (ii) a second interface for the second centralized routing component used to communicate with a distributed routing component; and the set of instructions for defining the second centralized routing component comprises a set of instructions for defining (i) a first interface for the second centralized routing component using configuration details of the second interface assigned to the second gateway machine and (ii) a second interface for the second centralized routing component used to communicate with the distributed routing component.

19. The machine readable medium of claim 18, wherein network address data for the first interface of the first centralized routing component is based on network address data for the first one of the plurality of interfaces and network address data for the second interface of the first centralized routing component is generated separately from any configuration details of the definition of the logical router.

20. The machine readable medium of claim 18, wherein the set of instructions for defining the plurality of routing components further comprises a set of instructions for defining a logical switch with ports to which the second interface of the first centralized routing component, the second interface of the second centralized routing component, and an interface of the distributed routing component all couple.

* * * * *